United States Patent
Zass et al.

(10) Patent No.: US 11,303,795 B2
(45) Date of Patent: Apr. 12, 2022

(54) DETERMINING IMAGE CAPTURING PARAMETERS IN CONSTRUCTION SITES FROM ELECTRONIC RECORDS

(71) Applicant: Ron Zass, Kiryat Tivon (IL)

(72) Inventors: Ron Zass, Kiryat Tivon (IL); Michael Sasson, Petah Tikva (IL)

(73) Assignee: CONSTRU LTD, Tel Aviv (IL)

(*) Notice: Subject to any disclaimer, the term of this patent is extended or adjusted under 35 U.S.C. 154(b) by 0 days.

(21) Appl. No.: 17/019,310

(22) Filed: Sep. 13, 2020

(65) Prior Publication Data

US 2020/0412926 A1    Dec. 31, 2020

Related U.S. Application Data

(60) Provisional application No. 62/960,330, filed on Jan. 13, 2020, provisional application No. 62/900,500, filed on Sep. 14, 2019.

(51) Int. Cl.
*H04N 5/232* (2006.01)
*G06T 7/00* (2017.01)
(Continued)

(52) U.S. Cl.
CPC .......... *H04N 5/232* (2013.01); *G05D 1/0094* (2013.01); *G06F 16/51* (2019.01); *G06F 16/535* (2019.01); *G06F 16/538* (2019.01); *G06F 16/54* (2019.01); *G06K 9/0063* (2013.01); *G06K 9/00637* (2013.01); *G06Q 10/06311* (2013.01); *G06Q 10/06315* (2013.01); *G06Q 10/06316* (2013.01); *G06Q 10/087* (2013.01); *G06Q 10/10* (2013.01); *G06Q 10/103* (2013.01); *G06Q 30/0185* (2013.01); *G06Q 50/08* (2013.01); *G06Q 50/265* (2013.01); *G06T 1/60* (2013.01);
(Continued)

(58) Field of Classification Search
None
See application file for complete search history.

(56) References Cited

U.S. PATENT DOCUMENTS

| | | | |
|---|---|---|---|
| 6,859,269 B2* | 2/2005 | Ohtomo | G01C 1/02 356/141.1 |
| 7,319,511 B2* | 1/2008 | Murai | G01C 15/002 356/4.01 |

(Continued)

OTHER PUBLICATIONS

Golparvar-Fard, Mani, Feniosky Peña-Mora, and Silvio Savarese. "D4AR—a 4-dimensional augmented reality model for automating construction progress monitoring data collection, processing and communication." Journal of information technology in construction 14, No. 13 (2009): 129-153. (Year: 2009).*

*Primary Examiner* — Stefan Gadomski

(57) ABSTRACT

Systems, methods and non-transitory computer readable media for determining image capturing parameters in construction sites are provided. For example, at least one electronic record may be accessed, the at least one electronic record may include information related to an object in a construction site. The information related to the object may be analyzed to determine at least one capturing parameter associated with the object. Further, the systems, methods and non-transitory computer readable media may cause a capturing, at the construction site, of at least one image of the object using the determined at least one capturing parameter associated with the object.

17 Claims, 22 Drawing Sheets

1200

1210 Access at least one electronic record, the at least one electronic record includes information related to an object in a construction site 1220 Analyze the information related to the object to determine at least one capturing parameter associated with the object 1230 Cause capturing, at the construction site, of at least one image of the object using the determined at least one capturing parameter associated with the object

(51) Int. Cl.
    *G06F 16/538* (2019.01)
    *G06F 16/535* (2019.01)
    *G06F 16/54* (2019.01)
    *G06K 9/00* (2006.01)
    *G06Q 10/06* (2012.01)
    *G06Q 10/08* (2012.01)
    *G06Q 10/10* (2012.01)
    *G06Q 50/08* (2012.01)
    *G05D 1/00* (2006.01)
    *H04N 7/18* (2006.01)
    *G06F 16/51* (2019.01)
    *G06T 7/70* (2017.01)
    *G06Q 30/00* (2012.01)
    *G06Q 50/26* (2012.01)
    *G06T 7/174* (2017.01)
    *G06T 1/60* (2006.01)
    *G06N 20/00* (2019.01)
    *G06Q 40/00* (2012.01)

(52) U.S. Cl.
    CPC ............ *G06T 7/001* (2013.01); *G06T 7/0004* (2013.01); *G06T 7/174* (2017.01); *G06T 7/70* (2017.01); *G06T 7/97* (2017.01); *H04N 7/188* (2013.01); *G06N 20/00* (2019.01); *G06Q 10/1097* (2013.01); *G06Q 40/12* (2013.12); *G06T 2207/20081* (2013.01); *G06T 2207/20084* (2013.01); *G06T 2207/30108* (2013.01); *G06T 2207/30132* (2013.01); *G06T 2207/30168* (2013.01)

(56) References Cited

U.S. PATENT DOCUMENTS

| | | | | |
|---|---|---|---|---|
| 7,647,199 B2 * | 1/2010 | Green | ................ | G01C 15/002 702/150 |
| 7,720,703 B1 * | 5/2010 | Broughton | ............ | G06Q 10/06 705/7.23 |
| 7,842,911 B2 * | 11/2010 | Kirschner | ................ | G01C 1/04 250/221 |
| 8,031,332 B2 * | 10/2011 | Miller | ................ | G01C 15/002 356/4.01 |
| 8,036,452 B2 * | 10/2011 | Pettersson | .............. | G01C 11/00 382/154 |
| 8,085,387 B2 * | 12/2011 | Kludas | ................ | G01C 15/00 356/4.01 |
| 8,149,388 B2 * | 4/2012 | Kludas | ................ | G01C 15/00 356/4.01 |
| 8,818,768 B1 * | 8/2014 | Fan | .......................... | G06T 17/05 703/1 |
| 9,317,966 B1 * | 4/2016 | Deephanphongs | ..... | G06T 17/05 |
| 9,536,148 B2 * | 1/2017 | Gross | ................ | G06Q 30/0643 |
| 10,403,037 B1 * | 9/2019 | Boardman | ................ | G06T 7/60 |
| 2001/0027407 A1 * | 10/2001 | Mori | .................... | G06Q 50/165 705/7.12 |
| 2009/0110267 A1 * | 4/2009 | Zakhor | ................... | G06T 15/04 382/154 |
| 2009/0284593 A1 * | 11/2009 | Dubois | .............. | G01B 11/2518 348/135 |
| 2011/0148866 A1 * | 6/2011 | Chu | ........................ | G06T 17/05 345/419 |
| 2012/0203806 A1 * | 8/2012 | Panushev | ................ | G06Q 10/06 707/825 |
| 2012/0259594 A1 * | 10/2012 | Khan | ..................... | G06T 13/60 703/1 |
| 2013/0096873 A1 * | 4/2013 | Rosengaus | ........... | G01C 15/002 702/151 |
| 2013/0182103 A1 * | 7/2013 | Lee | ........................ | H04N 7/181 348/139 |
| 2016/0048935 A1 * | 2/2016 | Martinovic | ....... | G06Q 10/06375 705/38 |
| 2016/0335731 A1 * | 11/2016 | Hall | ..................... | G06Q 10/067 |
| 2017/0046799 A1 * | 2/2017 | Chan | .................... | H04L 9/3247 |
| 2017/0097227 A1 * | 4/2017 | Sanders | ................ | G01S 17/88 |
| 2018/0082414 A1 * | 3/2018 | Rozenberg | ................ | G06T 7/75 |
| 2018/0259955 A1 * | 9/2018 | Noto | ................ | G05D 1/0094 |
| 2019/0050942 A1 * | 2/2019 | Dalal | ................... | G06Q 50/163 |
| 2019/0066317 A1 * | 2/2019 | Chang | .................... | G06T 17/00 |
| 2019/0137995 A1 * | 5/2019 | Tan | .......................... | H04L 9/06 |
| 2019/0354911 A1 * | 11/2019 | Alaniz | ............ | G06Q 10/063114 |
| 2019/0385297 A1 * | 12/2019 | Khosrowpour | ........ | G06K 9/6257 |
| 2020/0128171 A1 * | 4/2020 | Herson | ................ | G08B 29/18 |

* cited by examiner

1300

1310 Access a previously captured image of an object in a construction site

1320 Analyze the previously captured image of the object to determine at least one capturing parameter associated with the object for a prospective image capturing

1330 Cause capturing, at the construction site, of at least one image of the object using the determined at least one capturing parameter associated with the object

| 1410 Obtain a plurality of images captured in a construction site, the plurality of images comprises at least a first image corresponding to a first point in time and a second image corresponding to a second point in time |
| --- |

↓

| 1420 Analyze the first image and the second image to determine whether a change occurred in a particular area of the construction site between the first point in time and the second point in time |
| --- |

↓

| 1430 Determine whether a higher quality image of the particular area of the construction site is needed |
| --- |

↓

| 1440 In response to a determination that a change occurred in the particular area of the construction site and a determination that a higher quality image is needed, cause an image acquisition robot to acquire at least one image of the particular area of the construction site |
| --- |

↓

| 1450 In response to at least one of a determination that no change occurred in the particular area of the construction site and a determination that a higher quality image is not needed, withhold causing the image acquisition robot to acquire the at least one image of the particular area of the construction site |
| --- |

1510 Obtain a first image captured in a construction site using an image sensor, the first image corresponding to a first point in time

1520 Analyze the first image to determine whether a first event occurred in the construction site prior to the first point in time

1530 Determine whether a second event occurred in the construction site prior to the first point in time

1540 In response to a determination that the first event occurred in the construction site prior to the first point in time and a determination that the second event did not occur in the construction site prior to the first point in time, provide a first notification

1550 In response to at least one of a determination that the first event did not occur in the construction site prior to the first point in time and a determination that the second event occurred in the construction site prior to the first point in time, forgo providing the first notification

1610 Obtain at least part of a construction plan for a construction site

1620 Analyze the at least part of the construction plan to identify a first object of a first object type planned to be constructed in the construction site, a first element of a first element type planned to be connected to the first object, and a second element of a second element type planned to be connected to the first object

1630 Based on the first object type, determine a first plurality of construction tasks for the construction of the first object, the first plurality of construction tasks comprises at least a first construction task and a second construction task

1640 Based on the first element type, determine a second plurality of construction tasks for the construction of the first object and related to the first element, the second plurality of construction tasks comprises at least a third construction task and a fourth construction task

1650 Based on the second element type, determine a third plurality of construction tasks for the construction of the first object and related to the second element, the third plurality of construction tasks comprises at least a fifth construction task and a sixth construction task

1660 Based on the first element type and the second element type, determine that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task

1710 Obtain an image of a construction site and an indication of at least one purported parameter of a capturing of the image

1720 Analyze the image to determine whether the indicated at least one purported parameter of the capturing of the image is consistent with a visual content of the image

1730 In response to a determination that the indicated at least one purported parameter of the capturing of the image is consistent with the visual content of the image, cause a first update to an electronic record associated with the construction site based on an analysis of the image

1740 In response to a determination that the indicated at least one purported parameter of the capturing of the image is inconsistent with the visual content of the image, provide first information to a user

1722A Analyze the image to determine whether an indicated location associated with the image included in the indicated at least one purported parameter of the capturing of the image is consistent with the visual content of the image

1724A Basing the determination of whether the indicated at least one purported parameter of the capturing of the image is consistent with the visual content of the image on the determination of whether the indicated location is consistent with the visual content of the image

1722B Analyze the image to determine whether an indicated first point in time included in the indicated at least one purported parameter of the capturing of the image is consistent with the visual content of the image

1724B Basing the determination of whether the indicated at least one purported parameter of the capturing of the image is consistent with the visual content of the image on the determination of whether the indicated first point in time is consistent with the visual content of the image

1721C Accessing information indicative of a state of at least part of the construction site at a second point in time

1722C Analyzing the image to attempt to identify an inconsistency between the indicated state of the at least part of the construction site at the second point in time and the visual content of the image based on the image being associated with the first point in time

1724C Basing the determination of whether the indicated at least one purported parameter of the capturing of the image is consistent with the visual content of the image on the identification of the inconsistency between the state of the construction site at the second point in time and the visual content of the image

1722D Analyze the image to determine whether an indicated type of image capturing device included in the indicated at least one purported parameter of the capturing of the image is consistent with the visual content of the image

1724D Basing the determination of whether the indicated at least one purported parameter of the capturing of the image is consistent with the visual content of the image on the determination of whether the indicated type of image capturing device is consistent with the visual content of the image

1902 Access a plurality of images of a construction site, each image of the plurality of images may correspond to a location in the construction site and a construction stage 1904 Presenting a user interface to a user 1906 Receive an indication of a first location in the construction site 1908 Receive an indication of a first construction stage 1910 In response to the received indication of the first location and the received indication of the first construction stage, select a first image of the plurality of images, the first image may correspond to the first location and the first construction stage 1912 Present the selected first image 1914 Receive an indication of a second location in the construction site 1916 In response to the received indication of the second location, select a second image of the plurality of images, the second image may correspond to the second location and the first construction stage (A)

FIG. 19A

DETERMINING IMAGE CAPTURING PARAMETERS IN CONSTRUCTION SITES FROM ELECTRONIC RECORDS

CROSS REFERENCES TO RELATED APPLICATIONS

This application claims the benefit of priority of U.S. Provisional Patent Application No. 62/900,500, filed on Sep. 14, 2019, and U.S. Provisional Patent Application No. 62/960,330, filed on Jan. 13, 2020.

The entire contents of all of the above-identified applications are herein incorporated by reference.

BACKGROUND

Technological Field

The disclosed embodiments generally relate to systems and methods for capturing images. More particularly, the disclosed embodiments relate to systems and methods for capturing images of construction sites.

Background Information

Image sensors are now part of numerous devices, from security systems to mobile phones, and the availability of images and videos produced by those devices is increasing.

The construction industry deals with building of new structures, additions and modifications to existing structures, maintenance of existing structures, repair of existing structures, improvements of existing structures, and so forth. While construction is widespread, the construction process still needs improvements. Manual monitoring, analysis, inspection, and management of the construction process prove to be difficult, expensive, and inefficient. As a result, many construction projects suffer from cost and schedule overruns, and in many times the quality of the constructed structures is lacking.

SUMMARY

In some embodiments, systems comprising at least one processor are provided. In some examples, the systems may further comprise at least one of an image sensor, a display device, a communication device, a memory unit, and so forth.

In some embodiments, systems, methods and non-transitory computer readable media for providing information on construction errors based on construction site images are provided.

In some embodiments, image data captured from a construction site using at least one image sensor may be obtained. The image data may be analyzed to identify at least one construction error. Further, the image data may be analyzed to identify a type of the at least one construction error. In response to a first identified type of the at least one construction error, first information may be provided, and in response to a second identified type of the at least one construction error, providing the first information may be forgone.

In some embodiments, systems, methods and non-transitory computer readable media for determining the quality of concrete from construction site images are provided.

In some embodiments, image data captured from a construction site using at least one image sensor may be obtained. The image data may be analyzed to identify a region of the image data depicting at least part of an object, wherein the object is of an object type and made, at least partly, of concrete. The image data may be further analyzed to determine a quality indication associated with the concrete. The object type of the object may be used to select a threshold. The quality indication may be compared with the selected threshold. An indication to a user may be provided to a user based on a result of the comparison of the quality indication with the selected threshold.

In some embodiments, systems, methods and non-transitory computer readable media for providing information based on construction site images are provided.

In some embodiments, image data captured from a construction site using at least one image sensor may be obtained. Further, at least one electronic record associated with the construction site may be obtained. The image data may be analyzed to identify at least one discrepancy between the at least one electronic record and the construction site. Further, information based on the identified at least one discrepancy may be provided to a user.

In some embodiments, systems, methods and non-transitory computer readable media for updating records based on construction site images are provided.

In some embodiments, image data captured from a construction site using at least one image sensor may be obtained. The image data may be analyzed to detect at least one object in the construction site. Further, at least one electronic record associated with the construction site may be updated based on the detected at least one object. In some examples, the at least one electronic record may comprise a searchable database, and updating the at least one electronic record may comprise indexing the at least one object in the searchable database. For example, the searchable database may be searched for a record related to the at least one object. In response to a determination that the searchable database includes a record related to the at least one object, the record related to the at least one object may be updated. In response to a determination that the searchable database do not include a record related to the at least one object, a record related to the at least one object may be added to the searchable database.

In some embodiments, systems, methods and non-transitory computer readable media for determining image capturing parameters in construction sites are provided.

In some embodiments, at least one electronic record may be accessed, the at least one electronic record may include information related to an object in a construction site. Further, in some examples, the information related to the object may be analyzed to determine at least one capturing parameter associated with the object. Further, in some examples, the systems, methods and non-transitory computer readable media may cause a capturing, at the construction site, of at least one image of the object using the determined at least one capturing parameter associated with the object.

In some embodiments, a previously captured image of an object in a construction site may be accessed. The previously captured image of the object may be analyzed to determine at least one capturing parameter associated with the object for a prospective image capturing. Further, in some examples, the systems, methods and non-transitory computer readable media may cause capturing, at the construction site, of at least one image of the object using the determined at least one capturing parameter associated with the object.

In some embodiments, systems, methods and non-transitory computer readable media for controlling image acquisition robots in construction sites are provided.

In some embodiments, a plurality of images captured in a construction site may be obtained, the plurality of images may comprise at least a first image corresponding to a first point in time and a second image corresponding to a second point in time, the second point in time may differ from the first point in time. The first image and the second image may be analyzed to determine whether a change occurred in a particular area of the construction site between the first point in time and the second point in time. It may be determined whether a higher quality image of the particular area of the construction site is needed. In response to a determination that a change occurred in the particular area of the construction site and a determination that a higher quality image is needed, the systems, methods and non-transitory computer readable media may cause an image acquisition robot to acquire at least one image of the particular area of the construction site, and in response to at least one of a determination that no change occurred in the particular area of the construction site and a determination that a higher quality image is not needed, causing the image acquisition robot to acquire the at least one image of the particular area of the construction site may be withheld and/or forgone.

In some embodiments, systems, methods and non-transitory computer readable media for monitoring sequence of events in construction sites are provided.

In some embodiments, a first image captured in a construction site using an image sensor may be obtained, the first image may correspond to a first point in time. The first image may be analyzed to determine whether a first event occurred in the construction site prior to the first point in time. Further, it may be determined whether a second event occurred in the construction site prior to the first point in time. In response to a determination that the first event occurred in the construction site prior to the first point in time and a determination that the second event did not occur in the construction site prior to the first point in time, a first notification may be provided, and in response to at least one of a determination that the first event did not occur in the construction site prior to the first point in time and a determination that the second event occurred in the construction site prior to the first point in time, providing the first notification may be withheld and/or forgone.

In some embodiments, systems, methods and non-transitory computer readable media for determining schedule constraints from construction plans are provided.

In some embodiments, at least part of a construction plan for a construction site may be obtained. The at least part of the construction plan may be analyzed to identify a first object of a first object type planned to be constructed in the construction site, a first element of a first element type planned to be connected to the first object, and a second element of a second element type planned to be connected to the first object. Based on the first object type, a first plurality of construction tasks for the construction of the first object may be determined, the first plurality of construction tasks may comprise at least a first construction task and a second construction task. Based on the first element type, a second plurality of construction tasks for the construction of the first object and related to the first element may be determined, the second plurality of construction tasks may comprise at least a third construction task and a fourth construction task. Based on the second element type, a third plurality of construction tasks for the construction of the first object and related to the second element may be determined, the third plurality of construction tasks may comprise at least a fifth construction task and a sixth construction task. Based on the first element type and the second element type, it may be determined that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task.

In some embodiments, systems, methods and non-transitory computer readable media for verifying purported parameters of capturing of images of construction sites are provided.

In some embodiments, an image of a construction site and an indication of at least one purported parameter of a capturing of the image may be obtained. The image may be analyzed to determine whether the indicated at least one purported parameter of the capturing of the image is consistent with a visual content of the image. In response to a determination that the indicated at least one purported parameter of the capturing of the image is consistent with the visual content of the image, a first update to an electronic record associated with the construction site based on an analysis of the image may be caused, and in response to a determination that the indicated at least one purported parameter of the capturing of the image is inconsistent with the visual content of the image, first information may be provided to a user.

In some embodiments, systems, methods and non-transitory computer readable media for generating tasks from images of construction sites are provided.

In some embodiments, image data captured from a construction site using at least one image sensor may be obtained. The image data may be analyzed to determine at least one desired task related to the construction site. The image data may be analyzed to determine at least one parameter of the at least one desired task. The determined at least one parameter of the at least one desired task may be used to provide information configured to cause the performance of the at least one desired task.

In some embodiments, systems, methods and non-transitory computer readable media for exploring images of construction sites by construction stages are provided.

In some embodiments, a plurality of images of a construction site may be accessed, each image of the plurality of images may correspond to a location in the construction site and a construction stage. An indication of a first location in the construction site may be received, and an indication of a first construction stage may be received. In response to the received indication of the first location in the construction site and the received indication of the first construction stage, a first image may be selected of the plurality of images, the first image may correspond to the first location and the first construction stage, and the selected first image may be presented. After presenting the selected first image, an indication of a second location in the construction site may be received, the second location may differ from the first location. In response to the received indication of the second location in the construction site, a second image of the plurality of images may be selected, the second image may correspond to the second location and the first construction stage, and the selected second image may be presented. After presenting the selected second image, an indication of a first capturing time may be received. In response to the received indication of the first capturing time, a third image of the plurality of images may be selected, the third image may correspond to the second location and the first capturing time, the third image may not correspond to the first construction stage, and the selected third image may be presented. After presenting the selected third image, an indication of a third location in the construction site may be received. In response to the received indication of the third location in the construction site, a fourth image of the plurality of images may be selected, the fourth image may correspond to the third location and the first capturing time, the fourth image may not correspond to the first construction stage, and the selected fourth image may be presented.

Consistent with other disclosed embodiments, non-transitory computer-readable storage media may store data and/or computer implementable instructions for carrying out any of the methods described herein.

The foregoing general description and the following detailed description are exemplary and explanatory only and are not restrictive of the claims.

BRIEF DESCRIPTION OF THE DRAWINGS

FIG. 13 illustrates an example of a method for determining image capturing parameters in construction sites.

FIG. 14 illustrates an example of a method for controlling image acquisition robots in construction sites.

FIG. 15 illustrates an example of a method for monitoring sequence of events in construction sites.

FIG. 16 illustrates an example of a method for determining schedule constraints from construction plans.

FIGS. 17A, 17B, 17C, 17D and 17E illustrate an example of a method for verifying purported parameters of capturing of images of construction sites.

FIGS. 19A and 19B illustrate an example of a method for exploring images of construction sites by construction stages.

DESCRIPTION

Figure 1A:
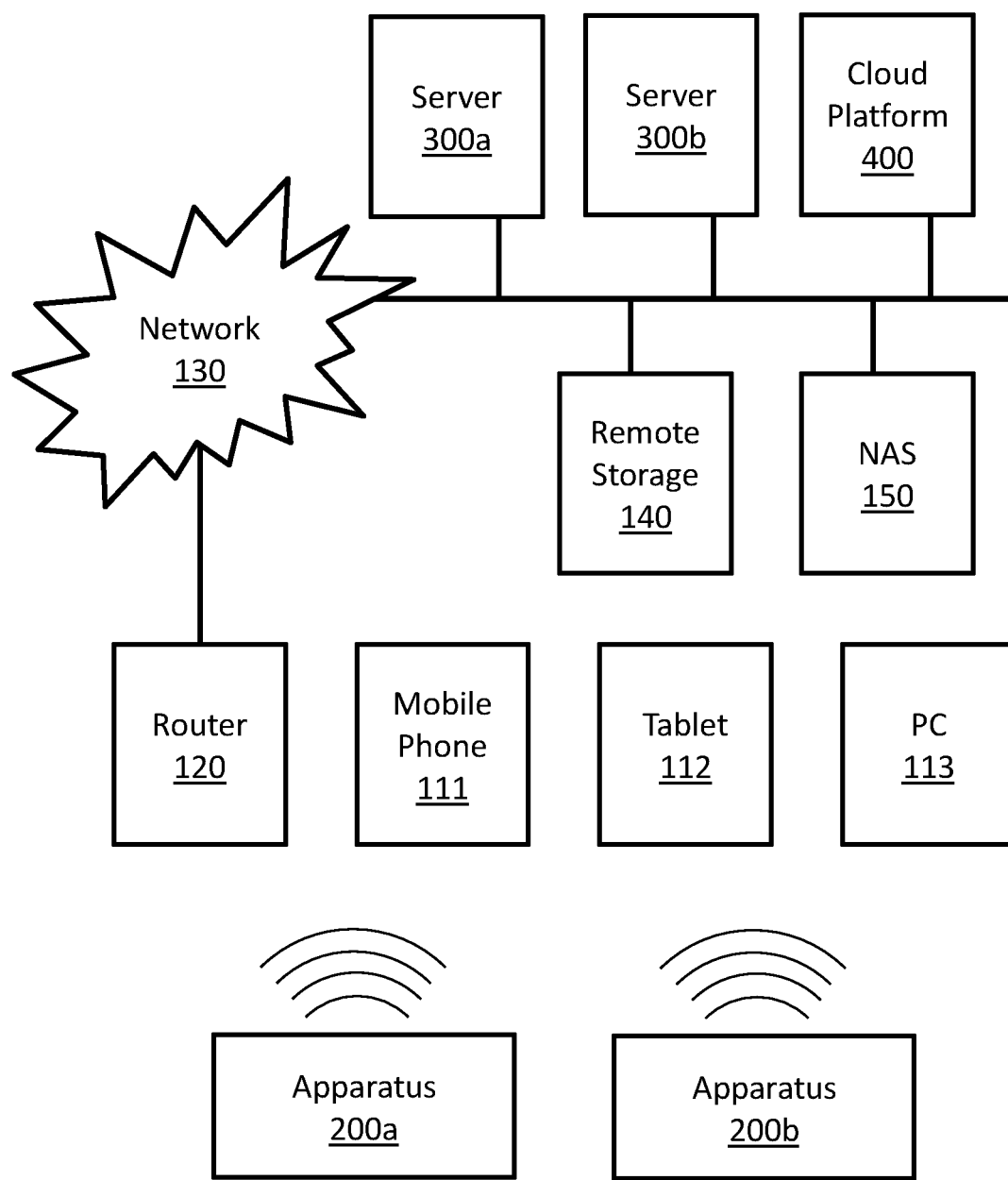
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like include, action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor, such as, a digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "compressive strength test" is recognized by those skilled in the art and refers to a test that mechanically measure the maximal amount of compressive load a material, such as a body or a cube of concrete, can bear before fracturing.

The term "water permeability test" is recognized by those skilled in the art and refers to a test of a body or a cube of concrete that measures the depth of penetration of water maintained at predetermined pressures for a predetermined time intervals.

The term "rapid chloride ion penetration test" is recognized by those skilled in the art and refers to a test that measures the ability of concrete to resist chloride ion penetration.

The term "water absorption test" is recognized by those skilled in the art and refers to a test of concrete specimens that, after drying the specimens, emerges the specimens in water at predetermined temperature and/or pressure for predetermined time intervals, and measures the weight of water absorbed by the specimens.

The term "initial surface absorption test" is recognized by those skilled in the art and refers to a test that measures the flow of water per concrete surface area when subjected to a constant water head.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
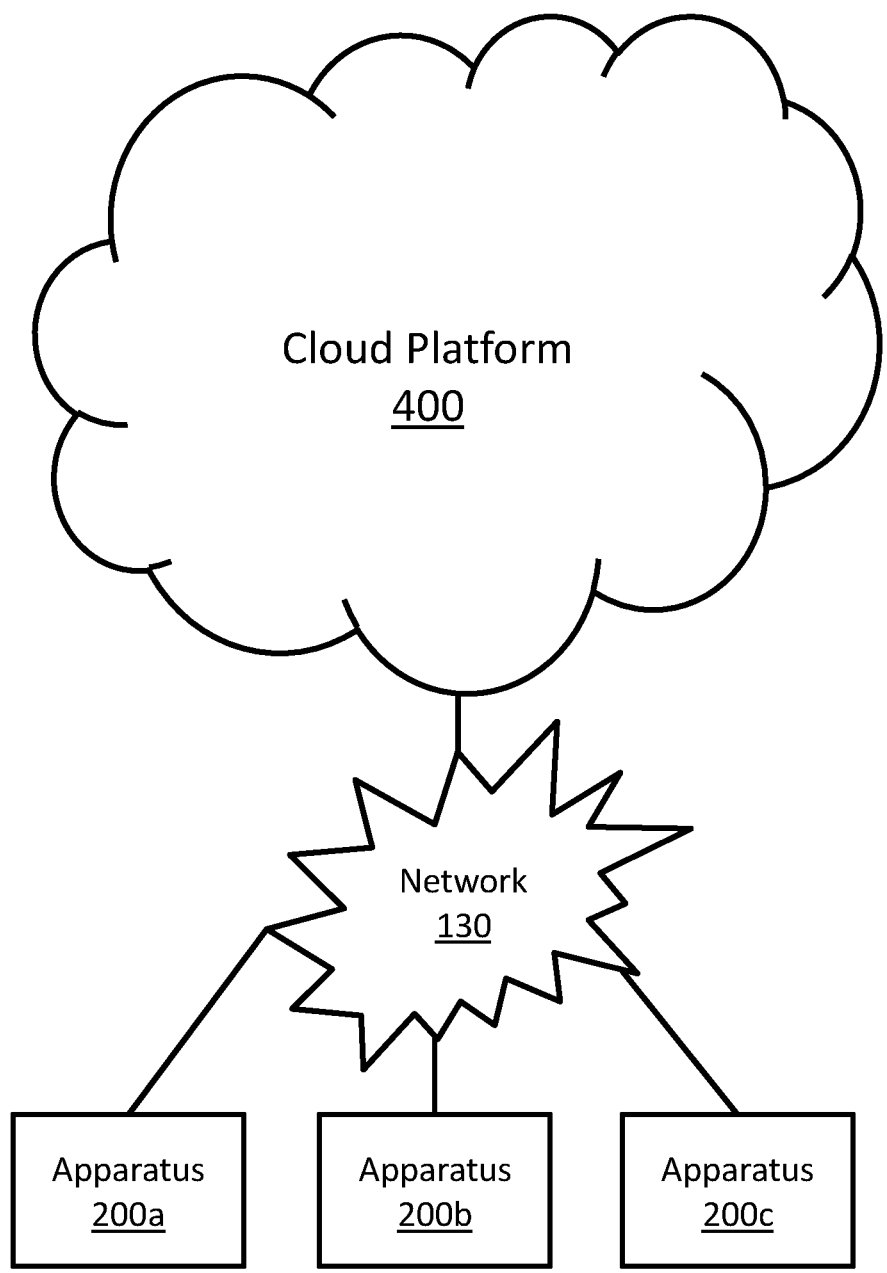

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
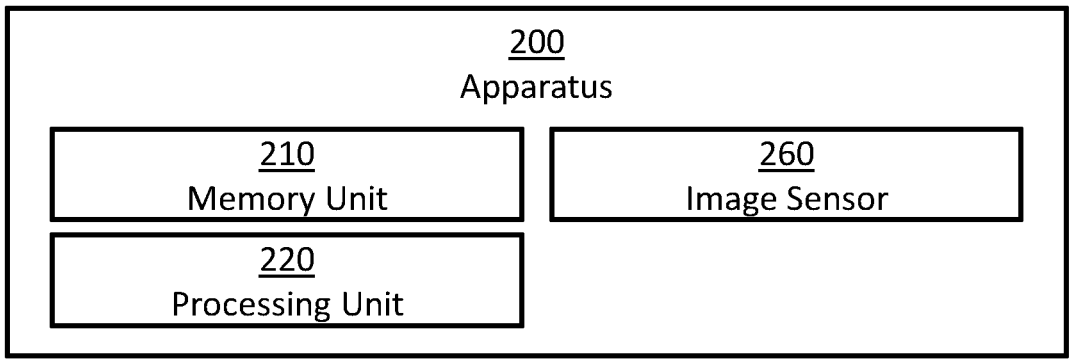
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded.

Figure 2B:
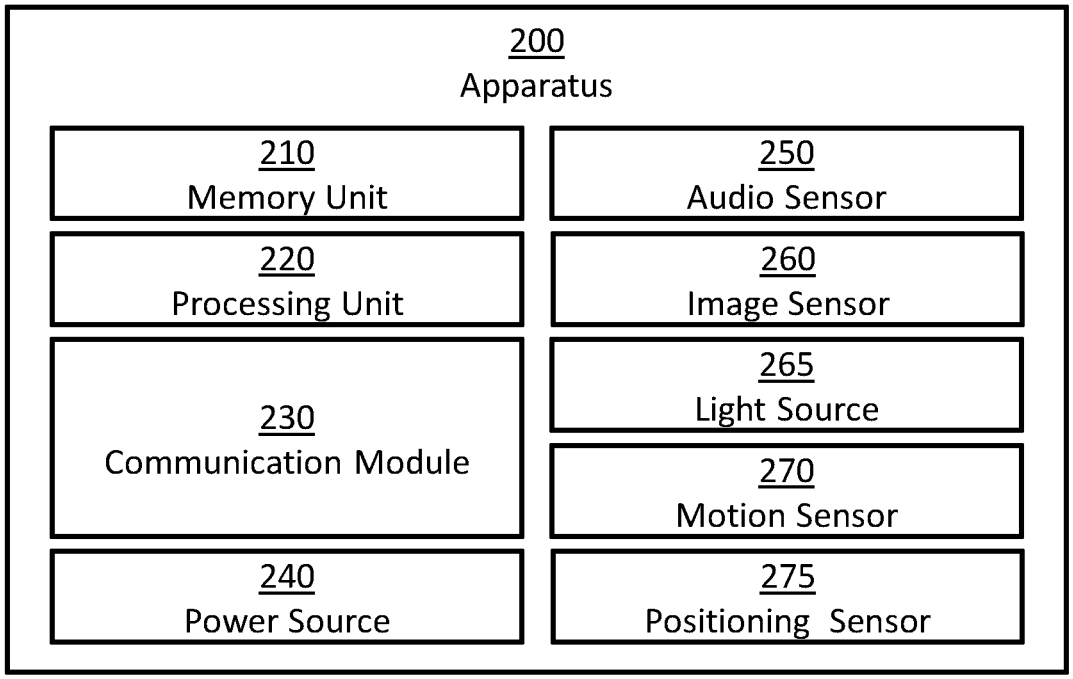

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some non-limiting examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
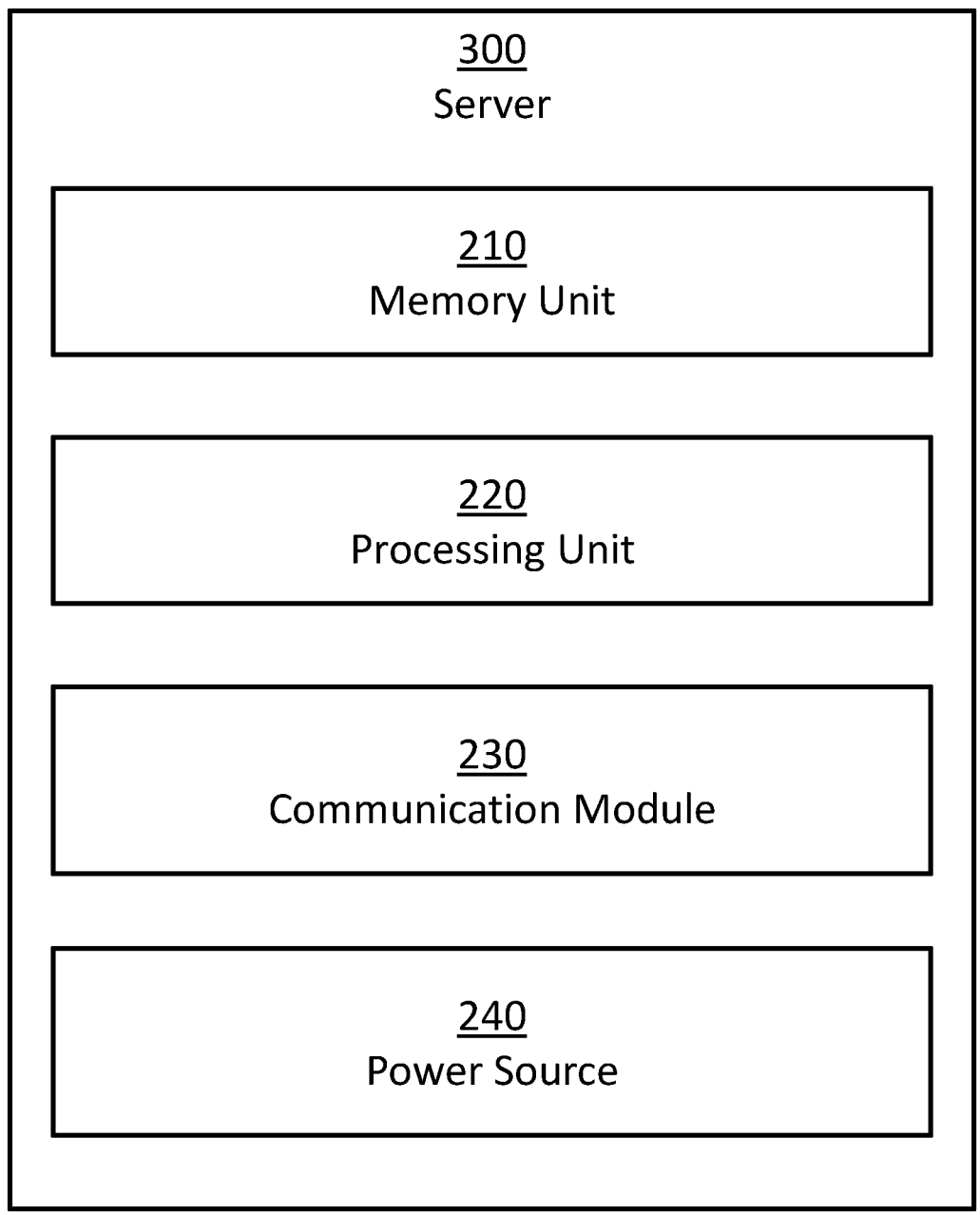
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
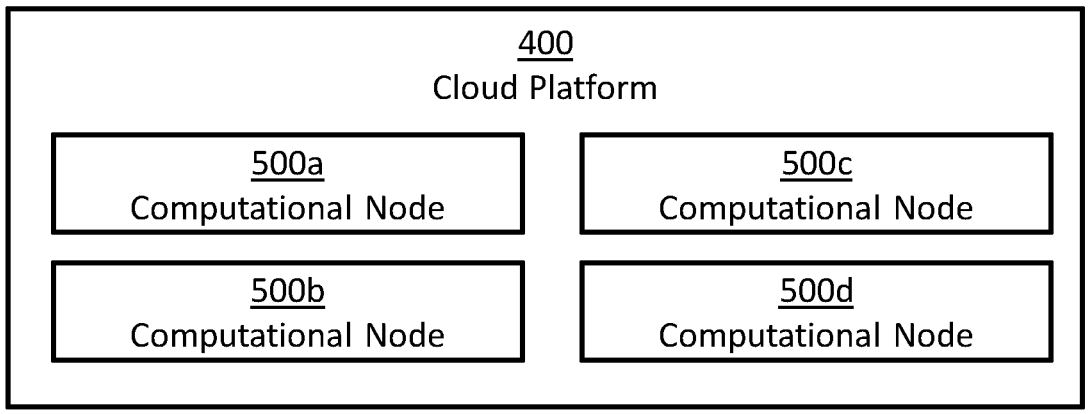
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
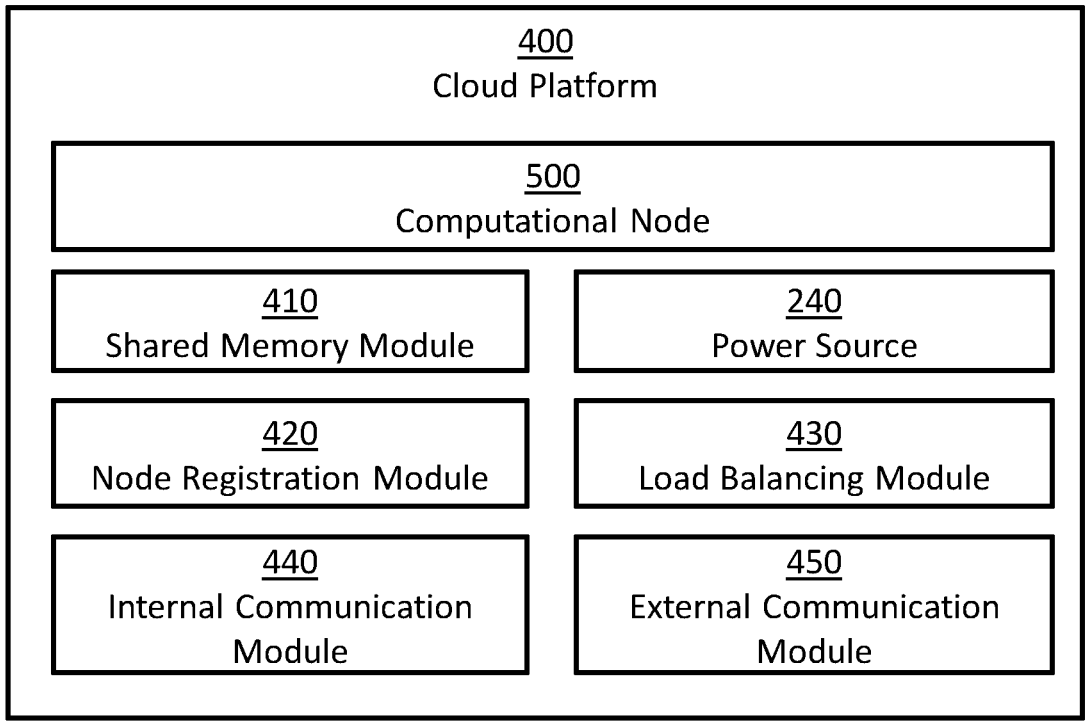

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
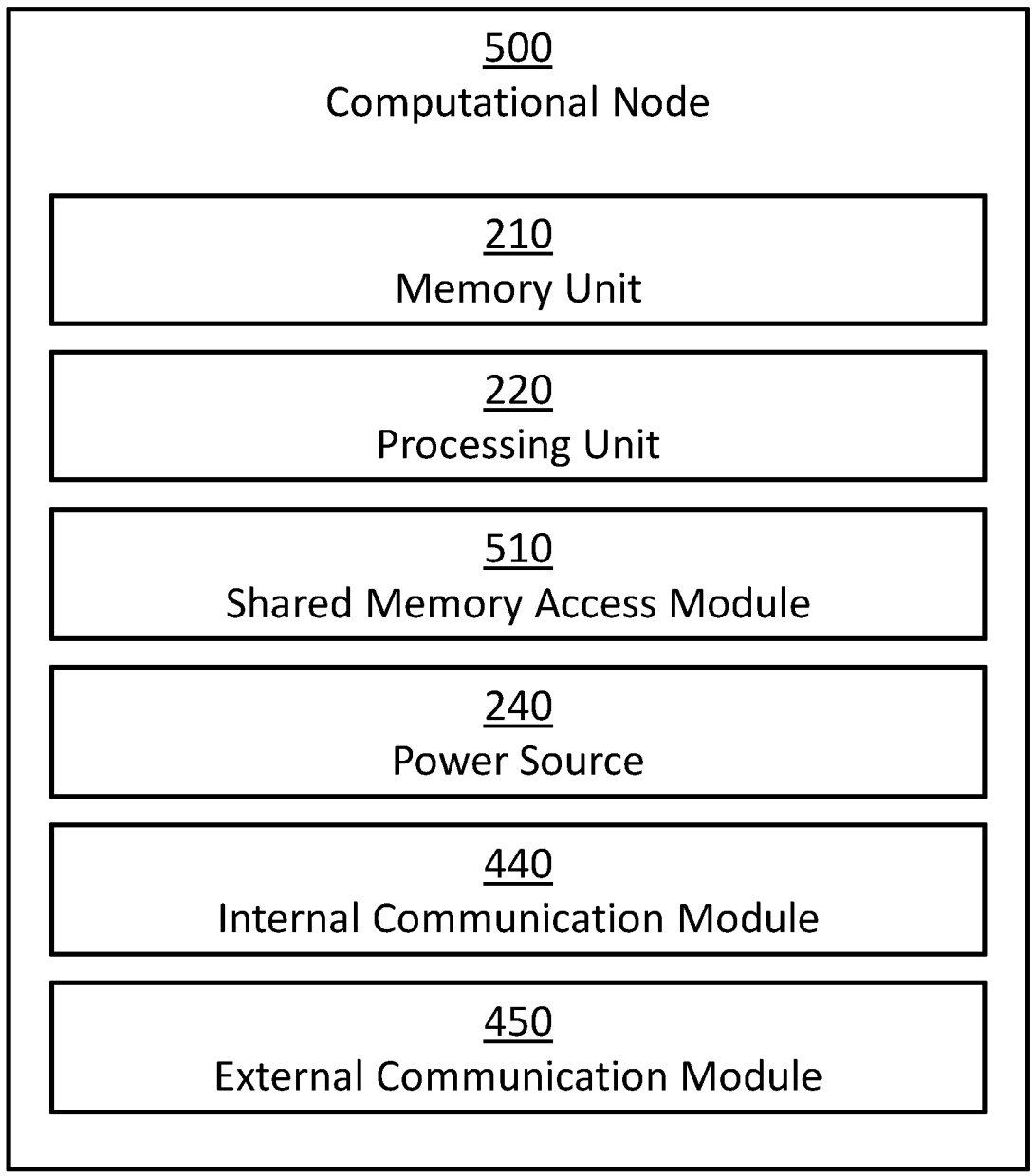
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; and so forth.

Figure 6:
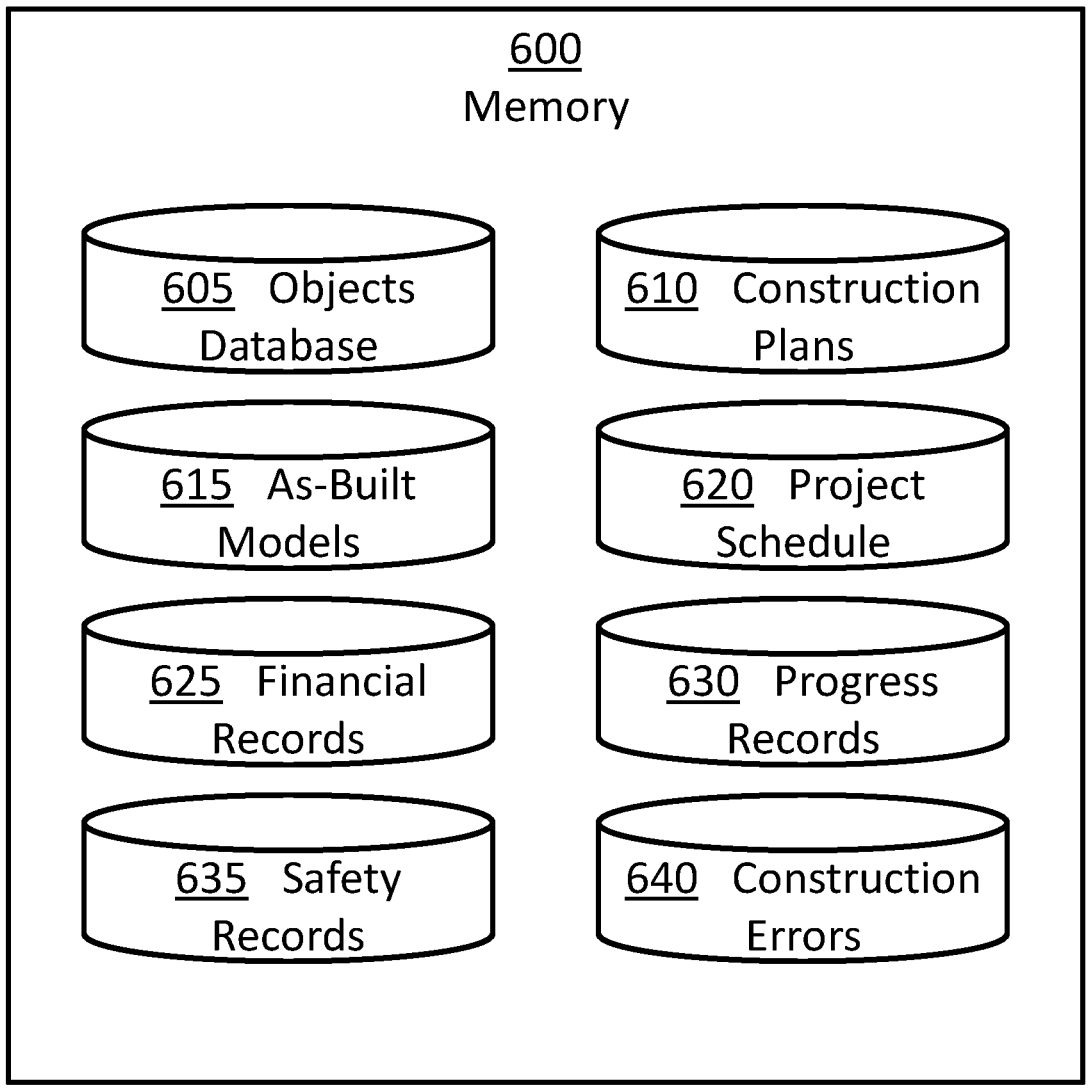
FIG. 6 illustrates an exemplary embodiment of a memory storing a plurality of modules.

FIG. 6 illustrates an exemplary embodiment of memory 600 storing a plurality of modules. In some examples, memory 600 may be separate from and/or integrated with memory units 210, separate from and/or integrated with memory units 410, and so forth. In some examples, memory 600 may be included in a single device, for example in apparatus 200, in server 300, in cloud platform 400, in computational node 500, and so forth. In some examples, memory 600 may be distributed across several devices. Memory 600 may store more or fewer modules than those shown in FIG. 6. In this example, memory 600 may comprise: objects database 605, construction plans 610, as-built models 615, project schedules 620, financial records 625, progress records 630, safety records 635, and construction errors 640.

In some embodiments, objects database 605 may comprise information related to objects associated with one or more construction sites. For example, the objects may include objects planned to be used in a construction site, objects ordered for a construction site, objects arrived at a construction site and awaiting to be used and/or installed, objects used in a construction site, objects installed in a construction site, and so forth. In some examples, the information related to an object in database 605 may include properties of the object, type, brand, configuration, dimensions, weight, price, supplier, manufacturer, identifier of related construction site, location (for example, within the construction site), time of planned arrival, time of actual arrival, time of usage, time of installation, actions need to be taken that involves the object, actions performed using and/or on the object, people associated with the actions (such as persons that need to perform an action, persons that performed an action, persons that monitor the action, persons that approve the action, etc.), tools associated with the actions (such as tools required to perform an action, tools used to perform the action, etc.), quality, quality of installation, other objects used in conjunction with the object, and so forth. In some examples, elements in objects database 605 may be indexed and/or searchable, for example using a database, using an indexing data structure, and so forth.

In some embodiments, construction plans 610 may comprise documents, drawings, models, representations, specifications, measurements, bill of materials, architectural plans, architectural drawings, floor plans, 2D architectural plans, 3D architectural plans, construction drawings, feasibility plans, demolition plans, permit plans, mechanical plans, electrical plans, space plans, elevations, sections, renderings, computer-aided design data, Building Information Modeling (BIM) models, and so forth, indicating design intention for one or more construction sites and/or one or more portions of one or more construction sites. Construction plans 610 may be digitally stored in memory 600, as described above.

In some embodiments, as-built models 615 may comprise documents, drawings, models, representations, specifications, measurements, list of materials, architectural drawings, floor plans, 2D drawings, 3D drawings, elevations, sections, renderings, computer-aided design data, Building Information Modeling (BIM) models, and so forth, representing one or more buildings or spaces as they were actually constructed. As-built models 615 may be digitally stored in memory 600, as described above.

In some embodiments, project schedules 620 may comprise details of planned tasks, milestones, activities, deliverables, expected task start time, expected task duration, expected task completion date, resource allocation to tasks, linkages of dependencies between tasks, and so forth, related to one or more construction sites. Project schedules 620 may be digitally stored in memory 600, as described above.

In some embodiments, financial records 625 may comprise information, records and documents related to financial transactions, invoices, payment receipts, bank records, work orders, supply orders, delivery receipts, rental information, salaries information, financial forecasts, financing details, loans, insurance policies, and so forth, associated with one or more construction sites. Financial records 625 may be digitally stored in memory 600, as described above.

In some embodiments, progress records 630 may comprise information, records and documents related to tasks performed in one or more construction sites, such as actual task start time, actual task duration, actual task completion date, items used, item affected, resources used, results, and so forth. Progress records 630 may be digitally stored in memory 600, as described above.

In some embodiments, safety records 635 may include information, records and documents related to safety issues (such as hazards, accidents, near accidents, safety related events, etc.) associated with one or more construction sites. Safety records 635 may be digitally stored in memory 600, as described above.

In some embodiments, construction errors 640 may include information, records and documents related to construction errors (such as execution errors, divergence from construction plans, improper alignment of items, improper placement or items, improper installation of items, concrete of low quality, missing item, excess item, and so forth) associated with one or more construction sites. Construction errors 640 may be digitally stored in memory 600, as described above.

In some embodiments, a method, such as methods 700, 900, 1100, 1200, 1300, 1400, 1500, 1600, 1700, 1800 and 1900 may comprise of one or more steps. In some examples, these methods, as well as all individual steps therein, may be performed by various aspects of apparatus 200, server 300, cloud platform 400, computational node 500, and so forth. For example, a system comprising of at least one processor, such as processing units 220, may perform any of these methods as well as all individual steps therein, for example by processing units 220 executing software instructions stored within memory units 210 and/or within shared memory modules 410. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example by Step 720, Step 730, Step 930, Step 940, Step 1120, Step 1220, Step 1320, Step 1420, Step 1430, Step 1520, Step 1530, Step 1720, Step 1820, Step 1830, and in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example by Step 720, Step 730, Step 930, Step 940, Step 1120, Step 1220, Step 1320, Step 1420, Step 1430, Step 1520, Step 1530, Step 1720, Step 1820, Step 1830, and in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example by Step 720, Step 730, Step 930, Step 940, Step 1120, and in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein, such as Step 720, Step 730, Step 930, Step 940, Step 1120, Step 1220, Step 1320, Step 1420, Step 1430, Step 1520, Step 1530, Step 1720, Step 1820, Step 1830, Step 1902, Step 1910, Step 1916, Step 1922, Step 1928, and so forth) may comprise analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example by the methods, steps and modules described herein, such as Step 720, Step 730, Step 930, Step 940, Step 1120, Step 1220, Step 1320, Step 1420, Step 1430, Step 1520, Step 1530, Step 1720, Step 1820, Step 1830, Step 1902, Step 1910, Step 1916, Step 1922, Step 1928, and so forth) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing image data (for example by the methods, steps and modules described herein, such as Step 720, Step 730, Step 930, Step 940, Step 1120, Step 1220, Step 1320, Step 1420, Step 1430, Step 1520, Step 1530, Step 1720, Step 1820, Step 1830, Step 1902, Step 1910, Step 1916, Step 1922, Step 1928, and so forth) may comprise analyzing pixels, voxels, point cloud, range data, etc. included in the image data.

Figure 7:
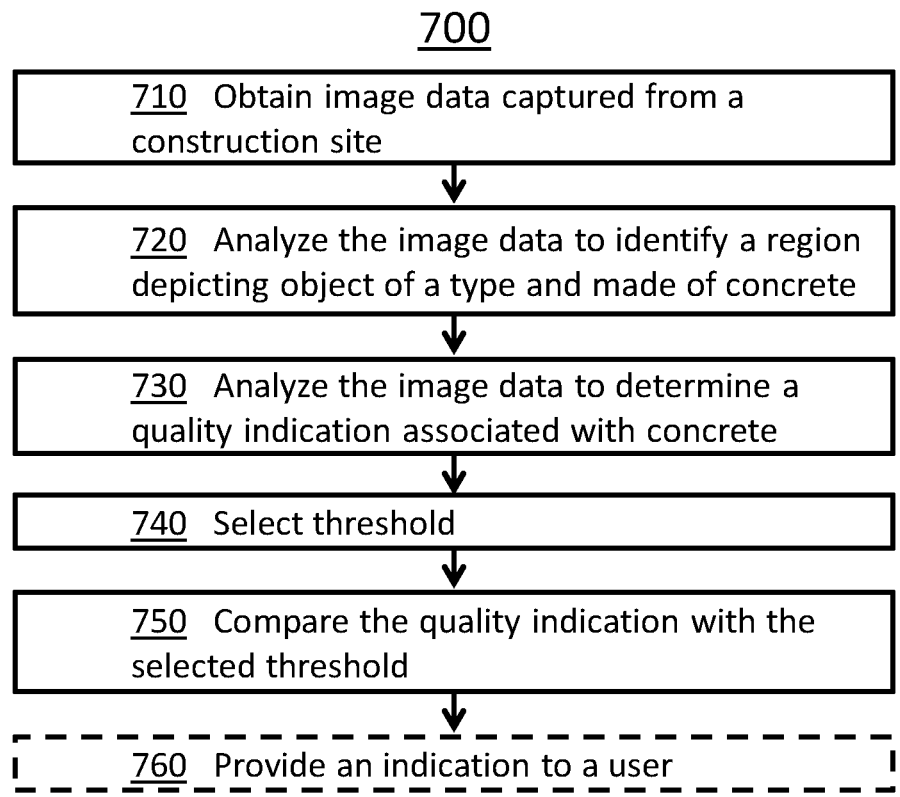
FIG. 7 illustrates an example of a method for processing images of concrete.

FIG. 7 illustrates an example of a method 700 for determining the quality of concrete from construction site images. In this example, method 700 may comprise: obtaining image data captured from a construction site (Step 710); analyzing the image data to identify a region depicting an object of an object type and made of concrete (Step 720); analyzing the image data to determine a quality indication associated with concrete (Step 730); selecting a threshold (Step 740); and comparing the quality indication with the selected threshold (Step 750). Based, at least in part, on the result of the comparison, process 700 may provide an indication to a user (Step 760). In some implementations, method 700 may comprise one or more additional steps, while some of the steps listed above may be modified or excluded. For example, Step 720 and/or Step 740 and/or Step 750 and/or Step 760 may be excluded from method 700. In some implementations, one or more steps illustrated in FIG. 7 may be executed in a different order and/or one or more groups of steps may be executed simultaneously and vice versa. For example, Step 720 may be executed after and/or simultaneously with Step 710, Step 730 may be executed after and/or simultaneously with Step 710, Step 730 may be executed before, after and/or simultaneously with Step 720, Step 740 may be executed at any stage before Step 750, and so forth.

In some embodiments, obtaining image data captured from a construction site (Step 710) may comprise obtaining image data captured from a construction site using at least one image sensor, such as image sensors 260. In some examples, obtaining the images may comprise capturing the image data from the construction site. Some non-limiting examples of image data may include: one or more images; one or more portions of one or more images; sequence of images; one or more video clips; one or more portions of one or more video clips; one or more video streams; one or more portions of one or more video streams; one or more 3D images; one or more portions of one or more 3D images; sequence of 3D images; one or more 3D video clips; one or more portions of one or more 3D video clips; one or more 3D video streams; one or more portions of one or more 3D video streams; one or more 360 images; one or more portions of one or more 360 images; sequence of 360 images; one or more 360 video clips; one or more portions of one or more 360 video clips; one or more 360 video streams; one or more portions of one or more 360 video streams; information based, at least in part, on any of the above; any combination of the above; and so forth.

In some examples, Step 710 may comprise obtaining image data captured from a construction site (and/or capturing the image data from the construction site) using at least one wearable image sensor, such as wearable version of apparatus 200 and/or wearable version of image sensor 260. For example, the wearable image sensors may be configured to be worn by construction workers and/or other persons in the construction site. For example, the wearable image sensor may be physically connected and/or integral to a garment, physically connected and/or integral to a belt, physically connected and/or integral to a wrist strap, physically connected and/or integral to a necklace, physically connected and/or integral to a helmet, and so forth.

In some examples, Step 710 may comprise obtaining image data captured from a construction site (and/or capturing the image data from the construction site) using at least one stationary image sensor, such as stationary version of apparatus 200 and/or stationary version of image sensor 260. For example, the stationary image sensors may be configured to be mounted to ceilings, to walls, to doorways, to floors, and so forth. For example, a stationary image sensor may be configured to be mounted to a ceiling, for example substantially at the center of the ceiling (for example, less than two meters from the center of the ceiling, less than one meter from the center of the ceiling, less than half a meter from the center of the ceiling, and so forth), adjunct to an electrical box in the ceiling, at a position in the ceiling corresponding to a planned connection of a light fixture to the ceiling, and so forth. In another example, two or more stationary image sensors may be mounted to a ceiling in a way that ensures that the fields of view of the two cameras include all walls of the room.

In some examples, Step 710 may comprise obtaining image data captured from a construction site (and/or capturing the image data from the construction site) using at least one mobile image sensor, such as mobile version of apparatus 200 and/or mobile version of image sensor 260. For example, mobile image sensors may be operated by construction workers and/or other persons in the construction site to capture image data of the construction site. In another example, mobile image sensors may be part of a robot configured to move through the construction site and capture image data of the construction site. In yet another example, mobile image sensors may be part of a drone configured to fly through the construction site and capture image data of the construction site.

In some examples, Step 710 may comprise, in addition or alternatively to obtaining image data and/or other input data, obtaining motion information captured using one or more motion sensors, for example using motion sensors 270. Examples of such motion information may include: indications related to motion of objects; measurements related to the velocity of objects; measurements related to the acceleration of objects; indications related to motion of motion sensor 270; measurements related to the velocity of motion sensor 270; measurements related to the acceleration of motion sensor 270; information based, at least in part, on any of the above; any combination of the above; and so forth.

In some examples, Step 710 may comprise, in addition or alternatively to obtaining image data and/or other input data, obtaining position information captured using one or more positioning sensors, for example using positioning sensors 275. Examples of such position information may include: indications related to the position of positioning sensors 275; indications related to changes in the position of positioning sensors 275; measurements related to the position of positioning sensors 275; indications related to the orientation of positioning sensors 275; indications related to changes in the orientation of positioning sensors 275; measurements related to the orientation of positioning sensors 275; measurements related to changes in the orientation of positioning sensors 275; information based, at least in part, on any of the above; any combination of the above; and so forth.

In some embodiments, Step 710 may comprise receiving input data using one or more communication devices, such as communication modules 230, internal communication modules 440, external communication modules 450, and so forth. Examples of such input data may include: input data captured using one or more sensors; image data captured using image sensors, for example using image sensors 260; motion information captured using motion sensors, for example using motion sensors 270; position information captured using positioning sensors, for example using positioning sensors 275; and so forth.

In some embodiments, Step 710 may comprise reading input data from memory units, such as memory units 210, shared memory modules 410, and so forth. Examples of such input data may include: input data captured using one or more sensors; image data captured using image sensors, for example using image sensors 260; motion information captured using motion sensors, for example using motion sensors 270; position information captured using positioning sensors, for example using positioning sensors 275; and so forth.

In some embodiments, analyzing the image data to identify a region depicting an object of an object type and made of concrete (Step 720) may comprise analyzing image data (such as image data captured from a construction site using at least one image sensor and obtained by Step 710) and/or preprocessed image data to identify a region of the image data depicting at least part of an object, wherein the object is of an object type and made, at least partly, of concrete. In one example, multiple regions may be identified, depicting multiple such objects of a single object type and made, at least partly, of concrete. In another example, multiple regions may be identified, depicting multiple such objects of a plurality of object types and made, at least partly, of concrete. In some examples, an identified region of the image data may comprise rectangular region of the image data containing a depiction of at least part of the object, map of pixels of the image data containing a depiction of at least part of the object, a single pixel of the image data within a depiction of at least part of the object, a continuous segment of the image data including a depiction of at least part of the object, a non-continuous segment of the image data including a depiction of at least part of the object, and so forth.

In some examples, the image data may be preprocessed to identify colors and/or textures within the image data, and a rule for detecting concrete based, at least in part, on the identified colors and/or texture may be used. For example, local histograms of colors and/or textures may be assembled, and concrete may be detected when the assembled histograms meet predefined criterions. In some examples, the image data may be processed with an inference model to detect regions of concrete. For example, the inference model may be a result of a machine learning and/or deep learning algorithm trained on training examples. A training example may comprise example images together with markings of regions depicting concrete in the images. The machine learning and/or deep learning algorithms may be trained using the training examples to identify images depicting concrete, to identify the regions within the images that depict concrete, and so forth.

In some examples, the image data may be processed using object detection algorithms to identify objects made of concrete, for example to identify objects made of concrete of a selected object type. Some non-limiting examples of such object detection algorithms may include: appearance based object detection algorithms, gradient based object detection algorithms, gray scale object detection algorithms, color based object detection algorithms, histogram based object detection algorithms, feature based object detection algorithms, machine learning based object detection algorithms, artificial neural networks based object detection algorithms, 2D object detection algorithms, 3D object detection algorithms, still image based object detection algorithms, video based object detection algorithms, and so forth.

In some examples, Step 720 may further comprise analyzing the image data to determine at least one property related to the detected concrete, such as a size of the surface made of concrete, a color of the concrete surface, a position of the concrete surface (for example based, at least in part, on the position information and/or motion information obtained by Step 710), a type of the concrete surface, and so forth. For example, a histogram of the pixel colors and/or gray scale values of the identified regions of concrete may be generated. In another example, the size in pixels of the identified regions of concrete may be calculated. In yet another example, the image data may be analyzed to identify a type of the concrete surface, such as an object type (for example, a wall, a ceiling, a floor, a stair, and so forth). For example, the image data and/or the identified region of the image data may be analyzed using an inference model configured to determine the type of surface (such as an object type). The inference model may be a result of a machine learning and/or deep learning algorithm trained on training examples. A training example may comprise example images and/or image regions together with a label describing the type of concrete surface (such as an object type). The inference model may be applied to new images and/or image regions to determine the type of the surface (such as an object type).

In some examples, Step 720 may comprise analyzing a construction plan 610 associated with the construction site to determine the object type of the object. For example, the construction plan may be analyzed to identify an object type specified for an object in the construction plan, for example based on a position of the object in the construction site.

In some examples, Step 720 may comprise analyzing an as-build model 615 associated with the construction site to determine the object type of the object. For example, the as-build model may be analyzed to identify an object type specified for an object in the as-build model, for example based on a position of the object in the construction site.

In some examples, Step 720 may comprise analyzing a project schedule 620 associated with the construction site to determine the object type of the object. For example, the project schedule may be analyzed to identify objects of what object types should be in the construction site (or in parts of the construction site) at a certain time (for example, the capturing time of the image data) according to the project schedule.

In some examples, Step 720 may comprise analyzing financial records 625 associated with the construction site to determine the object type of the object. For example, the financial records may be analyzed to identify objects of what object types should be in the construction site (or in parts of the construction site) at a certain time (for example, the capturing time of the image data) according to the delivery receipts, invoices, purchase orders, and so forth.

In some examples, Step 720 may comprise analyzing progress records 630 associated with the construction site to determine the object type of the object. For example, the progress records may be analyzed to identify objects of what object types should be in the construction site (or in parts of the construction site) at a certain time (for example, the capturing time of the image data) according to the progress records.

In some examples, the image data may be analyzed to determine the object type of the object of Step 720. For example, the image data may be analyzed using a machine learning model trained using training examples to determine object type of an object from one or more images depicting the object (and/or any other input described above). In another example, the image data may be analyzed by an artificial neural network configured to determine object type of an object from one or more images depicting the object (and/or any other input described above).

In some embodiments, Step 730 may comprise analyzing image data (such as image data captured from a construction site using at least one image sensor and obtained by Step 710) and/or preprocessed image data to determine one or more quality indications associated with the concrete (for example, with concrete depicted in image data captured using Step 710, with concrete depicted in regions identified using Step 720, with the concrete that the object of Step 720 is made of, and so forth). In some examples, the quality indications may comprise a discrete grade, a continuous grade, a pass/no pass grade, a degree, a measure, a comparison, and so forth. For example, the quality indication may comprise an indication of a durability of the concrete. In another example, the quality indication may comprise an indication of strength of the concrete. In yet another example, the quality indication may comprise an estimate of a result of a compressive strength test conducted after a selected curing time (such as 28 days, 30 days, 56 days, 60 days, one month, two months, and so forth). In another example, the quality indication may comprise an estimate of a result of a water permeability test. In yet another example, the quality indication may comprise an estimate of a result of a rapid chloride ion penetration test. In another example, the quality indication may comprise an estimate of a result of a water absorption test. In yet another example, the quality indication may comprise an estimate of a result of an initial surface absorption test. In some examples, the image data may be analyzed to identify a condition of the concrete, for example where the condition of the concrete may comprise at least one of segregation of the concrete, discoloration of the concrete, scaling of the concrete, crazing of the concrete, cracking of the concrete, and curling of the concrete. Further, the determination of the quality indication may be based, at least in part, on the identified condition of the concrete.

In some embodiments, Step 730 may analyze the image data using an inference model to determine quality indications associated with concrete. For example, the inference model may be a result of a machine learning and/or deep learning algorithm trained on training examples. A training example may comprise example images and/or image regions depicting concrete together with desired quality indications. The machine learning and/or deep learning algorithms may be trained using the training examples to generate an inference model that automatically produced quality indications from images of concrete. In some examples, the training examples may comprise images of concrete together with a measure of the durability of the concrete and/or a measure of the strength of the concrete (for example as determined by a test conducted on the concrete after the image was captured, as determined by a test conducted on a sample of the concrete, as determined by an expert, etc.), and the machine learning and/or deep learning algorithms may be trained using the training examples to generate an inference model that automatically produce a measure of the durability of the concrete and/or a measure of the strength of the concrete from images of concrete. In some examples, the training examples may comprise images of concrete together with a result of a test conducted on the concrete after the image was captured or on a sample of the concrete (such as compressive strength test, water permeability test, rapid chloride ion penetration test, water absorption test, initial surface absorption test, etc.), and the machine learning and/or deep learning algorithms may be trained using the training examples to generate an inference model that automatically estimate the result of the test from images of concrete. The above tests may be performed after a selected curing time of the concrete, such as a day, 36 hours, a week, 28 days, a month, 60 days, less than 30 days, less than 60 days, less than 90 days, more than 28 days, more than 56 days, more than 84 days, any combinations of the above, and so forth. In some examples, the training examples may comprise images of concrete together with a label indicating a condition of the concrete (such as ordinary condition, segregation of the concrete, discoloration of the concrete, scaling of the concrete, crazing of the concrete, cracking of the concrete, curling of the concrete, etc.), the machine learning and/or deep learning algorithms may be trained using the training examples to generate an inference model that automatically identify the condition of concrete from images of concrete, and the quality indications may comprise the automatically identified condition of the concrete and/or information based (at least in part) on the automatically identified condition of the concrete.

In some embodiments, Step 730 may analyze the image data using heuristic rules to determine quality indications associate with concrete. In some examples, histograms based, at least in part, on the image data and/or regions of the image data may be generated. For example, such histograms may comprise histograms of pixel colors, of gray scale values, of image gradients, of image edges, of image corners, of low level image features, and so forth. Further, heuristic rules may be used to analyze the histograms and determine quality indications associate with concrete. For example, a heuristic rule may specify thresholds for different bins of the histogram, and the heuristic rule may determine the quality indications associate with concrete based, at least in part, on a comparison of the histogram bin values with the corresponding thresholds, for example by counting the number of bin values that exceed the corresponding threshold. In some examples, the above thresholds may be selected based, at least in part, on the type of concrete surface (for example as determined by Step 720), for example using one set of threshold values for walls, a second set of threshold values for ceilings, a third set of threshold values for stairs, and so forth.

In some embodiments, selecting a threshold (Step 740) may comprise using the object type of an object (for example, the object of Step 720) to select a threshold. For example, in response to a first object type, a first threshold value may be selected, and in response to a second object type, a second threshold value different from the first threshold value may be selected. For example, a lookup table (for example in a database) may be used to select a threshold according to an object type. In another example, a regression model configured to take as input properties of the object type and calculate a threshold value using the properties of the object type may be used to select a threshold according to an object type.

In some examples, the selection of the threshold by Step 740 may be based, at least in part, on quality indications associated with other objects. For example, the threshold may be selected to be a function of the quality indications associated with the other objects, such as mean, median, mode, minimum, maximum, value that cut the quality indications associated with the other objects to two groups of selected sizes, and so forth. In another example, a distribution of the quality indications associated with other objects may be estimated (for example, using a regression model, using density estimation algorithms, and so forth), and the threshold may be selected to be a function of the estimated distribution, such as mean, median, standard deviation, variance, coefficient of variation, coefficient of dispersion, a parameter of the beta-binomial distribution, a property of the distribution (such as a moment of the distribution), any function of the above, and so forth. For example, the distribution may be estimated to as a beta-binomial distribution, a Wallenius' noncentral hypergeometric distribution, and so forth.

In some examples, the selection of the threshold by Step 740 may be based, at least in part, on a construction plan associated with the construction site. For example, the construction plan may be analyzed to identify minimal quality indication requirements for one or more objects made of concrete, and the threshold may be selected accordingly. In one example, the minimal quality indication requirement may be specified in the construction plan, may be a requirement (such as a legal requirement, an ordinance requirement, a regulative requirement, an industry standard requirement, etc.) due to a specific object or configuration in the construction plan, and so forth.

In some examples, the object may be within a floor, and the selection of the threshold by Step 740 may be based, at least in part, on the floor. For example, the selection of the threshold may be based, at least in part, on the floor number, the floor height, properties of the floor, and so forth. For example, for an object positioned in a specified floor, a first threshold may be selected, while for an identical or similar object positioned in a different specified floor, a second threshold different from the first threshold may be selected. Further, the object may be within a building with a number of floors, and the selection of the threshold by Step 740 may be based, at least in part, on the number of floors, on the build height, on properties of the building, and so forth. For example, for an object positioned in a specified building, a first threshold may be selected, while for an identical or similar object positioned in a different specified building, a second threshold different from the first threshold may be selected. For example, a lookup table (for example in a database) may be used to select a threshold according to properties associated with the floor and/or the building. In another example, a regression model configured to take as input properties of the floor and/or the building and calculate a threshold value using the properties of the floor and/or the building type may be used to select a threshold according to the floor and/or the building.

In some examples, the selection of the threshold by Step 740 may be based, at least in part, on a beam span. For example, for an object associated with a first beam span, a first threshold may be selected, while for an identical or similar object associated with a second beam span, a second threshold different from the first threshold may be selected. For example, the beam span may be compared with a selected length, and the selection of the threshold may be based, at least in part, on a result of the comparison. In another example, a regression model configured to take as input beam span and calculate a threshold value using the beam span may be used to select a threshold according to the beam span.

In some examples, when the object is a wall of a stairway, the threshold may be selected by Step 740 to be a first value, and when the object is a wall not in a stairway, the threshold may be selected by Step 740 to be a value different than the first value. In some examples, when the object is part of a lift shaft, the threshold may be selected by Step 740 to be a first value, and when the object is not part of a lift shaft, the threshold may be selected by Step 740 to be a value different than the first value.

In some examples, the selection of the threshold by Step 740 may be based, at least in part, on multiple factors. For example, a baseline threshold may be selected according to an object type as described above. Further, in some examples the threshold may be increased or decreased (for example, by adding or subtracting a selected value, by multiplying by a selected factor, and so forth) according to at least one of quality indications associated with other objects in the construction site, a construction plan associated with the construction site, the floor (for example, properties of the floor as described above), the building (for example, properties of the building as described above), and so forth.

In some embodiments, Step 750 may comprise comparing the quality indication with the selected threshold. For example, a difference between a value of the quality indication and the selected threshold may be calculated. In another example, it may be determined whether the quality indication is higher than the selected threshold or not. In some examples, an action may be performed based on a result of the comparison of the quality indication with the selected threshold. For example, in response to a first result of the comparison, an action may be performed, and in response to a second result of the comparison, the performance of the action may be forgone. In another example, in response to a first result of the comparison, a first action may be performed, and in response to a second result of the comparison, a second action (different from the first action) may be performed. Some non-limiting examples of such actions may include providing an indication to a user (as described below in relation to Step 760), updating an electronic record (for example as described below in relation to Step 1130), and so forth.

In some embodiments, Step 760 may comprise providing an indication to a user, for example based, at least in part, on the quality indication (from Step 730) and/or the selected threshold (from Step 740) and/or the result of the comparison of the quality indication with the selected threshold (from Step 750). For example, in response to a first result of the comparison, an indication may be provided to the user, and in response to a second result of the comparison, the providence of the indication may be forgone. In another example, in response to a first result of the comparison, a first indication may be provided to the user, and in response to a second result of the comparison, a second indication (different from the first indication) may be provided to the user. In some examples, the provided indication may comprise a presentation of at least part of the image data with an overlay presenting information based, at least in part, on the quality indication (for example, using a display screen, an augmented reality display system, a printer, and so forth). In some examples, indications may be provided to the user when a quality indication fails to meet some selected criterions, when a quality indication do meet some selected criterions, and so forth. In some examples, the nature and/or content of the indication provided to the user may depend on the quality indication and/or the region of the image corresponding to the quality indications and/or the objects corresponding to the quality indications and/or properties of the objects (such as position, size, color, object type, and so forth) corresponding to the quality indications. In some examples, the indications provided to the user may be provided as a: visual output, audio output, tactile output, any combination of the above, and so forth. In some examples, the amount of indications provided to the user, the events triggering the indications provided to the user, the content of the indications provided to the user, the nature of the indications provided to the user, etc., may be configurable. The indications provided to the user may be provided: by the apparatus detecting the events, through another apparatus (such as a mobile device associated with the user, mobile phone 111, tablet 112, and personal computer 113, etc.), and so forth.

In some embodiments, Step 720 may identify a plurality of regions depicting concrete in the image data obtained by Step 710. For each identified region, Step 730 may determine quality indications for the concrete depicted in the region. The quality indications of the different regions may be compared, and information may be presented to a user based, at least in part, on the result of the comparison, for example as described below. For example, Step 710 may obtain an image of a staircase made of concrete, Step 720 may identify a region for each stair, Step 730 may assign quality measure for the concrete of each stair, the stair corresponding to the lowest quality measure may be identified, and the identified lowest quality measure may be presented to the user, for example as an overlay next to the region of the stair in the image. In another example, Step 710 may obtain a 360 degrees image of a room made of concrete, Step 720 may identify a region for each wall, Step 730 may assign quality measure for the concrete of each wall, the wall corresponding to the lowest quality measure may be identified, and the identified lowest quality measure may be presented to the user, for example as an overlay on the region of the wall in the image. In yet another example, Step 710 may obtain video depicting concrete pillars, Step 720 may identify a frame and/or a region for each pillar, Step 730 may assign quality measure for the concrete of each pillar, a selected number of pillars corresponding to the highest quality measures may be identified, and the identified highest quality measures and/or corresponding pillars may be presented to the user.

In some embodiments, Step 720 may identify a region depicting concrete in the image data obtained by Step 710, and Step 730 may determine quality indications for the concrete depicted in the region. The quality indications may be compared with selected thresholds, and information may be presented to a user based, at least in part, on the result of the comparison, for example as described below. In some examples, the above thresholds may be selected based, at least in part, on the type of concrete surface (such as an object type, for example as determined by Step 720), for example using one thresholds for wall, a second threshold for ceilings, a third threshold for stairs, and so forth. For example, a quality indication may comprise a measure of the durability of the concrete and/or a measure of the strength of the concrete, the quality indication may be compared with a threshold corresponding to a minimal durability requirement and/or a minimal strength requirement, and an indication may be provided to the user when the measure of durability and/or the measure of strength does not meet the minimal requirement. In another example, a quality indication may comprise an estimated result of a test (such as compressive strength test, water permeability test, rapid chloride ion penetration test, water absorption test, initial surface absorption test, etc.), the quality indication may be compared with a threshold corresponding to minimal requirement (for example according to a standard or regulation), and an indication may be provided to the user when the estimated result of the test does not meet the minimal requirement.

Figure 8:
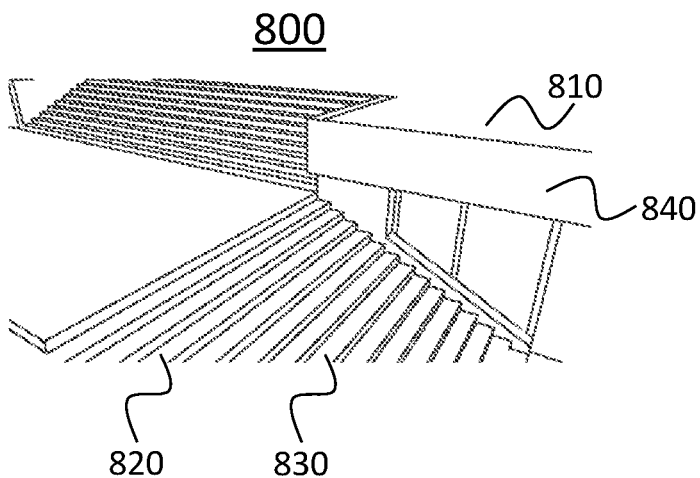
FIG. 8 is a schematic illustration of an example image captured by an apparatus consistent with an embodiment of the present disclosure.

FIG. 8 is a schematic illustration of example image 800 captured by an apparatus, such as apparatus 200. Image 800 may depict some objects made of concrete, such as surface 810, stair 820, stair 830, and wall 840. Method 700 may obtain image 800 using Step 710. As described above, Step 720 may identify regions of image 800 depicting objects made of concrete, such as concrete surface 810, concrete stair 820, concrete stair 830, and concrete wall 840. As described above, Step 730 may determine quality indications associated with concrete surface 810, concrete stair 820, concrete stair 830, and concrete wall 840. Information may be provided to a user based, at least in part, on the identified regions and/or determined quality indications. For example, image 800 may be presented to a user with an overlay specifying the identified regions and/or determined quality indications. Further, the determined quality indications may be compared with selected thresholds, and based on the results of the comparisons, some information may be omitted from the presentation, some information may be presented using first presentation settings (such as font type, font color, font size, background color, emphasis, contrast, transparency, etc.) while other information may be presented using other presentation settings, and so forth. In addition or alternatively to the presentation of image 800, a textual report specifying the identified regions and/or determined quality indications may be provided to the user.

Figure 9:
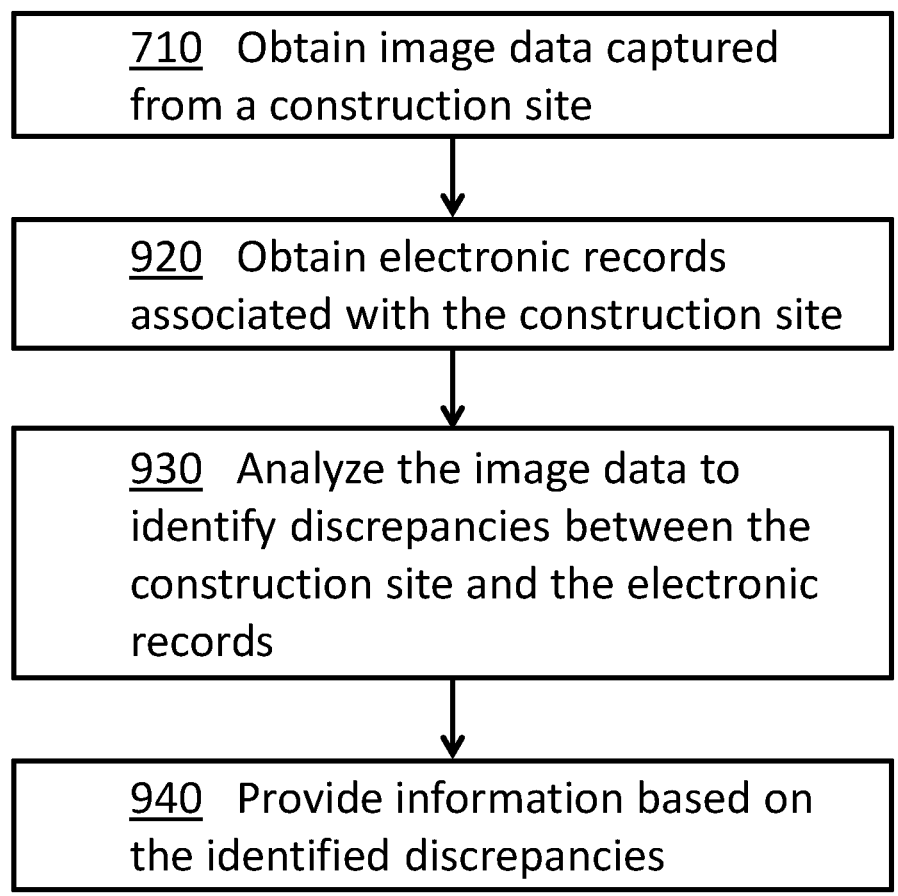
FIG. 9 illustrates an example of a method for providing information based on construction site images.

FIG. 9 illustrates an example of a method 900 for providing information based on construction site images. In this example, method 900 may comprise: obtaining image data captured from a construction site (Step 710), obtaining electronic records associated with the construction site (Step 920), analyzing the image data to identify discrepancies between the construction site and the electronic records (Step 930), and providing information based on the identified discrepancies (Step 940). In some implementations, method 900 may comprise one or more additional steps, while some of the steps listed above may be modified or excluded. For example, Step 940 may be excluded from method 900. In some implementations, one or more steps illustrated in FIG. 9 may be executed in a different order and/or one or more groups of steps may be executed simultaneously and vice versa. For example, Step 920 may be executed before and/or after and/or simultaneously with Step 710, Step 930 may be executed after and/or simultaneously with Step 710 and/or Step 920, Step 940 may be executed after and/or simultaneously with Step 930, and so forth.

In some embodiments, in Step 920 at least one electronic record associated with a construction site may be obtained. For example, the at least one electronic record obtained by Step 920 may comprise information related to objects associated with the construction site, such as objects database 605. In some examples, Step 920 may comprise obtaining at least one electronic construction plan associated with the construction site, for example from construction plans 610. In some examples, Step 920 may comprise obtaining at least one electronic as-built model associated with the construction site, for example from as-built models 615. In some examples, Step 920 may comprise obtaining at least one electronic project schedule associated with the construction site, for example from project schedules 620. In some examples, Step 920 may comprise obtaining at least one electronic financial record associated with the construction site, for example from financial records 625. In some examples, Step 920 may comprise obtaining at least one electronic progress record associated with the construction site, for example from progress records 630. In some examples, Step 920 may comprise obtaining information related to at least one safety issue associated with the construction site, for example from safety records 635. In some examples, Step 920 may comprise obtaining information related to at least one construction error associated with the construction site, for example from construction errors 640.

In some examples, Step 920 may comprise receiving the at least one electronic record associated with a construction site using one or more communication devices, such as communication modules 230, internal communication modules 440, external communication modules 450, and so forth. In some examples, Step 920 may comprise reading the at least one electronic record associated with a construction site from memory units, such as memory units 210, shared memory modules 410, and so forth. In some examples, Step 920 may comprise obtaining information related to at least one object associated with the construction site, for example from objects database 605, by analyzing image data depicting the object in the construction site (for example using Step 1120 as described below), by analyzing electronic records comprising information about the object as described below, and so forth. In some examples, Step 920 may comprise creating the at least one electronic record associated with a construction site, for example by using any the methods described herein. For example, electronic records comprising information related to objects in the construction site and made of concrete may be obtained by using method 700. In another example, electronic records comprising information related to discrepancies between the construction site and other electronic records may be obtained by using method 900. In yet another example, electronic records comprising information related to objects in the construction site may be obtained by using method 1100.

In some embodiments, Step 930 may analyze image data captured from a construction site (such as image data captured from the construction site using at least one image sensor and obtained by Step 710) to identify at least one discrepancy between at least one electronic record associated with the construction site (such as the at least one electronic record obtained by Step 920) and the construction site. In some examples, Step 930 may analyze the at least one electronic record and/or the image data using a machine learning model trained using training examples to identify discrepancies between the at least one electronic record and the construction site. For example, a training example may comprise an electronic record and image data with a corresponding label detailing discrepancies between the electronic record and the construction site. In some examples, Step 930 may analyze the at least one electronic record and the image data using an artificial neural network configured to identify discrepancies between the at least one electronic record and the construction site.

In some examples, when the at least one electronic record comprises a construction plan associated with the construction site (such as construction plan 610, construction plan obtained by Step 920, etc.), Step 930 may identify at least one discrepancy between the construction plan and the construction site. For example, Step 930 may analyze the construction plan and/or the image data to identify an object in the construction plan that does not exist in the construction site, to identify an object in the construction site that does not exist in the construction plan, to identify an object that has a specified location according to the construction plan and is located at a different location in the construction site (for example, to identify an object for which the discrepancy between the location according to the construction plan and the location in the construction site is above a selected threshold), to identify an object that should have a specified property according to the construction plan but has a different property in the construction site (some non-limiting examples of such property may include type of the object, location of the object, shape of the object, dimensions of the object, color of the object, manufacturer of the object, type of elements in the object, setting of the object, technique of installation of the object, orientation of the object, time of object installment, etc.), to identify an object that should be associated with a specified quantity according to the construction plan but is associated with a different quantity in the construction site (some non-limiting examples of such quantities may include size of the object, dimensions of the object, number of elements in the object, etc.), and so forth. For example, the image data may be analyzed to detect objects and/or to determine properties of the detected objects (for example, using Step 1120 as described below), the detected objects may be searched in the construction plan (for example using the determined properties), and Step 930 may identify objects detect in the image data that are not found in the construction plan as a discrepancies. In another example, the construction plan may be analyzed to identify objects and/or properties of the identified objects, the identified objects may be searched in the image data (for example, as described above, using the identified properties, etc.), and Step 930 may identify objects identified in the construction plan that are not found in the image data as discrepancies. In yet another example, objects found both in the image data (for example, as described above) and in the construction plan (for example, as described above) may be identified, and Step 930 may compare properties of the identified objects in the image data (for example, determined as described above) with properties of the identified objects in the construction plan to identify discrepancies. Some non-limiting examples of such properties may include location of the object, quantity associated with the object (as described above), type of the object, shape of the object, dimensions of the object, color of the object, manufacturer of the object, type of elements in the object, setting of the object, technique of installation of the object, orientation of the object, time of object installment, and so forth.

In some examples, when the at least one electronic record comprises a project schedule associated with the construction site (such as project schedule 620, project schedule obtained by Step 920, etc.), Step 930 may identify at least one discrepancy between the project schedule and the construction site. For example, the image data may be associated with time (for example, the capturing time of the image data, the receiving time of the image data, the time of processing of the image data, etc.), and Step 930 may identify at least one discrepancy between a desired state of the construction site at the associated time according to the project schedule and the state of the actual construction site at the associated time as depicted in the image data. For example, the project schedule and/or the image data may be analyzed to identify an object in the construction site at a certain time that should not be in the construction site at the certain time according to the project schedule, to identify an object that should be in the construction site at a certain time according to the project schedule that is not in the construction site at the certain time, to identify an object in the construction site that is in a first state at a certain time that should be in a second state at the certain time according to the project schedule (where the first state may differ from the second state, where the difference between the first state and the second state is at least a select threshold, etc.), and so forth. In some examples, the analysis of the construction plan and/or the image data to identify discrepancy between the construction plan and the construction site (for example, as described above) may use information from the project schedule to determine which discrepancies between the construction plan and the construction site are of importance at a selected time according to the project schedule, to determine which discrepancies between the construction plan and the construction site are expected (and therefore should be, for example, ignored, treated differently, etc.) at a selected time according to the project schedule, to determine which discrepancies between the construction plan and the construction site are unexpected at a selected time according to the project schedule, and so forth.

In some examples, when the at least one electronic record comprises a financial record associated with the construction site (such as financial records 625, financial records obtained by Step 920, etc.), Step 930 may identify at least one discrepancy between the financial record and the construction site. For example, the financial records and/or the image data may be analyzed to identify an object in the construction site that should not be in the construction site according to the financial record (for example, an object that was not paid for, was not ordered, that it's rental have not yet begun or have already ended, that is associated with an entity that should not be in the construction site according to the financial records, etc.), to identify an object that should be in the construction site according to the financial records that is not in the construction site (for example, an object that according to the financial records was paid for, was ordered, was delivered, was invoiced, was installed, is associated with an entity that should be in the construction site according to the financial records, etc.), to identify an object in the construction site that is in a first state at a certain time that should be in a second state at the certain time according to the financial records (for example, where the first state may differ from the second state, where the difference between the first state and the second state is at least a select threshold, etc., for example, where the work for changing the state of the object to the second state was ordered, was billed, was paid for, etc.), and so forth. In some examples, the analysis of the construction plan and/or the image data to identify discrepancy between the construction plan and the construction site (for example, as described above) may use information from the financial records to determine which discrepancies between the construction plan and the construction site are of importance at a selected time according to the financial records (for example, have financial impact that is beyond a selected threshold), to determine which discrepancies between the construction plan and the construction site are not accurately reflected in the financial records, and so forth. In some examples, the analysis of the progress record and/or the image data to identify discrepancy between the progress record and the construction site (for example, as described below) may use information from the financial records to determine which discrepancies between the progress record and the construction site are of importance at a selected time according to the financial records (for example, have financial impact that is beyond a selected threshold), to determine which discrepancies between the progress record and the construction site are not accurately reflected in the financial records, and so forth.

In some examples, when the at least one electronic record comprises a progress record associated with the construction site (such as progress records 630, progress records obtained by Step 920, etc.), Step 930 may identify at least one discrepancy between the progress record and the construction site. For example, the progress records and/or the image data may be analyzed to identify an object in the construction site that should not be in the construction site according to the progress record, to identify an object that should be in the construction site according to the progress records that is not in the construction site, to identify an object in the construction site that is in a first state that should be in a second state according to the progress records (for example, where the first state may differ from the second state, where the difference between the first state and the second state is at least a select threshold, etc.), to identify an action that is not reflected in the image data but that is reported as completed in the progress record, to identify an action that is reflected in the image data but is not reported as completed in the progress record, and so forth. In some examples, the analysis of the construction plan and/or the image data to identify discrepancy between the construction plan and the construction site (for example, as described above) may use information from the progress records to determine which discrepancies between the construction plan and the construction site are in contradiction to the information in the progress records, to determine which discrepancies between the construction plan and the construction site are correctly reflected at a selected time in the progress records, and so forth.

In some examples, when the at least one electronic record comprises an as-built model associated with the construction site (such as as-built model 615, as-built model obtained by Step 920, etc.), Step 930 may identify at least one discrepancy between the as-built model and the construction site. For example, Step 930 may analyze the as-built model and/or the image data to identify an object in the as-built model that does not exist in the construction site, to identify an object in the construction site that does not exist in the as-built model, to identify an object that has a specified location according to the as-built model and is located at a different location in the construction site (for example, to identify an object for which the discrepancy between the location according to the as-built model and the location in the construction site is above a selected threshold), to identify an object that should have a specified property according to the as-built model but has a different property in the construction site (some non-limiting examples of such property may include type of the object, location of the object, shape of the object, dimensions of object, color of the object, manufacturer of the object, type of elements in the object, setting of the object, technique of installation of the object, orientation of the object, time of object installment, etc.), to identify an object that should be associated with a specified quantity according to the as-built model but is associated with a different quantity in the construction site (some non-limiting examples of such quantities may include size of the object, length of the object, number of elements in the object, etc.), and so forth.

In some embodiments, Step 940 may provide information (for example, to a user, to another process, to an external device, etc.) based, at least in part, on the at least one discrepancy identified by Step 930. For example, in response to a first identified discrepancy, Step 940 may provide information (for example, to a user, to another process, to an external device, etc.), and in response to a second identified discrepancy, the providence of the information by Step 940 may be forgone. In another example, in response to a first identified discrepancy, Step 940 may provide first information, and in response to a second identified discrepancy, Step 940 may provide second information, different from the first information, for example, to a user, to another process, to an external device, and so forth. In some examples, Step 940 may provide information to a user as a visual output, audio output, tactile output, any combination of the above, and so forth. For example, Step 940 may provide the information to the user: by the apparatus analyzing the information (for example, an apparatus performing at least part of Step 930), through another apparatus (such as a mobile device associated with the user, mobile phone 111, tablet 112, and personal computer 113, etc.), and so forth. For example, the amount of information provided by Step 940, the events triggering the providence of information by Step 940, the content of the information provided by Step 940, and the nature of the information provided by Step 940 may be configurable.

In some examples, Step 940 may present a presentation of at least part of the image data with an overlay presenting information based, at least in part, on the at least one discrepancy identified by Step 930 (for example, using a display screen, an augmented reality display system, a printer, and so forth). For example, objects corresponding to the identified discrepancies may be marked by an overlay. In another example, information related to properties of the identified discrepancies may be presented in conjunction with the depiction of the objects corresponding to the identified discrepancies in the image data. For example, an overlay presenting desired dimensions of an object (such as a room, a wall, a doorway, a window, a tile, an electrical box, etc.) may be presented over a depiction of the object, for example as textual information specifying the desired dimensions and/or the actual dimensions, as a line or a shape demonstrating the desired dimensions, and so forth. In another example, an overlay presenting desired location of an object (such as a doorway, an electrical box, a pipe, etc.) may be presented in conjunction with a depiction of the object, for example as an arrow pointing from the depiction of the object to the correct location, as a marker marking the correct location, as textual information detailing the offset in object location, and so forth. In yet another example, an overlay presenting a desired object missing from the construction site may be presented over the image data, for example in or next to the desired location for the object, with an indication of the type and/or properties of the desired object, and so forth. In another example, an overlay marking an object in the construction site that should not be in the construction site may be presented over or next to the depiction of the object, for example including an X or a similar mark over the object, including textual information explaining the error, and so forth. In yet another example, an overlay marking an object in the construction site that has properties different from some desired properties may be presented over or next to the depiction of the object, for example including a marking of the object, including textual information detailing the discrepancies in properties, and so forth.

In some examples, Step 940 may present a visual presentation of at least part of a construction plan with markings visually presenting information based, at least in part, on the at least one discrepancy identified by Step 930 (for example, using a display screen, an augmented reality display system, a printer, and so forth). For example, objects corresponding to the identified discrepancies may be marked in the displayed construction plan. In another example, information related to properties of the identified discrepancies may be presented in conjunction with the depiction of the objects corresponding to the identified discrepancies in the construction plan. In yet another example, information may be presented as an overlay over the presentation of the construction plan, for example in similar ways to the overlay over the image data described above.

In some examples, Step 940 may present a visual presentation of at least part of a project schedule with markings visually presenting information based, at least in part, on the at least one discrepancy identified by Step 930 (for example, using a display screen, an augmented reality display system, a printer, and so forth). For example, tasks in the project schedules corresponding to the identified discrepancies may be marked in the displayed project schedule. Moreover, information about the identified discrepancies may be displayed in conjunction with the marked tasks. For example, the information about the identified discrepancies may be displayed in conjunction to the marked task and may include an amount of actual delay, an amount of predicted future delay, an amount of advance, construction errors associated with the task, and so forth.

In some examples, Step 940 may present a visual presentation of at least part of a financial record with markings visually presenting information based, at least in part, on the at least one discrepancy identified by Step 930 (for example, using a display screen, an augmented reality display system, a printer, and so forth). For example, items in the financial records (such as payments, orders, bills, deliveries, invoices, purchase orders, etc.) corresponding to the identified discrepancies may be marked in the displayed financial record. Moreover, information about the identified discrepancies may be displayed in conjunction with the marked items. For example, the information about the identified discrepancies may be displayed in conjunction to the marked item and may include an amount of budget overrun, an amount of predicted future budget overrun, a financial saving, an inconsistency in dates associated with the item, and so forth.

In some examples, Step 940 may present a visual presentation of at least part of a progress record with markings visually presenting information based, at least in part, on the at least one discrepancy identified by Step 930 (for example, using a display screen, an augmented reality display system, a printer, and so forth). For example, items in the progress record corresponding to the identified discrepancies may be marked in the displayed progress record. Some non-limiting examples of such items may include an action that is not reflected in the image data but that is reported as completed in the progress record, an action that is reflected in the image data but is not reported as completed in the progress record, and so forth. Moreover, information about the identified discrepancies may be displayed in conjunction with the marked items.

In some examples, Step 940 may present a visual presentation of at least part of an as-built model with markings visually presenting information based, at least in part, on the at least one discrepancy identified by Step 930 (for example, using a display screen, an augmented reality display system, a printer, and so forth). For example, objects corresponding to the identified discrepancies may be marked in the displayed as-built model. In another example, information related to properties of the identified discrepancies may be presented in conjunction with the depiction of the objects corresponding to the identified discrepancies in the as-built model. In yet another example, information may be presented as an overlay over the presentation of the as-built model, for example in similar ways to the overlay over the image data described above.

In some examples, the information provided by Step 940 may comprise safety data. For example, the at least one electronic record associated with a construction site obtained by Step 920 may comprise safety requirements associated with the construction site. Further, Step 930 may analyze image data captured from a construction site (such as image data captured from the construction site using at least one image sensor and obtained by Step 710) to identify at least one discrepancy between the safety requirements associated with the construction site and the construction site. Further, Step 940 may provide information based, at least in part, on the at least one discrepancy between the safety requirements and the construction site identified by Step 930. For example, a type of scaffolds to be used (for example, at a specified location at the construction site) may be detailed in the safety requirements, while a different type of scaffolds (for example, less safe, incompatible, etc.) may be used in the construction site, as depicted in the image data and identified by Step 930. Further, in response to the identification of the usage of the different type of scaffolds by Step 930, Step 940 may provide information about the usage of a type of scaffolds incompatible with the safety requirements, may visually indicate the location of the incompatible scaffolds (for example, in the image data, in a construction plan, in an as-built model, etc.), and so forth.

In some examples, Step 930 may analyze image data (such as image data captured from the construction site using at least one image sensor and obtained by Step 710) and/or electronic records (such as the at least one electronic record associated with a construction site obtained by Step 920) to compute a measure of the at least one discrepancy identified by Step 930. For example, Step 930 may analyze the image data and/or the electronic records using an artificial neural network configured to compute measures of the discrepancies from image data and/or electronic records. In another example, Step 930 may analyze the image data and/or the electronic records using a machine learning model trained using training examples to compute measures of the discrepancies from image data and/or electronic records. Further, the computed measure of a discrepancy may be compared with a selected threshold, and based on a result of the comparison, providing the information related to the discrepancy by Step 940 may be withheld. For example, in response to a first result of the comparison, Step 940 may provide the information, while in response to a second result of the comparison, providing the information may be delayed and/or forgone. For example, the at least one discrepancy identified by Step 930 may comprise a discrepancy in a position of an object between a construction plan and the construction site, the measure may include a length between the position according to the construction plan and the position in the construction site, and the threshold may be selected according to a legal and/or a contractual obligation associated with the construction site. In another example, the at least one discrepancy identified by Step 930 may comprise a discrepancy in a quantity associated with an object (some non-limiting examples of such quantity may include size of the object, length of the object, dimensions of a room, number of elements in the object, etc.) between a construction plan and the construction site, the measure may include a difference between the quantity according to the construction plan and the quantity in the construction site, and the threshold may be selected according to a regulatory and/or a contractual obligation associated with the construction site. In yet another example, the at least one discrepancy identified by Step 930 may comprise a discrepancy in a time that an object is installed between a planned time of installation according to a project schedule and the actual time of installation in construction site according to the image data, the measure may include a length of the time difference, and the threshold may be selected according to at least one float (the amount of time that a task in a project schedule can be delayed without causing a delay) associated with the task comprising the installation of the object in the project schedule. In another example, the at least one discrepancy identified by Step 930 may comprise a discrepancy between a status of a task according to progress records and the status of the task in the construction site, and the measure may include a difference in the amount of units handled in the task (area covered in plaster, area covered with tiles, number of electrical boxes installed, etc.) between the amount according to progress records and the amount in the construction site according to the image data.

Consistent with the present disclosure, image data (such as image data captured from the construction site using at least one image sensor and obtained by Step 710) may be analyzed to detect at least one object in the construction site, for example as described below in relation with Step 1120. Further, the image data may be analyzed to identify at least one property of the at least one object (such as position, size, color, object type, etc.), for example as described below in relation with Step 1120. In some examples, Step 940 may further provide information based on the at least one property. For example, providing the information may be further based on at least one position associated with the at least one object (such as, an actual position of the object in the construction site, a position of a depiction of the object in the image data, a planned position for the object according to a construction plan, etc.), for example by providing to the user an indicator of the position, for example, as a set of coordinates, as an indicator on a map, as an indicator on a construction plan, as an indicator in an overlay over a presentation of the image data, and so forth. In another example, providing the information may be further based on a property of the object (such as size, color, object type, quality, manufacturer, volume, weight, etc.), for example by presenting the value of the property as measured from the image data, by presenting the planned and/or required value (or range of values) for the property according to the electronic records (for example, construction plan, financial records showing the manufacturer, as-built model, etc.), by presenting the difference between the two, and so forth.

In some examples, the image data (such as image data captured from the construction site using at least one image sensor and obtained by Step 710) may comprise one or more indoor images of the construction site, the at least one object detected by Step 1120 may comprise a plurality of tiles paving an indoor floor, the at least one property determined by Step 1120 may comprise a number of tiles in the construction site according to the image data, the discrepancy identified by Step 930 may comprise a discrepancy between the number of tiles in the construction site according to the image data and the planned number of tiles according to the electronic records, and the information provided by Step 940 may comprise an indication about the discrepancy between the number of tiles in the construction site and the at least one electronic record. For example, the electronic record may comprise financial records comprising a number of tiles that were billed for, a number of tiles that were paid for, a number of tiles that were ordered, and so forth. In another example, the electronic record may comprise a construction plan comprising a planned number of tiles. In yet another example, the electronic record may comprise a progress record comprising the number of tiles that were reported as installed in the construction site.

Consistent with the present disclosure, image data (such as image data captured from the construction site using at least one image sensor and obtained by Step 710) may be analyzed to identify at least one construction error, for example using Step 1120 as described below. Further, Step 940 may provide an indication of the at least one construction error, for example as described above. For example, an image depicting the construction error may be presented to a user, for example with a visual indicator of the construction error. In another example, the location of the construction error may be indicated on a map, on a construction plan, on an as-build model, and so forth. In yet another example, textual information describing the construction error may be presented to the user. In some examples, the image data and/or the electronic records may be further analyzed to identify a type of the at least one construction error. For example, the image data may be analyzed using a machine learning model trained using training examples to determine type of construction errors from images and/or electronic records. In another example, the image data may be analyzed using an artificial neural network configured to determine a type of construction errors from images and/or electronic records. Further, based, at least in part, on the identified type of the at least one construction error, Step 940 may forgo and/or withhold providing at least part of the information. For example, in response to a first identified type of the at least one construction error, information may be provided to the user, and in response to a second identified type of the at least one construction error, Step 940 may forgo providing the information. In another example, in response to a first identified type of the at least one construction error, Step 940 may provide first information to the user, and in response to a second identified type of the at least one construction error, Step 940 may provide second information different from the first information to the user. In some examples, the image data may be further analyzed to determine a severity associated with the at least one construction error. For example, the image data and/or the electronic records may be analyzed using a machine learning model trained using training examples to determine severity of construction errors from images and/or electronic records. In another example, the image data may be analyzed using an artificial neural network configured to determine a severity of construction errors from images and/or electronic records. Further, based, at least in part, on the determined severity, Step 940 may forgo and/or withhold providing at least part of the information. For example, in response to a first determined severity, Step 940 may provide information to the user, and in response to a second determined severity, Step 940 may forgo providing the information. In another example, in response to a first determined severity, Step 940 may provide first information to the user, and in response to a second determined severity, Step 940 may provide second information different from the first information to the user.

Consistent with the present disclosure, position data associated with at least part of the image data may be obtained, for example as described above with relation to Step 710. Further, Step 940 may provide information based, at least in part, on the obtained position data. For example, a portion of a construction plan and/or as-build model corresponding to the position data may be selected and presented to the user (for example, the position data may specify a room and the construction plan and/or as-build model for the room may be presented, the position data may specify coordinates and a portion of the construction plan and/or as-build model comprising a location corresponding to the specified coordinates may be presented, and so forth). In another example, objects associated with the position data (for example, according to a construction plan) may be selected, and Step 940 may present information related to the selected objects (for example, from objects database 605, construction plans 610, as-built models 615, project schedules 620, financial records 625, progress records 630, safety records 635, and construction errors 640, etc.) to the user.

Consistent with the present disclosure, time associated with at least part of the image data (such as capturing time, processing time, etc.) may be obtained. Further, Step 940 may provide information based, at least in part, on the obtained time. For example, Step 940 may present portions of a project schedule and/or progress records related to the obtained time. In another example, a project schedule and/or progress records may be analyzed to select objects related to the obtained time (for example, objects related to tasks that occur or should occur at or in proximity to the obtained time), and information related to the selected objects (for example, from objects database 605, construction plans 610, as-built models 615, project schedules 620, financial records 625, progress records 630, safety records 635, and construction errors 640, etc.) may be presented to the user.

Consistent with the present disclosure, the image data obtained by Step 710 may comprise at least a first image corresponding to a first point in time and a second image corresponding to a second point in time, and the elapsed time between the first point in time and the second point in time may be at least a selected duration (for example, at least an hour, at least one day, at least two days, at least one week, etc.). Further, Step 930 may analyze the image data for the identification of the at least one discrepancy by comparing the first image with the second image. For example, differences between the images may be identified with relation to a first object while no differences between the images may be identified with relation to a second object, and Step 930 may identify a discrepancy when a progress record does not specify any modification of the first object and/or when a progress record specifies modification of the second object. In another example, an identified difference may indicate that a new object was installed between the first point in time and the second point in time, and Step 930 may identify a discrepancy when a project schedule do not specify such installation in the corresponding time interval.

Consistent with the present disclosure, data based on image data captured from at least one additional construction site may be obtained. Further, Step 940 may provide information based, at least in part, on the obtained data, for example as described above. For example, information about the plurality of construction sites may be aggregated, as described below, statistics from the plurality of construction sites may be generated, and Step 940 may provide information based, at least in part, on the generated statistics to the user. In another example, information from one construction site may be compared with information from other construction sites, and Step 940 may provide information based, at least in part, on that comparison.

Figure 10A:
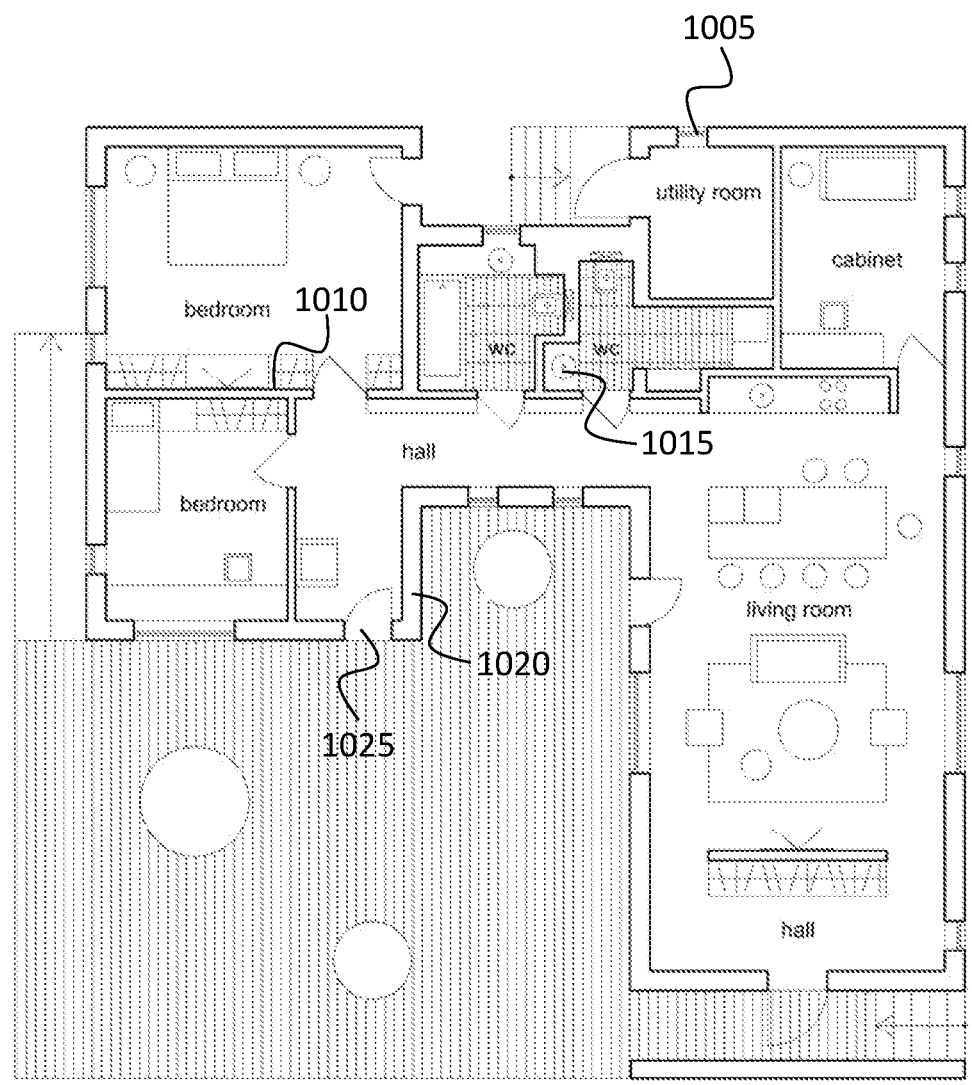
FIG. 10A is a schematic illustration of an example construction plan consistent with an embodiment of the present disclosure.

FIG. 10A is a schematic illustration of an example construction plan 1000 consistent with an embodiment of the present disclosure. For example, construction plan 1000 may be stored in construction plans 610. Construction plan 1000 may include plans of objects, such as window 1005, interior wall 1010, sink 1015, exterior wall 1020, and door 1025. As described above, Step 930 may identify discrepancies between the construction site and the construction plan.

In some examples, Step 930 may identify that window 1005 in the construction site is not according to construction plan 1000. For example, the position of window 1005 in the construction site may be not according to construction plan 1000. Further, the deviation in the position of window 1005 may be calculated. In another example, the size (such as height, width, etc.) of window 1005 in the construction site may be not according to construction plan 1000. Further, the deviation in the size of window 1005 may be calculated. In yet another example, materials and/or parts of window 1005 in the construction site may be not according to construction plan 1000. In another example, window 1005 may be missing altogether from the construction site, for example having a wall instead. In yet another example, window 1005 may exist in the construction site but be missing altogether from construction plan 1000. In some examples, the calculated deviation may be compared with a selected deviation threshold. In some examples, information may be provided to a user, for example using Step 940, based on the discrepancies between window 1005 in the construction site and construction plan 1000, based on the calculated deviation, based on a result of the comparison of the calculated deviation with the selected deviation threshold, and so forth.

In some examples, Step 930 may identify that interior wall 1010 in the construction site is not according to construction plan 1000. For example, the position of interior wall 1010 in the construction site may be not according to construction plan 1000 (and as a result, an adjacent room may be too small or too large). Further, the deviation in the position of interior wall 1010 and/or in the size of the adjacent rooms may be calculated. In another example, the size (such as height, width, thickness, etc.) of interior wall 1010 in the construction site may be not according to construction plan 1000. Further, the deviation in the size of interior wall 1010 may be calculated. In yet another example, materials and/or parts of interior wall 1010 in the construction site may be not according to construction plan 1000. In another example, interior wall 1010 may be missing altogether from the construction site, for example having two adjacent rooms connected. In yet another example, interior wall 1010 may exist in the construction site but be missing altogether from construction plan 1000, for example having a room split into two. In some examples, the calculated deviation may be compared with a selected deviation threshold. In some examples, information may be provided to a user, for example using Step 940, based on the discrepancies between interior wall 1010 in the construction site and construction plan 1000, based on the calculated deviation, based on a result of the comparison of the calculated deviation with the selected deviation threshold, and so forth.

In some examples, Step 930 may identify that sink 1015 in the construction site is not according to construction plan 1000. For example, the position of sink 1015 in the construction site may be not according to construction plan 1000. Further, the deviation in the position of sink 1015 may be calculated. In another example, the size of sink 1015 in the construction site may be not according to construction plan 1000. Further, the deviation in the size of sink 1015 may be calculated. In yet another example, materials and/or parts of sink 1015 in the construction site may be not according to construction plan 1000. In another example, sink 1015 may be missing altogether from the construction site. In yet another example, sink 1015 may exist in the construction site but be missing altogether from construction plan 1000. In some examples, the calculated deviation may be compared with a selected deviation threshold. In some examples, information may be provided to a user, for example using Step 940, based on the discrepancies between sink 1015 in the construction site and construction plan 1000, based on the calculated deviation, based on a result of the comparison of the calculated deviation with the selected deviation threshold, and so forth.

In some examples, Step 930 may identify that a pipe required for sink 1015 is implemented incorrectly in the construction site. For example, an end of the pipe may be in an incorrect position in the construction site according to the position of sink 1015 in construction plan 1000 Further, the deviation in the position of the end of the pipe may be calculated. In another example, the pipe in the construction site may be connected to a wrong water source according to construction plan 1000. In yet another example, the pipe may be missing altogether from the construction site. In yet another example, the pipe may exist in the construction site but be missing altogether from construction plan 1000. In some examples, the calculated deviation may be compared with a selected deviation threshold. In some examples, information may be provided to a user, for example using Step 940, based on the discrepancies between the pipe in the construction site and construction plan 1000, based on the calculated deviation, based on a result of the comparison of the calculated deviation with the selected deviation threshold, and so forth.

In some examples, Step 930 may identify that exterior wall 1020 in the construction site is not according to construction plan 1000. For example, the position of exterior wall 1020 in the construction site may be not according to construction plan 1000 (and as a result, an adjacent room may be too small or too large, connected wall may be too narrow or too wide, for example too narrow for door 1025, and so forth). Further, the deviation in the position of exterior wall 1020 and/or in the size of the adjacent room and/or in the size of connected walls may be calculated. In another example, the size (such as height, width, thickness, etc.) of exterior wall 1020 in the construction site may be not according to construction plan 1000. Further, the deviation in the size of exterior wall 1020 may be calculated. In yet another example, materials and/or parts of exterior wall 1020 in the construction site may be not according to construction plan 1000. In another example, exterior wall 1020 may be missing altogether from the construction site, for example having a room connected to the yard. In yet another example, exterior wall 1020 may exist in the construction site but be missing altogether from construction plan 1000, for example creating an additional room. In some examples, the calculated deviation may be compared with a selected deviation threshold. In some examples, information may be provided to a user, for example using Step 940, based on the discrepancies between exterior wall 1020 in the construction site and construction plan 1000, based on the calculated deviation, based on a result of the comparison of the calculated deviation with the selected deviation threshold, and so forth.

In some examples, Step 930 may identify that door 1025 in the construction site is not according to construction plan 1000. For example, the position of door 1025 in the construction site may be not according to construction plan 1000. Further, the deviation in the position of door 1025 may be calculated. In another example, the size (such as height, width, etc.) of door 1025 in the construction site may be not according to construction plan 1000. Further, the deviation in the size of door 1025 may be calculated. In yet another example, materials and/or parts of door 1025 in the construction site may be not according to construction plan 1000. In another example, door 1025 may be missing altogether from the construction site, for example having a wall instead. In yet another example, door 1025 may exist in the construction site but be missing altogether from construction plan 1000. In some examples, the calculated deviation may be compared with a selected deviation threshold. In some examples, information may be provided to a user, for example using Step 940, based on the discrepancies between door 1025 in the construction site and construction plan 1000, based on the calculated deviation, based on a result of the comparison of the calculated deviation with the selected deviation threshold, and so forth.

Figure 10B:
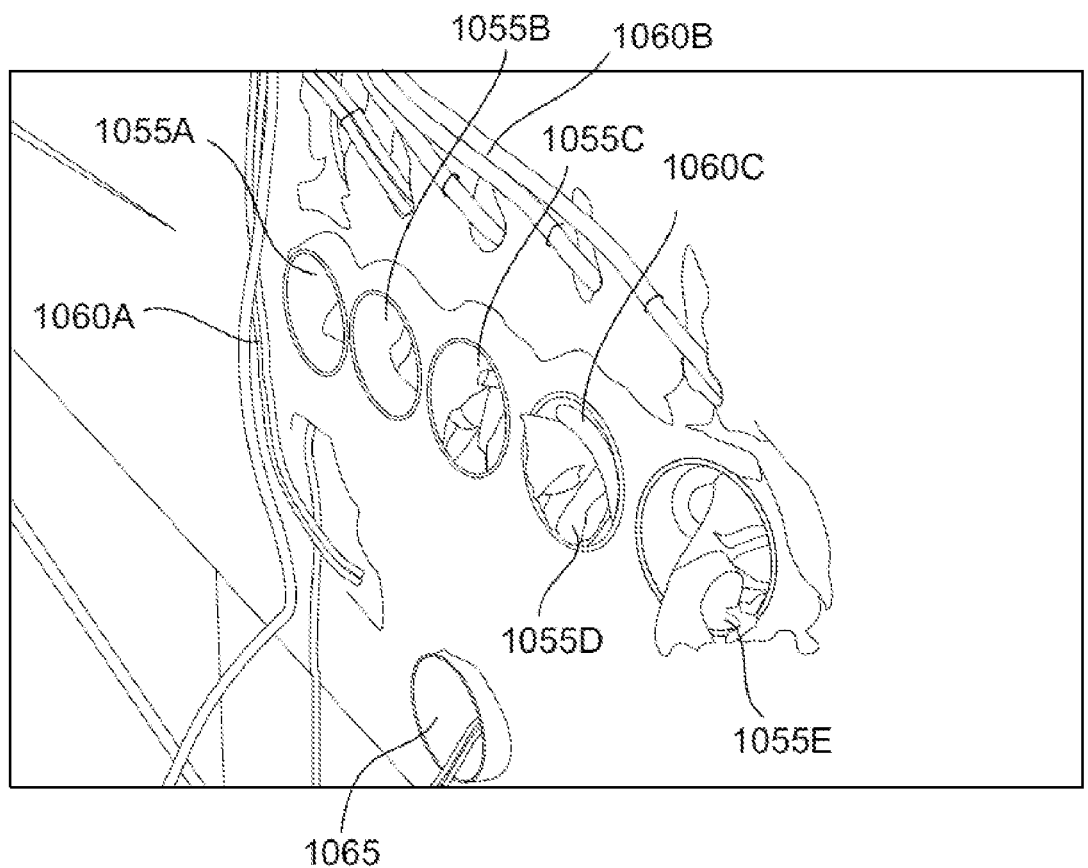
FIG. 10B is a schematic illustration of an example image captured by an apparatus consistent with an embodiment of the present disclosure.

FIG. 10B is a schematic illustration of an example image 1050 captured by an apparatus consistent with an embodiment of the present disclosure. For example, image 1050 may depicts objects in a construction site, such as electrical boxes 1055A, 1055B, 1055C, 1055D and 1055E, electrical wires 1060A, 1060B, and 1060C, and an unidentified box 1065. As described above, Step 930 may identify discrepancies between the construction site as depicted in image 1050 and construction plan associated with the construction site.

In some examples, Step 930 may identify that electrical boxes 1055A, 1055B, 1055C, 1055D and 1055E in the construction site are not according to a construction plan associated with the construction site. For example, the position of electrical boxes 1055A, 1055B, 1055C, 1055D and 1055E in the construction site may be not according to a construction plan associated with the construction site. Further, the deviation in the position of electrical boxes 1055A, 1055B, 1055C, 1055D and 1055E may be calculated. In another example, the size (such as radius, depth, etc.) of electrical boxes 1055A, 1055B, 1055C, 1055D and 1055E in the construction site may be not according to a construction plan associated with the construction site. Further, the deviation in the size of electrical boxes 1055A, 1055B, 1055C, 1055D and 1055E may be calculated. In yet another example, materials and/or parts and/or type of electrical boxes 1055A, 1055B, 1055C, 1055D and 1055E in the construction site may be not according to a construction plan associated with the construction site. In another example, at least one of additional electrical box included in the construction plan may be missing altogether from the construction site. In yet another example, at least one of electrical boxes 1055A, 1055B, 1055C, 1055D and 1055E may exist in the construction site but be missing altogether from a construction plan associated with the construction site. In some examples, the calculated deviation may be compared with a selected deviation threshold. In some examples, information may be provided to a user, for example using Step 940, based on the discrepancies between electrical boxes 1055A, 1055B, 1055C, 1055D and 1055E in the construction site and a construction plan associated with the construction site, based on the calculated deviation, based on a result of the comparison of the calculated deviation with the selected deviation threshold, and so forth.

In some examples, Step 930 may identify that electrical wires 1060A, 1060B, and 1060C in the construction site are not according to a construction plan associated with the construction site. For example, the position of electrical wires 1060A, 1060B, and 1060C (or of an end point of electrical wires 1060A, 1060B, and 1060C) in the construction site may be not according to a construction plan associated with the construction site. Further, the deviation in the position of electrical wires 1060A, 1060B, and 1060C may be calculated. In another example, the size (such as length, diameter, etc.) of electrical wires 1060A, 1060B, and 1060C in the construction site may be not according to a construction plan associated with the construction site. Further, the deviation in the size of electrical wires 1060A, 1060B, and 1060C may be calculated. In yet another example, materials and/or parts and/or type of electrical wires 1060A, 1060B, and 1060C in the construction site may be not according to a construction plan associated with the construction site. In another example, at least one of additional electrical wire included in the construction plan may be missing altogether from the construction site. In yet another example, at least one of electrical wires 1060A, 1060B, and 1060C may exist in the construction site but be missing altogether from a construction plan associated with the construction site. In some examples, the calculated deviation may be compared with a selected deviation threshold. In some examples, information may be provided to a user, for example using Step 940, based on the discrepancies between electrical boxes 1055A, 1055B, 1055C, 1055D and 1055E in the construction site and a construction plan associated with the construction site, based on the calculated deviation, based on a result of the comparison of the calculated deviation with the selected deviation threshold, and so forth.

Figure 11:
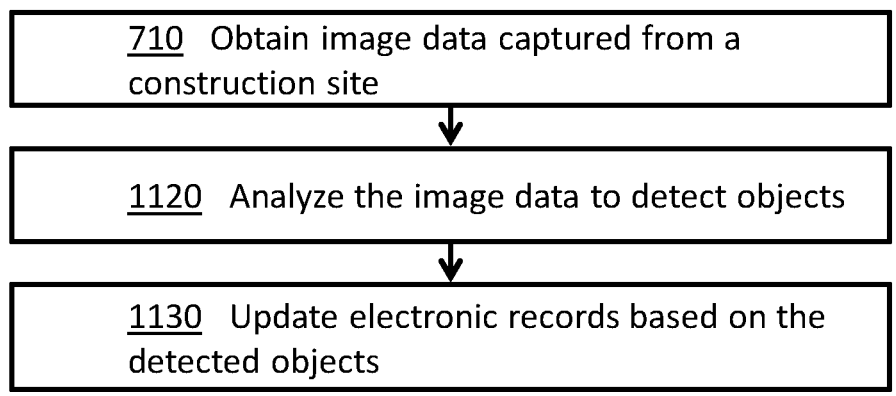
FIG. 11 illustrates an example of a method for updating records based on construction site images.

FIG. 11 illustrates an example of a method 1100 for updating records based on construction site images. In this example, method 1100 may comprise: obtaining image data captured from a construction site (Step 710), analyzing the image data to detect objects (Step 1120), and updating electronic records based on the detected objects (Step 1130). In some implementations, method 1100 may comprise one or more additional steps, while some of the steps listed above may be modified or excluded. For example, Step 1130 may be excluded from method 1100. In some implementations, one or more steps illustrated in FIG. 11 may be executed in a different order and/or one or more groups of steps may be executed simultaneously and vice versa. For example, Step 1120 may be executed after and/or simultaneously with Step 710, Step 1130 may be executed after and/or simultaneously with Step 1120, and so forth.

Additionally or alternatively, Step 930 may identify a discrepancy between electronic records and the construction site as depicted in the image data, for example as described above, and in response Step 1130 may update the electronic records according to the identified discrepancy.

In some embodiments, Step 1120 may analyze image data (such as image data captured from the construction site using at least one image sensor and obtained by Step 710) to detect at least one object in the construction site and/or to determine properties of objects. Some non-limiting examples of such properties of objects may include type of object, position of object in the image data, position of the object in the construction site, size of the object, dimensions of the object, weight of the object, shape of the object, colors of the object, orientation of the object, state of the object, and so forth. In some examples, Step 1120 may analyze the image data using a machine learning model trained using training examples to detect objects and/or to determine properties of objects from images. For example, some training examples may include an image depicting an object together with label detailing information about the depicted object such as the type of the object, position of the object in the image, properties of the object, and so forth. Other training examples may include images that do not depict objects for detection, together with labels indicating that the images do not depict objects for detection. In some examples, Step 1120 may analyze the image data using an artificial neural network configured to detect objects and/or to determine properties of objects from images.

In some embodiments, Step 1130 may update at least one electronic record associated with the construction site based, at least in part, on the at least one object detected by Step 1120 and/or properties of the at least one object determined by Step 1120.

In some examples, Step 1120 may analyze the image data to identify at least one position related to the at least one object detected by Step 1120, and the update to the at least one electronic record may be further based on the identified at least one position. In some examples, items and/or portions of the at least one electronic record associated with the identified at least one position may be selected, and the selected items and/or portions may be updated in the at least one electronic record, for example based on the at least one object detected by Step 1120 and/or properties of the at least one object determined by Step 1120. For example, objects in database 605 may be selected according to the identified at least one position, and the selected objects may be updated. In another example, portions of as-built model 615 and/or construction plan 610 may be selected according to the identified at least one position, and the selected portions may be updated. In some examples, a record of a position associated with the at least one object detected by Step 1120 may be updated in the at least one electronic record according to the identified at least one position, for example a position of an object may be registered in an as-built model 615, in database 605, and so forth. In some examples, the identified at least one position related to the at least one object may be compared with a position associated with the object in the at least one electronic record (for example, with a position of the object in construction plan 610), and construction errors 640 may be updated based on a result of the comparison (for example, registering a construction error in construction errors 640 when the difference in the position is above a selected threshold, and forgoing registration of a construction error when the difference is below the selected threshold).

In some examples, Step 1120 may analyze the image data to identify at least one property of the at least one object (such as position, size, color, object type, and so forth), and Step 1130 may update the at least one electronic record based, at least in part, on the at least one property. In some examples, records of the at least one electronic record associated with the identified at least one property may be selected, and Step 1130 may update the selected records in the at least one electronic record, for example based on the at least one object detected by Step 1120 and/or properties of the at least one object determined by Step 1120. For example, the selected record may be associated with a specific object type (such as tile, electrical box, etc.), and the selected records may be updated (for example to account for the tiles or the electrical boxes detected in the image data). In some examples, Step 1130 may update a record of a property associated with the at least one object detected by Step 1120 in the at least one electronic record according to the identified at least one property. In some examples, the identified at least one property related to the at least one object may be compared with a property associated with the object in the at least one electronic record (for example, with a property of the object in construction plan 610), and Step 1130 may update construction errors 640 based on a result of the comparison (for example, registering a construction error in construction errors 640 when the difference in the property is above a selected threshold, and forgoing registration of a construction error when the difference is below the selected threshold).

In some examples, the at least one electronic record associated with the construction site may comprise a searchable database, and Step 1130 may update the at least one electronic record by indexing the at least one object in the searchable database. For example, the searchable database may be searched for a record related to the at least one object, in response to a determination that the searchable database includes a record related to the at least one object, the record related to the at least one object may be updated, and in response to a determination that the searchable database do not include a record related to the at least one object, a record related to the at least one object may be added to the searchable database. In some examples, such searchable database may be indexed according to type of the objects, to properties of objects, to position of objects, to status of objects, to time the object was identified, to dimensions of the object, and so forth.

In some examples, when the image data comprises at least a first image corresponding to a first point in time and a second image corresponding to a second point in time (the elapsed time between the first point in time and the second point in time may be at least a selected duration, for example, at least an hour, at least one day, at least two days, at least one week, etc.), Step 1130 may update the at least one electronic record based, at least in part, on a comparison of the first image and the second image. For example, differences between the images may be identified with relation to a first object while no differences between the images may be identified with relation to a second object, and as a result update to the at least one electronic record may be made with relation to the first object, while updates related to the second object may be forgone. In another example, an identified difference may indicate that a new object was installed between the first point in time and the second point in time, and as result the installation of the new object may be recorded in progress records 630 (for example with a time stamp associated with the first point in time and/or the second point in time), project schedule 620 may be updated to reflect the installation of the new object (for example, before the second point in time and/or after the first point in time), as-build model 615 may be updated to reflect the installed new object, and so forth.

In some examples, the image data may comprise one or more indoor images of the construction site, the at least one object detected by Step 1120 may comprise a plurality of tiles paving an indoor floor, the at least one property determined by Step 1120 may comprise a number of tiles, and Step 1130 may update the at least one electronic record based, at least in part, on the number of tiles. For example, Step 1130 may update financial records 625 to reflect the number of tiles in the construction site, Step 1130 may update as-built model 615 with the number of tiles at selected locations in the construction site (room, balcony, selected area of a floor, selected unit, etc.), and so forth.

In some examples, the at least one electronic record may comprise at least one as-built model associated with the construction site (such as as-built model 615), and Step 1130 may update to the at least one electronic record by modifying the at least one the as-built model. For example, an as-built model may be updated to include objects detected by Step 1120 (for example by analyzing images of the construction site), to record a state and/or properties of objects in the as-built model according to the state and/or properties of the objects in the construction site as determined by Step 1120 (for example by analyzing images of the construction site), to position an object in the as-build model according to the position of the object in the construction site as determined by Step 1120 (for example by analyzing images of the construction site, according to the position of the image sensor the captured the images, etc.), and so forth.

In some examples, the at least one electronic record may comprise at least one project schedule associated with the construction site (such as project schedule 620), and Step 1130 may update the at least one electronic record by updating the at least one project schedule, for example by updating at least one projected date in the at least one project schedule. For example, Step 1120 may analyze image data captured at different points in time to determine a pace of progression, and Step 1130 may update at least one projected finish date in the at least one project schedule based on the amount of remaining work in the task and the determined pace of progression. For example, an analysis may show that a first number of units were handled within a selected elapsed time, and a pace of progression may be calculated by dividing the first number of units by the selected elapsed time. Moreover, a remaining number of units to be handled in the task may be obtained, for example from project schedule 620 and/or progress records 630. Further, the remaining number of units may be divided by the calculated pace of progression to estimate a remaining time for the task, and the projected finish date of the task may be updated accordingly. In another example, Step 1120 may analyze image data captured at a selected time to determine that a task that should have started according to project schedule 620 haven't yet started in the construction site. In response, Step 1130 may update projected dates associated with the task (such as projected starting date, projected finish date, projected intermediate dates, and so forth). In yet another example, Step 1130 may update projected date in project schedule 620 (for example as described above), and may further update other dates in project schedule 620 that depend on the updated dates. For example, a first task may start only after a second task is completed, and Step 1130 may update projected dates of the first task (such as the projected starting date, projected finish time, etc.) after the projected finish date of the second task is updated.

In some examples, the at least one electronic record may comprise at least one financial record associated with the construction site (such as financial record 625), and Step 1130 may update the at least one electronic record by updating the at least one financial record, for example by updating at least one amount in the at least one financial record. For example, Step 1120 may analyze image data captured at different points in time to determine a pace of progression, for example as described above, and Step 1130 may update at least one projected future expense (for example, updating a projected date of the projected future expense, updating a projected amount of the projected future expense, etc.) based on the determined pace of progression. In another example, Step 1120 may analyze image data to determine that a task was progressed or completed, and in response to the determination, a payment associated with the task may be approved, placed for approval, executed, etc., and the financial records may be updated by Step 1130 accordingly. In yet another example, Step 1120 may analyze image data to determine that a task was not progressed or completed as specified in an electronic record (for example not progressed or completed as planned according to project schedule 620, not progressed or completed as reported according to progress records 630, etc.), and in response to the determination a payment associated with the task may be reduced, withheld, delayed, etc., and the financial records may be updated by Step 1130 accordingly. In another example, financial assessments may be generated by analyzing image data depicting the construction site and/or electronic records associated with the construction site, and Step 1130 may update financial records according to the generated financial assessments, for example by recording the generated financial assessments in the financial records, by updating a financial assessment recorded in the financial records according to the generated financial assessments, in any other way described below, and so forth.

In some examples, the at least one electronic record may comprise at least one progress record associated with the construction site (such as progress record 630), and Step 1130 may update the at least one electronic record by updating the at least one progress record, for example by updating at least one progress status corresponding to at least one task in the at least one progress record. For example, Step 1120 may analyze image data to determine that a task was completed or a current percent of completion of the task, and Step 1130 may update at least one progress status corresponding to the task in the at least one progress record according to the determination. In another example, Step 1120 may analyze image data to determine that a task was not progressed or completed as specified in an electronic record (for example not progressed or completed as planned according to project schedule 620, not progressed or completed as reported according to progress records 630, etc.), and in response Step 1130 may record a delay in the at least one progress record according to the determination.

In some examples, the at least one electronic record (for example, the at least one electronic record updated by Step 1130, the at least one electronic record obtained by Step 920, etc.) may comprise information related to safety information. For example, image data (such as image data captured from the construction site using at least one image sensor and obtained by Step 710) may be analyzed to identify at least one safety issue related to the at least one object detected by Step 1120, and Step 1130 may record information related to the at least one safety issue in the at least one electronic record. For example, Step 1120 may analyze the image data to identify a type of scaffolds used in the construction site, the identified type of scaffolds may be compared with safety requirements, and in response to a determination that the type of scaffolds is incompatible with the safety requirements, and Step 1130 may record a corresponding safety issue in safety records 635. In another example, Step 1120 may analyze the image data to detect a hanged object loosely connected to the ceiling, and Step 1130 may record a corresponding safety issue in safety records 635.

In some examples, the at least one electronic record (for example, the at least one electronic record updated by Step 1130, the at least one electronic record obtained by Step 920, etc.) may comprise information related to at least one construction error. For example, image data (such as image data captured from the construction site using at least one image sensor and obtained by Step 710) may be analyzed to identify at least one construction error related to the at least one object detected by Step 1120, and Step 1130 may record information related to the at least one construction error in the at least one electronic record. For example, Step 1120 may analyze the image data to identify an object installed incorrectly, and in response Step 1130 may record the incorrect installation of the object as a construction error in construction errors 640. In another example, Step 930 may identify a discrepancy between electronic records (such as construction plan 610) and the construction site as depicted in the image data, for example as described above, Step 1120 may identify a construction error based on the identified discrepancy, for example as described above, and Step 1130 may record the construction error identified by Step 930 in construction errors 640.

In some examples, Step 1130 may update the at least one electronic record associated with the construction site based, at least in part, on a time associated with the image data. For example, the image data may comprise at least a first image corresponding to a first point in time and a second image corresponding to a second point in time, Step 1130 may update the at least one electronic record based, at least in part, on a comparison of the first image and the second image, as described above. In another example, Step 1120 may detect an object in the image data and/or determine properties of an object in an image data captured at a particular time (such as a particular minute, a particular hour, a particular date, etc.), and Step 1130 may record the detected object and/or the determined properties of the object together with the particular time in objects database 605. Other examples where the update is based on a time associated with the image data are described above.

In some examples, Step 1130 may update the at least one electronic record associated with the construction site based, at least in part, on a position associated with the image data. For example, Step 1120 may detect an object in the image data and/or determine properties of an object in an image data captured at a particular location (such as a particular unit, a particular room, from a particular position within the room, from a particular angle, at a particular set of coordinates specifying a location, etc.), and Step 1130 may record the detected object and/or the determined properties of the object together with the particular location in objects database 605. Other examples where the update is based on a position associated with the image data and/or on a position of objects depicted in the image data are described above.

Consistent with the present disclosure, image data (such as image data captured from the construction site using at least one image sensor and obtained by Step 710) may be analyzed to detect at least one object in the construction site, for example as described above in relation with Step 1120. Further, the image data may be analyzed to identify at least one property of the at least one object (such as position, size, color, object type, and so forth), for example as described above in relation with Step 1120. The identified at least one property may be used to select at least one electronic record of a plurality of alternative electronic records associated with the construction site. Step 1130 may update the selected at least one electronic record, for example based on the detected at least one object and/or the identified at least one property. For example, the plurality of alternative electronic records may be associated with different types of objects, and the type of the object detected by Step 1120 may be used to select an electronic record associated with the type of the detected object of the plurality of alternative electronic records. In another example, the plurality of alternative electronic records may be associated with different regions of the construction site (for example, different rooms, different units, different buildings, etc.), and the position of the object detected by Step 1120 may be used to select an electronic record associated with a region corresponding to the position of the detected object of the plurality of alternative electronic records.

In some examples, the at least one electronic record (for example, the at least one electronic record updated by Step 1130, the at least one electronic record obtained by Step 920, etc.) may comprise information based on at least one image captured from at least one additional construction site. For example, the at least one electronic record may comprise information derived from image data captured from a plurality of construction sites. Moreover, the information about the plurality of construction sites may be aggregated, and statistics from the plurality of construction sites may be generated. Further, information from one construction site may be compared with information from other construction sites. In some examples, such statistics and/or comparisons may be provided to the user. In some examples, pace of progression at different construction sites may be measured from image data as described above, the measured pace of progression at the different construction sites may be aggregated in an electronic record (for example, in a database), statistics about the pace of progression may be generated and/or provided to a user, a pace of progression in one construction site may be compared to pace of progression in other construction sites, and so forth. In some examples, statistical model tying properties of the construction sites to the pace of progression may be determined (for example, using regression models, using statistical tools, using machine learning tools, etc.) based on the aggregated measured pace of progression at the different construction sites. Further, the statistical model may be used to predict a pace of progression for other construction sites from properties of the other construction sites. Additionally or alternatively, the statistical model may be used to suggest modification to a construction site in order to increase the pace of progression in that construction site. In some examples, construction errors at different construction sites may be identified from image data as described above, the identified construction errors at the different construction sites may be aggregated in an electronic record (for example, in a database), statistics about the construction errors may be generated and/or provided to a user, construction errors in one construction site may be compared to construction errors in other construction sites, and so forth. In some examples, statistical model tying properties of the construction sites to construction errors may be determined (for example, using regression models, using statistical tools, using machine learning tools, etc.) based on the aggregated construction errors from the different construction sites. Further, the statistical model may be used to predict construction errors likely to occur at other construction sites from properties of the other construction sites (for example, together with a predict amount of construction errors). Additionally or alternatively, the statistical model may be used to suggest modification to a construction site in order to avoid or decrease construction errors in that construction site.

Different capturing parameters for the capturing of images from construction sites may result in different visual details to be visible in the captured images, and in turn, different insights may be reached by analyzing these images. For example, using one pixel resolution and capturing the image at a first distance from an electrical box, may results in clear visualization of electrical wires in the image, while using a different pixel resolution and/or capturing the image at a different distance may results in the electrical wires being blurry or otherwise poorly visualized in the image. As a result, analysis of the image may provide insights related to the installation of the electrical wires in the former case, and may be unobtainable or unreliable in the latter case. In another example, using different filters may result in different portions of the electromagnetic spectrum (such as visible spectrum, infrared spectrum, near infrared spectrum, different colors, etc.) being captured in the image, and therefore may result in different visual details visible in different portions of the electromagnetic spectrum being visible or being excluded from the image. As a result, analysis of the image may identify or may miss particular construction defects visible in particular portions of the electromagnetic spectrum. In yet another example, using different position, orientation, and zoom settings for the camera may result in capturing of different portions of the construction site in the image, and as a result analysis of the image may provide insights related to different portions of the construction site. Selecting the capturing parameters based on information related to the construction site may enable capturing of images that include desired details about the construction site. For example, selecting capturing parameters based on an object presumed to be at a particular part of the construction site (for example, based on an analysis of a construction plan, of a project schedule, of a progress record, of an as-built model, based on an analysis of previously captured images of the construction site, etc.) may enable a selection of capturing parameters suitable for capturing visual details required for a visual inspection of the object.

Figure 12:
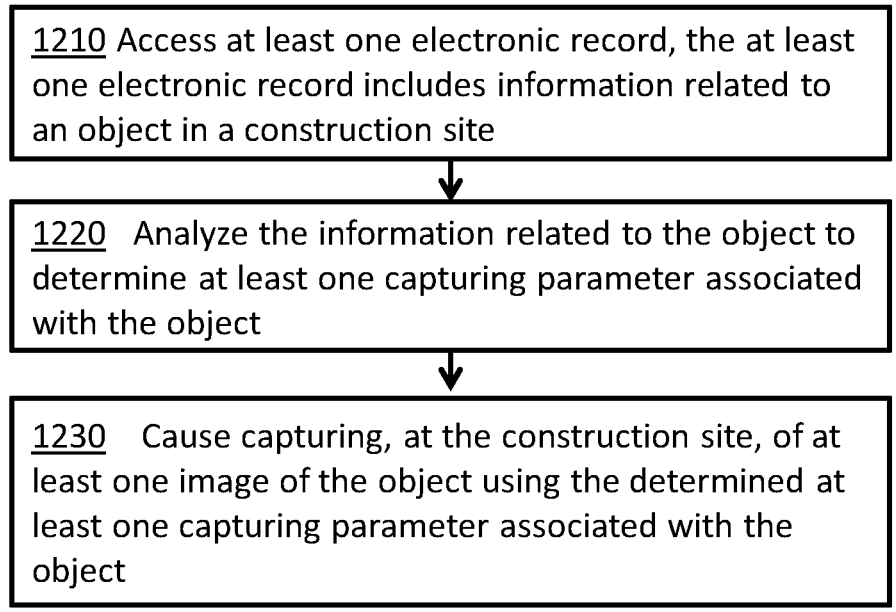
FIG. 12 illustrates an example of a method for determining image capturing parameters in construction sites.

FIG. 12 illustrates an example of a method 1200 for determining image capturing parameters in construction sites. In this example, method 1200 may comprise: accessing at least one electronic record, the at least one electronic record includes information related to an object in a construction site (Step 1210); analyzing the information related to the object to determine at least one capturing parameter associated with the object (Step 1220); and causing capturing, at the construction site, of at least one image of the object using the determined at least one capturing parameter associated with the object (Step 1230). In some implementations, method 1200 may comprise one or more additional steps, while some of the steps listed above may be modified or excluded. In some implementations, one or more steps illustrated in FIG. 12 may be executed in a different order and/or one or more groups of steps may be executed simultaneously and vice versa. Some non-limiting examples of such object may include objects including at least part of a stairway, of a wall, of a lift shaft, of a beam, of a pipe, of a wire, of a doorway, of a tile, of an electrical box, of a box, of a room, of an apartment, of a constructed element, of an installed element, and so forth.

FIG. 13 illustrates an example of a method 1300 for determining image capturing parameters in construction sites. In this example, method 1300 may comprise: accessing a previously captured image of an object in a construction site (Step 1310); analyzing the previously captured image of the object to determine at least one capturing parameter associated with the object for a prospective image capturing (Step 1320); and causing capturing, at the construction site, of at least one image of the object using the determined at least one capturing parameter associated with the object (Step 1330). In some implementations, method 1300 may comprise one or more additional steps, while some of the steps listed above may be modified or excluded. In some implementations, one or more steps illustrated in FIG. 13 may be executed in a different order and/or one or more groups of steps may be executed simultaneously and vice versa. Some non-limiting examples of such object may include objects including at least part of a stairway, of a wall, of a lift shaft, of a beam, of a pipe, of a wire, of a doorway, of a tile, of an electrical box, of a box, of a room, of an apartment, of a constructed element, of an installed element, and so forth.

In some embodiments, method 1220 may further comprise receiving the at least one image of the object captured using the determined at least one capturing parameter; analyzing the received at least one image to determine whether a quality of the received at least one image is sufficient; in response to a determination that the quality of the received at least one image is insufficient, determining at least one modified capturing parameter associated with the object; and causing capturing of at least one additional image of the object using the determined at least one modified capturing parameter. For example, edges of the received at least one image may be analyzed to determine whether the received is sufficiently sharp, and in response to a determination that the sharpness of the received at least one image is insufficient, determining at least one modified capturing parameter associated with the object and configured to increase the sharpness of prospective images. In another example, a computer vision algorithm (such as object detector, object recognition, image classification, image segmentation, etc.) may be applied to the at least one image, and in response to a failure of the computer vision algorithm or to insufficient confidence in the results of the computer vision algorithm, determining at least one modified capturing parameter associated with the object and configured to increase the likelihood of the computer vision algorithm to succeed.

In some embodiments, Step 1210 may comprise accessing at least one electronic record, the at least one electronic record may include information related to an object in a construction site. Some non-limiting examples of such electronic records may include a record comprising information related to objects associated with the construction site (such as object database 605), a construction plan associated with the construction site (such as construction plans 610), an as-built model associated with the construction site (such as as-built models 615), a project schedule associated with the construction site (such as project schedules 620), a financial record associated with the construction site (such as financial records 625), a progress record associated with the construction site (such as progress records 630), a safety issue associated with the construction site (such as safety records 635), a record comprising information related to construction error associated with the construction site (such as construction errors 640), and so forth. Some non-limiting examples of such information related to the object in the construction site may include a type of the object, a position of the object in the construction site, an orientation of at least part of the object, a color of at least part of the object, a shape of at least part of the object, a dimension of at least part of the object (such as length, size, width, height, depth, etc.), installation technique, installation time, installation errors, defects, and so forth. In some examples, the information related to the object may include information related to one or more planned properties for the object in the construction site, and/or information related to recorded properties of the object from the construction site. In one example, Step 1210 may use Step 920 to access the at least one electronic record. In another example, Step 1210 may access the at least one electronic record in a memory unit (such as memory units 210, shared memory modules 410, memory 600, and so forth). In yet another example, Step 1210 may access the at least one electronic record through a data communication network (such as communication network 130), for example using one or more communication devices (such as communication modules 230, internal communication modules 440, external communication modules 450, and so forth). In an additional example, Step 1210 may access the at least one electronic record in a database. In yet another example, Step 1210 may generate at least part of the at least one electronic record, for example by analyzing images captured in the construction site (for example as described herein), by analyzing other records, by analyzing images of paper records, and so forth.

In some embodiments, Step 1220 may comprise analyzing information related to an object (such as the information related to the object included in the at least one electronic record accessed by Step 1210) to determine at least one capturing parameter associated with the object. Some non-limiting examples of such capturing parameters may include a distance of an image sensor from the object, a viewing angle of the object, a location in the construction site to capture the at least one image from, a direction of an image sensor used to capture the at least one image, an exposure time, a frame rate, a gain, an ISO speed, a stereo base, a focus, and so forth. For example, in response to a first information related to the object, Step 1220 may determine a first at least one capturing parameter associated with the object, and in response to a second information related to the object, Step 1220 may determine a second at least one capturing parameter associated with the object, the second at least one capturing parameter may differ from the first at least one capturing parameter. In another example, a machine learning model may be trained using training examples to determine capturing parameters from information related to objects, and Step 1220 may use the trained machine learning model to analyze the information related to the object included in the at least one electronic record accessed by Step 1210 and determine the at least one capturing parameter associated with the object. One example of such training example may include information related to an object, together with a label indicating desired capturing parameter for this object.

In one example, Step 1220 and/or Step 1320 may determine at least one capturing parameter associated with the object configured to enable a determination of an object type of the object by analyzing the at least one image of the object captured using the determined at least one capturing parameter. In another example, Step 1220 and/or Step 1320 may determine at least one capturing parameter associated with the object configured to enable a determination of a condition of the object by analyzing the at least one image of the object captured using the determined at least one capturing parameter. In yet another example, Step 1220 and/or Step 1320 may determine at least one capturing parameter associated with the object configured to ensure a selected pixel resolution in the captured at least one image for the object.

In one example, the information related to the object may include a dimension of at least part of the object (such as size, area, volume, length, width, height, depth, planned dimension for at least part of the object, recorded dimension of at least part of the object, etc.), and Step 1220 may comprise basing the determination of the at least one capturing parameter associated with the object on the dimension of the at least part of the object. In one example, the information related to the object may include a shape of at least part of the object (such as planned shape for at least part of the object, recorded shape of at least part of the object, etc.), and Step 1220 may comprise basing the determination of the at least one capturing parameter associated with the object on the shape of the at least part of the object. In one example, the information related to the object may include a color of at least part of the object (such as planned color for at least part of the object, recorded color of at least part of the object, etc.), and Step 1220 may comprise basing the determination of the at least one capturing parameter associated with the object on the color of the at least part of the object. In one example, the information related to the object may include a spatial orientation of at least part of the object (such as up, down, left, right, north, at a particular angle with respect to another object, at a particular angle with respect to a particular direction, planned spatial orientation for at least part of the object, recorded spatial orientation of at least part of the object, etc.), and Step 1220 may comprise basing the determination of the at least one capturing parameter associated with the object on the spatial orientation of the at least part of the object. In one example, the information related to the object may include a position of at least part of the object (such as a position with respect to another object, a position with respect to another particular position, a planned position for at least part of the object, a recorded position of at least part of the object, etc.), and Step 1220 may comprise basing the determination of the at least one capturing parameter associated with the object on the position of the at least part of the object. In one example, the information related to the object may include a type of at least part of the object (such as planned type for at least part of the object, recorded type of at least part of the object, etc.), and Step 1220 may comprise basing the determination of the at least one capturing parameter associated with the object on the type of the at least part of the object. In one example, the information related to the object may include information related to one or more holes in a three dimensional structure in the construction site, the three dimensional structure may surround the object, and Step 1220 may comprise basing the determination of the at least one capturing parameter associated with the object on the information related to the one or more holes in the three dimensional structure. For example, information related to one or more holes in a three dimensional structure in the construction site may include information related to one or more holes in a room that includes the object, and Step 1220 may use the information related to the one or more holes to estimate illumination conditions at the room and select capturing parameters adjusted to the estimated illumination conditions.

In some examples, the at least one electronic record accessed by Step 1210 may comprise at least a construction plan associated with the construction site, and Step 1220 may comprise analyzing the construction plan to determine the at least one capturing parameter. For example, the construction plan associated with the construction site may include planned properties of at least part of the object (such as type, dimensions, shape, color, position, spatial orientation, installation technique, etc.), and Step 1220 may comprise basing the determination of the at least one capturing parameter associated with the object on the planned properties of the at least part of the object. In some examples, the at least one electronic record accessed by Step 1210 may comprise at least a project schedule associated with the construction site, and Step 1220 may comprise analyzing the project schedule to determine the at least one capturing parameter. For example, the project schedule associated with the construction site may comprise planned schedule of planned tasks related to the object, and Step 1220 may comprise basing the determination of the at least one capturing parameter associated with the object on the planned schedule of the planned tasks related to the object. In some examples, the at least one electronic record accessed by Step 1210 may comprise at least a financial record associated with the construction site, and Step 1220 may comprise analyzing the financial record to determine the at least one capturing parameter. In one example, the financial record associated with the construction site may comprise properties of the object (such as type, dimensions, color, price, supplier, manufacturer, etc.), and Step 1220 may comprise basing the determination of the at least one capturing parameter associated with the object on the properties of the object. For example, an object supplied by one supplier (and/or manufactured by one manufacturer) needs to be inspected using one image analysis routine, and therefore may require a first image capturing parameters, while an object supplied by a different supplier (and/or manufactured by a different manufacturer) needs to be inspected using a different image analysis routine, and therefore may require different image capturing parameters. In some examples, the at least one electronic record accessed by Step 1210 may comprise at least a progress record associated with the construction site, and Step 1220 may comprise analyzing the progress record to determine the at least one capturing parameter. For example, the progress record and/or the financial record associated with the construction site may comprise an indication that tasks related to the object were completed (or progressed), and Step 1220 may comprise basing the determination of the at least one capturing parameter associated with the object on the indication that the tasks related to the object were completed (or progressed). In some examples, the at least one electronic record accessed by Step 1210 may comprise at least a construction error record associated with the construction site, and Step 1220 may comprise analyzing the construction error record to determine the at least one capturing parameter. For example, the construction error record may include an indication of a defect in the object and/or in the installation of the object, and Step 1220 may comprise basing the determination of the at least one capturing parameter associated with the object on the indication of the defect in the object and/or in the installation of the object.

In some examples, Step 1220 may base the determination of the at least one capturing parameter associated with the object on an analysis of a previously captured image of the object. For example, Step 1220 may use Step 1320 (described below) to analyze the previously captured image of the object and determine the at least one capturing parameter associated with the object. In another example, a machine learning model may be trained using training examples to determine capturing parameters for prospective capturing of images from previously captured images, and Step 1220 may use the trained machine learning model to analyze the previously captured image of the object and determine the at least one capturing parameter. One example of such training example may include an image of an object, together with a desired capturing parameter for a prospective capturing of images of the object. In yet another example, Steps 910, 920 and 930 may analyze the previously captured image and identify one or more discrepancies between the construction site and at least one electronic record, and Step 1220 may base the determination of the at least one capturing parameter associated with the object on the identified one or more discrepancies. In yet another example, Step 1120 may analyze the previously captured image to detect objects in the image and/or determine properties of the objects, and Step 1220 may base the determination of the at least one capturing parameter associated with the object on the detected objects, on whether particular objects are detected, on determined properties of the object, and so forth. Some non-limiting examples of such properties may type, dimension, shape, color, position, spatial orientation, defects, visual appearance, and so forth.

In one example, the previously captured image of the object may be an image captured using a particular image sensor, and Step 1230 and/or Step 1330 may comprise causing the particular image sensor to capture the at least one image using the determined at least one capturing parameter associated with the object. In one example, the previously captured image of the object may be an image captured using a first image sensor, and Step 1230 and/or Step 1330 may comprise causing a second image sensor to capture the at least one image using the determined at least one capturing parameter associated with the object, the second image sensor may differ from the first image sensor. In one example, the previously captured image of the object may be an image captured using a stationary camera positioned in the construction site, and Step 1230 and/or Step 1330 may comprise at least one of causing the same stationary camera to capture the at least one image using the determined at least one capturing parameter, causing a different stationary camera positioned in the construction site to capture the at least one image using the determined at least one capturing parameter, causing a mobile capturing device positioned in the construction site to capture the at least one image using the determined at least one capturing parameter, causing an image acquisition robot to capture the at least one image using the determined at least one capturing parameter, and causing an image acquisition drone to capture the at least one image using the determined at least one capturing parameter. In one example, the previously captured image of the object may be an image captured using a mobile capturing device positioned in the construction site, and Step 1230 and/or Step 1330 may comprise at least one of causing the same mobile capturing device to capture the at least one image using the determined at least one capturing parameter, causing a different mobile capturing device positioned in the construction site to capture the at least one image using the determined at least one capturing parameter, causing a stationary camera positioned in the construction site to capture the at least one image using the determined at least one capturing parameter, causing an image acquisition robot to capture the at least one image using the determined at least one capturing parameter, and causing an image acquisition drone to capture the at least one image using the determined at least one capturing parameter. In one example, the previously captured image of the object is an image captured using an image acquisition robot, and Step 1230 and/or Step 1330 may comprise at least one of causing the same image acquisition robot to capture the at least one image using the determined at least one capturing parameter, causing a different image acquisition robot to capture the at least one image using the determined at least one capturing parameter, causing a stationary camera positioned in the construction site to capture the at least one image using the determined at least one capturing parameter, causing a mobile capturing device positioned in the construction site to capture the at least one image using the determined at least one capturing parameter, and causing an image acquisition drone to capture the at least one image using the determined at least one capturing parameter. In one example, the previously captured image of the object may be an image captured using an image acquisition drone, and Step 1230 and/or Step 1330 may comprise at least one of causing the same image acquisition drone to capture the at least one image using the determined at least one capturing parameter, causing a different image acquisition drone to capture the at least one image using the determined at least one capturing parameter, causing a stationary camera positioned in the construction site to capture the at least one image using the determined at least one capturing parameter, causing a mobile capturing device positioned in the construction site to capture the at least one image using the determined at least one capturing parameter, and causing an image acquisition robot to capture the at least one image using the determined at least one capturing parameter.

In one example, method 1200 and/or method 1300 may analyze information related to the object (such as the information related to the object included in the at least one electronic record accessed by Step 1210) and/or the at least one previously captured image to determine a need to capture at least one additional image of the object. For example, a machine learning model may be trained using training examples to determine a need to capture additional images of objects from information related to the objects and/or from images of the objects, method 1200 may use the trained machine learning model to analyze the information related to the object included in the at least one electronic record accessed by Step 1210 and/or the at least one previously captured image to determine the need to capture at least one additional image of the object, and method 1300 may use the trained machine learning model to analyze the at least one previously captured image accessed by Step 1310 to determine a need to capture at least one additional image of the object. One example of such training example may include information related to the object and/or an image of the object, together with a label indicating whether there is a need to capture additional images of the object. Further, in some examples, in response to a determined need to capture at least one additional image of the object, Step 1230 and/or Step 1330 may cause the capturing of the at least one image of the object, and in response to no determined need to capture at least one additional image of the object, Step 1230 and/or Step 1330 may forgo causing the capturing of the at least one image of the object.

In one example, method 1200 and/or method 1300 may analyze the information related to the object (such as information related to the object included in the at least one electronic record accessed by Step 1210) and/or the at least one previously captured image to determine a time preference for the capturing of the at least one image of the object. Some non-limiting examples of such time preference may include a time-in-day, a day-in-week, a date, a time interval, an exact time, and so forth. For example, a machine learning model may be trained using training examples to determine a time preference for capturing of additional images of objects from information related to the objects and/or from images of the objects, method 1200 may use the trained machine learning model to analyze the information related to the object included in the at least one electronic record accessed by Step 1210 and/or the at least one previously captured image to determine the time preference for the capturing of the at least one additional image of the object, and method 1300 may use the trained machine learning model to analyze the at least one previously captured image access by Step 1310 to determine a time preference for the capturing of the at least one image of the object. One example of such training example may include information related to the object and/or an image of the object, together with a label indicating the time preference for the capturing of additional images of the object. Further, in some examples, Step 1230 and/or Step 1330 may cause the capturing of the at least one image of the object at the preferred time and/or according to the determined time preference.

In some embodiments, Step 1230 may comprise causing capturing, at the construction site, of at least one image of the object using at least one capturing parameter, such as the at least one capturing parameter associated with the object determined by Step 1220. For example, Step 1230 may use Step 1330 (described below) to cause the capturing, at the construction site, of at least one image of the object using at least one capturing parameter. In some embodiments, Step 1330 may comprise causing capturing, at the construction site, of at least one image of the object using at least one capturing parameter, such as the at least one capturing parameter associated with the object determined by Step 1320. For example, Step 1330 may use Step 1230 to cause the capturing, at the construction site, of at least one image of the object using at least one capturing parameter. In one example, the at least on image may be captured at least a selected time (such as one minute, one hour, one day, two days, one week, etc.) after the capturing of the previously captured image.

In some examples, Step 1230 and/or Step 1330 may comprise providing information configured to cause the capturing, at the construction site, of at least one image of the object using the at least one capturing parameter. For example, the provided information may include one or more of an indication of the at least one capturing parameter, an indication of the object, an indication of a planned capturing time, an indication of a planned capturing position, an indication of a planned capturing angle, and so forth. In one example, Step 1230 and/or Step 1330 may provide the information to a user, and the provided information may be configured to cause the user to capture the at least one image of the object using the determined at least one capturing parameter associated with the object (for example, the provided information may include a guidance to a user to capture the at least one image of the object using the determined at least one capturing parameter). In one example, Step 1230 and/or Step 1330 may comprise transmitting information to an external device, the transmitted information may be configured to cause the external device to capture the at least one image of the object using the determined at least one capturing parameter associated with the object (some non-limiting examples of such external device may include a stationary camera positioned in the construction site, a mobile capturing device position in the construction site, a wearable capturing device worn by a person in the construction site, an image acquisition robot, an image acquisition drone, and so forth). In one example, Step 1230 and/or Step 1330 may comprise causing a stationary camera positioned in the construction site to capture the at least one image using the determined at least one capturing parameter associated with the object. In one example, Step 1230 and/or Step 1330 may comprise, causing a mobile capturing device position in the construction site to capture the at least one image using the determined at least one capturing parameter associated with the object. In one example, Step 1230 and/or Step 1330 may comprise causing an image acquisition robot to capture the at least one image using the determined at least one capturing parameter associated with the object. For example, Step 1230 and/or Step 1330 may comprise causing an image acquisition robot to move to a particular position in the construction site and capture the at least one image using the determined at least one capturing parameter associated with the object from the particular position. In one example, Step 1230 and/or Step 1330 may comprise causing an image acquisition drone to capture the at least one image using the determined at least one capturing parameter associated with the object. For example, Step 1230 and/or Step 1330 may comprise causing an image acquisition drone to move to a particular position in the construction site and capture the at least one image using the determined at least one capturing parameter associated with the object from the particular position. In one example, Step 1230 and/or Step 1330 may comprise capturing the at least one image of the object using the determined at least one capturing parameter.

In some embodiments, the at least one electronic record accessed by Step 1210 may further include information related to a second object in the construction site (the second object may differ from the object), Step 1220 may comprise analyzing the information related to the second object to determine at least one capturing parameter associated with the second object (the at least one capturing parameter associated with the second object may differ from the at least one capturing parameter associated with the object), and Step 1230 may comprise causing capturing, at the construction site, of an image of the second object using the determined at least one capturing parameter associated with the second object.

In some embodiments, the at least one electronic record accessed by Step 1210 may further include information related to a second object in the construction site (the second object may differ from the object), Step 1220 may comprise analyzing the information related to the second object and the information related to the object to determine the at least one capturing parameter (for example as described below), and Step 1230 may comprise causing capturing, at the construction site, of a single image of the object and at least part of the second object using the at least one capturing parameter determined by Step 1220. In some examples, the second object may encircle the object, the object and the second object may have direct contact, the object and the second object may be disjointed, the object and the second object may be positioned at least one a selected distance (such as a foot, a meter, a yard, an inch, a centimeter, etc.) from each other, and so forth.

In some embodiments, the at least one electronic record accessed by Step 1210 may further include information related to a second object in the construction site (the second object may differ from the object), Step 1220 may comprise analyzing the information related to the second object and the information related to the object to determine the at least one capturing parameter (for example as described below), and Step 1230 may comprise causing capturing, at the construction site, of a single image of the object using the determined at least one capturing parameter, the single image may include no depiction of any part of the second object.

In some examples, Step 1220 may comprise analyzing the information related to the second object and the information related to the object to determine the at least one capturing parameter. For example, a machine learning model may be trained using training examples to determine capturing parameters from information related to objects, and Step 1220 may use the trained machine learning model to analyze the information related to the second object and the information related to the object included in the at least one electronic record accessed by Step 1210 and determine the at least one capturing parameter. One example of such training example may include information related to two objects, together with a label indicating desired capturing parameter for at least one of the two objects.

In some embodiments, the at least one electronic record accessed by Step 1210 may further include information related to a space in the construction site, and the Step 1220 may comprise analyzing the information related to the space and the information related to the object to determine the at least one capturing parameter. Further, in one example, Step 1230 may comprise causing an image sensor positioned in the space to capture the at least one image of the object using the determined at least one capturing parameter. For example, the space may be adjacent to the object, the space may be an empty space, the space may be intended to be empty, the space may include the object, and so forth. In one example, a machine learning model may be trained using training examples to determine capturing parameters from information related to objects and information related to spaces, and Step 1220 may use the trained machine learning model to analyze the information related to the space and the information related to the object included in the at least one electronic record accessed by Step 1210 and determine the at least one capturing parameter. One example of such training example may include information related to an object and information related to a space related to the object, together with a label indicating desired capturing parameter. In another example, the dimensions of the space may limit the possible capturing parameters (such as distance from the object, viewing angle, etc.), and Step 1220 may use the information related to the space to select valid capturing parameters.

In some examples, Step 1220 may analyze the at least one electronic record to determine a type of the object, in response to a first determined type, Step 1220 may select a first capturing parameter, in response to a second determined type, Step 1220 may select a second capturing parameter (the second capturing parameter may differ from the first capturing parameter), Step 1230 may cause capturing of the at least one image of the object using the selected capturing parameter. In some examples, Step 1220 may analyze the at least one electronic record to determine a construction stage associated with the object, in response to a first determined construction stage, Step 1220 may select a first capturing parameter, in response to a second determined construction stage, Step 1220 may select a second capturing parameter (the second capturing parameter may differ from the first capturing parameter), Step 1230 may cause capturing of the at least one image of the object using the selected capturing parameter. In some examples, Step 1220 may analyze the at least one electronic record to identify a scheduled task associated with the object, in response to a first identified scheduled task, Step 1220 may select a first capturing parameter, in response to a second identified scheduled task, Step 1220 may select a second capturing parameter (the second capturing parameter may differ from the first capturing parameter), Step 1230 may cause capturing of the at least one image of the object using the selected capturing parameter. In some examples, Step 1220 may analyze the at least one electronic record to identify a status of a task associated with the object, in response to a first identified status of the task, Step 1220 may select a first capturing parameter, in response to a second identified status of the task, Step 1220 may select a second capturing parameter (the second capturing parameter may differ from the first capturing parameter), Step 1230 may cause capturing of the at least one image of the object using the selected capturing parameter. In one example, the first identified status of the task may be 'completed' and/or the second identified status of the task may be 'in progress'. In some examples, Step 1220 may analyze the at least one electronic record to identify an indication of a completed task associated with the object, in response to a first identified indication of a completed task, Step 1220 may select a first capturing parameter, in response to a second identified indication of a completed task, Step 1220 may select a second capturing parameter (the second capturing parameter may differ from the first capturing parameter), Step 1230 may cause capturing of the at least one image of the object using the selected capturing parameter. In some examples, Step 1220 may analyze the at least one electronic record to determine whether a particular task associated with the object is completed, in response to a determination that the particular task is completed, Step 1220 may select a first capturing parameter, in response to a determination that the particular task is incomplete, Step 1220 may select a second capturing parameter (the second capturing parameter may differ from the first capturing parameter), Step 1230 may cause capturing of the at least one image of the object using the selected capturing parameter. In some examples, Step 1220 may analyze the at least one electronic record to identify an indication of a task in progress associated with the object, in response to a first identified indication of a task in progress, Step 1220 may select a first capturing parameter, in response to a second identified indication of a task in progress, Step 1220 may select a second capturing parameter (the second capturing parameter may differ from the first capturing parameter), Step 1230 may cause capturing of the at least one image of the object using the selected capturing parameter.

In some embodiments, Step 1310 may comprise accessing a previously captured image of an object in a construction site. Some non-limiting examples of such image may include images captured using at least one of a stationary camera positioned in the construction site, a mobile capturing device positioned in the construction site, an image acquisition robot, an image acquisition drone, a wearable capturing device worn by a person in the construction site, a color camera, a grayscale camera, a hyperspectral camera, a depth camera, a range camera, a stereo camera, an active stereo camera, a time-of-flight camera, and so forth. In one example, Step 1310 may use Step 710 to access the previously captured image. In another example, Step 1310 may access the previously captured image in a memory unit (such as memory units 210, shared memory modules 410, memory 600, and so forth). In yet another example, Step 1310 may access the previously captured image through a data communication network (such as communication network 130), for example using one or more communication devices (such as communication modules 230, internal communication modules 440, external communication modules 450, and so forth). In an additional example, Step 1310 may access the previously captured image using a database. In yet another example, Step 1310 may capture the previously captured image, for example using an image sensor positioned in the construction site.

In some embodiments, Step 1320 may comprise analyzing an image of the object, such as the previously captured image accessed by Step 1310, to determine at least one capturing parameter associated with the object for a prospective image capturing. Some non-limiting examples of such capturing parameters may include a distance of an image sensor from the object, a viewing angle of the object, a location in the construction site to capture the at least one image from, a direction of an image sensor used to capture the at least one image, an exposure time, a frame rate, a gain, an ISO speed, a stereo base, a focus, and so forth. For example, Step 1320 may use Step 1220 to determine the at least one capturing parameter associated with the object based on an analysis of a previously captured image of the object, for example as described above. In another example, in response to a first previously captured image, Step 1320 may determine a first at least one capturing parameter associated with the object, and in response to a second previously captured image, Step 1320 may determine a second at least one capturing parameter associated with the object, the second at least one capturing parameter may differ from the first at least one capturing parameter. In yet another example, a machine learning model may be trained using training examples to determine capturing parameters for prospective capturing of images from previously captured images, and Step 1320 may use the trained machine learning model to analyze the previously captured image of the object and determine the at least one capturing parameter. One example of such training example may include an image of an object, together with a label indicating a desired capturing parameter for a prospective capturing of images of the object. In another example, Steps 910, 920 and 930 may analyze the previously captured image and identify one or more discrepancies between the construction site and at least one electronic record, and Step 1320 may base the determination of the at least one capturing parameter associated with the object on the identified one or more discrepancies. In yet another example, Step 1120 may analyze the previously captured image to detect objects in the image and/or determine properties of the objects, and Step 1320 may base the determination of the at least one capturing parameter associated with the object on the detected objects, on whether particular objects are detected, on determined properties of the object, and so forth. Some non-limiting examples of such properties may type, dimension, shape, color, position, spatial orientation, defects, visual appearance, and so forth.

In some examples, the at least one capturing parameter associated with the object for the prospective image capturing determined by Step 1320 may be identical to a capturing parameter of the previously captured image accessed by Step 1310. For example, Step 1320 may comprise analyzing the previously captured image of the object accessed by Step 1310 to determine the capturing parameter of the previously captured image, and may select the at least one capturing parameter associated with the object for the prospective image capturing to be identical to the determined capturing parameter of the previously captured image. In some examples, the at least one capturing parameter associated with the object for the prospective image capturing determined by Step 1320 may differ from a capturing parameter of the previously captured image. In one example, Step 1320 may comprise analyzing the previously captured image of the object accessed by Step 1310 to determine the capturing parameter of the previously captured image, and may base the determined at least one capturing parameter associated with the object for the prospective image capturing on the determined capturing parameter of the previously captured image. In some examples, Step 1320 may comprise analyzing the previously captured image of the object accessed by Step 1310 to determine the capturing parameter of the previously captured image. For example, a machine learning model may be trained using training examples to determine capturing parameters of images, and Step 1320 may use the trained machine learning model to analyze the previously captured image of the object accessed by Step 1310 and determine the capturing parameter of the previously captured image. One example of such training example may include an image together with a label indicating the capturing parameters used to capture the image. In another example, some capturing parameters, such as pixel resolution, may be determined directly from the previously captured image.

In some examples, the at least one previously captured image may be analyzed to determine a property of at least part of the object (such as dimension, shape, color, spatial orientation, position, type, etc.), for example using Step 1120 as described above, and Step 1320 may comprise basing the determination of the at least one capturing parameter associated with the object for the prospective image capturing on the determined property of the at least part of the object. For example, in response to a first determined property, Step 1320 may select a first at least one capturing parameter associated with the object for the prospective image capturing, and in response to a second determined property, Step 1320 may select a second at least one capturing parameter associated with the object for the prospective image capturing, the second at least one capturing parameter may differ from the first at least one capturing parameter. In one example, the at least one previously captured image may be analyzed to determine a dimension of at least part of the object (such as size, area, volume, length, width, height, depth, planned dimension for at least part of the object, recorded dimension of at least part of the object, etc.), for example using Step 1120 as described above, and Step 1320 may comprise basing the determination of the at least one capturing parameter associated with the object on the determined dimension of the at least part of the object. In one example, the at least one previously captured image may be analyzed to determine a shape of at least part of the object, for example using Step 1120 as described above, and Step 1320 may comprise basing the determination of the at least one capturing parameter associated with the object on the determined shape of the at least part of the object. In one example, the at least one previously captured image may be analyzed to determine a color of at least part of the object, for example using Step 1120 as described above, and Step 1320 may comprise basing the determination of the at least one capturing parameter associated with the object on the determined color of the object. In one example, the at least one previously captured image may be analyzed to determine a spatial orientation of at least part of the object, for example using Step 1120 as described above, and Step 1320 may comprise basing the determination of the at least one capturing parameter associated with the object on the determined spatial orientation of the at least part of the object. In one example, the at least one previously captured image may be analyzed to determine a position of at least part of the object, for example using Step 1120 as described above, and Step 1320 may comprise basing the determination of the at least one capturing parameter associated with the object on the determined position of the at least part of the object. In one example, the at least one previously captured image may be analyzed to determine a type of the object, for example using Step 1120 as described above, and Step 1320 may comprise basing the determination of the at least one capturing parameter associated with the object on the determined type of the object. In one example, the at least one previously captured image may be analyzed to determine at least one construction error (such as a construction error related to the object), for example using Step 930 as described above, and Step 1320 may comprise basing the determination of the at least one capturing parameter associated with the object on the determined at least one construction error.

In some examples, Step 1320 may compare the previously captured image of the object (such as the previously captured image of the object accessed by Step 1310) may be compared with information related to the object in at least one electronic record, for example using Step 930 described above, to determine the at least one capturing parameter associated with the object for the prospective image capturing. For example, Step 1210 may be used to access at least one electronic record, Step 930 may analyze the previously captured image of the object and the at least one electronic record to identify discrepancies between the construction site and the at least one electronic record, and Step 1320 may base the determination of the at least one capturing parameter associated with the object on the determined type of the object. In one example, in response to a first identified discrepancy, Step 1320 may select a first at least one capturing parameter associated with the object for the prospective image capturing, and in response to a second identified discrepancy, Step 1320 may select a second at least one capturing parameter associated with the object for the prospective image capturing, the second at least one capturing parameter may differ from the first at least one capturing parameter. In another example, in response to an identified discrepancy, Step 1320 may select a first at least one capturing parameter associated with the object for the prospective image capturing, and in response to no identified discrepancies, Step 1320 may select a second at least one capturing parameter associated with the object for the prospective image capturing, the second at least one capturing parameter may differ from the first at least one capturing parameter. In one example, Step 1320 may comprise comparing the previously captured image of the object with information related to the object in a construction plan associated with the construction site, for example using Step 930 described above, to determine the at least one capturing parameter associated with the object for the prospective image capturing. In one example, Step 1320 may comprise comparing the previously captured image of the object with information related to the object in a progress record associated with the construction site, for example using Step 930 described above, to determine the at least one capturing parameter associated with the object for the prospective image capturing. In one example, Step 1320 may comprise comparing the previously captured image of the object with information related to the object in a financial record associated with the construction site, for example using Step 930 described above, to determine the at least one capturing parameter associated with the object for the prospective image capturing. In one example, Step 1320 may comprise comparing the previously captured image of the object with information related to the object in a project schedule associated with the construction site, for example using Step 930 described above, to determine the at least one capturing parameter associated with the object for the prospective image capturing.

In some examples, the previously captured image accessed by Step 1310 may depict a second object, and the second object may differ from the object. For example, the second object may encircle the object, the object and the second object may have direct contact, the object and the second object may be disjointed, the object and the second object may be positioned at least one foot from each other, and so forth. Further, in some examples, Step 1320 may analyze the previously captured image of the object to determine at least one capturing parameter associated with the second object (the at least one capturing parameter associated with the second object may differ from the at least one capturing parameter associated with the object), and Step 1330 may cause capturing, at the construction site, of an image of the second object using the determined at least one capturing parameter associated with the second object.

In some examples, the previously captured image accessed by Step 1310 may depict a second object, and the second object may differ from the object. For example, the second object may encircle the object, the object and the second object may have direct contact, the object and the second object may be disjointed, the object and the second object may be positioned at least one foot from each other, and so forth. Further, in some examples, Step 1320 may analyze the previously captured image of the object to determine the at least one capturing parameter associated with the object, and Step 1330 may cause capturing, at the construction site, of a single image of the object using the determined at least one capturing parameter. In one example, the single image may not include any depiction of any part of the second object. In another example, the single image may include a depiction of at least a part of the second object.

In some embodiments, the previously captured image of the object accessed by Step 1310 may be an image of the object captured at a first point in time, and a second image previously captured from the construction site at a second point in time may be accessed, for example as described above in relation to Step 1310 (the second point in time may differ from the first point in time).

In some embodiments, the previously captured image of the object accessed by Step 1310 may be an image of the object captured at a first point in time, and a second previously captured image of the object in the construction site captured at a second point in time may be accesses, for example as described above in relation to Step 1310 (the second point in time may differ from the first point in time). Further, Step 1320 may analyze the previously captured image of the object accessed by Step 1310 and the second previously captured image of the object to determine the at least one capturing parameter associated with the object for the prospective image capturing. In one example, the previously captured image of the object accessed by Step 1310 and the second previously captured image of the object may be images captured using the same image sensor. In another example, the previously captured image of the object accessed by Step 1310 and the second previously captured image of the object may be images captured using different image sensors. For example, Step 1320 may analyze the previously captured image of the object accessed by Step 1310 and the second previously captured image of the object to determine a change in a state of the object between the first point in time and the second point in time (for example as described above), and may base the determination of the at least one capturing parameter associated with the object for the prospective image capturing on the determined change in the state of the object between the first point in time and the second point in time. In another example, each one of the previously captured image accessed by Step 1310 and the second previously captured image may depict a second object (the second object may differ from the object), Step 1320 may analyze the previously captured image accessed by Step 1310 and the second previously captured image to determine a change in a state of the second object between the first point in time and the second point in time (for example as described above), and Step 1320 may base the determination of the at least one capturing parameter associated with the object for the prospective image capturing on the determined change in the state of the second object between the first point in time and the second point in time.

In some embodiments, the previously captured image of the object accessed by Step 1310 may be an image of the object captured at a first point in time, and a second image previously captured from the construction site at a second point in time may be accessed, for example as described above in relation to Step 1310 (the second point in time may differ from the first point in time). Further, in some examples, the previously captured image accessed by Step 1310 and the second previously captured image may be analyzed to determine whether the object was installed between the first point in time and the second point in time, for example as described above in relation to Step 930. Further, in some examples, in response to a determination that the object was installed between the first point in time and the second point in time, Step 1320 may select a first value for the at least one capturing parameter associated with the object for the prospective image capturing, and in response to a determination that the object was not installed between the first point in time and the second point in time, Step 1320 may select a second value for the at least one capturing parameter associated with the object for the prospective image capturing, the second value differs from the first value.

Capturing images from construction site may be beneficial to documentation of construction sites, and to analysis and control of the construction process. However, the image capturing may be costly and may pose significant burden. On the one hand, some useful image analysis may require high quality images (such as close-up images, high resolution images, etc.), and on the other hand, capturing large parts of the construction site in high quality images may be costly or practically impossible. Therefore, selecting parts of the construction site to be captured at higher quality may balance the capturing cost and the quality, focusing higher quality capturing on selected areas of the construction site and/or at selected times. For example, areas that did not show any change in low quality images may be left out of the captured high quality images, as well as areas that include no elements that require analysis of high quality images. On the other hand, areas that appear to have changed since a previous point in time and that include elements that require analysis of high quality images, may be included in a high quality capturing task. Image acquisition robots may enable capturing of high quality images (from selected distance, from selected angle, using selected capturing parameters, etc.), but may be expensive or otherwise unable to capture images of the entire construction site at a selected time frame. Controlling which areas of the construction site are captured using the image acquisition robots, and when the images are captured, may focus this limited resource to capture the most important images.

FIG. 14 illustrates an example of a method 1400 for controlling image acquisition robots in construction sites. In this example, method 1400 may comprise: obtaining a plurality of images captured in a construction site, the plurality of images comprises at least a first image corresponding to a first point in time and a second image corresponding to a second point in time (Step 1410); analyzing the first image and the second image to determine whether a change occurred in a particular area of the construction site between the first point in time and the second point in time (Step 1420); determining whether a higher quality image of the particular area of the construction site is needed (Step 1430); in response to a determination that a change occurred in the particular area of the construction site and a determination that a higher quality image is needed, causing an image acquisition robot to acquire at least one image of the particular area of the construction site (Step 1440); and in response to at least one of a determination that no change occurred in the particular area of the construction site and a determination that a higher quality image is not needed, withholding causing the image acquisition robot to acquire the at least one image of the particular area of the construction site (Step 1450). In some implementations, method 1400 may comprise one or more additional steps, while some of the steps listed above may be modified or excluded. In some implementations, one or more steps illustrated in FIG. 14 may be executed in a different order and/or one or more groups of steps may be executed simultaneously and vice versa. In one example, method 1400 may further comprise, in response to the determination that a change occurred in the particular area of the construction site and the determination that a higher quality image is needed, updating an electronic record associated with the construction site based on an analysis of the at least one image of the particular area of the construction site, for example using method 1100 described above.

In some embodiments, an image acquisition robot (such as the image acquisition robot of method 1400) may comprise at least two legs and may be configured to use the at least two legs to move in the construction site. In one example, the at least two legs may be at least three legs. In some embodiments, an image acquisition robot (such as the image acquisition robot of method 1400) may comprise a plurality of wheels and may be configured to use the plurality of wheels to move in the construction site. In one example, the plurality of wheels may be at least three wheels. In one example, the image acquisition robot may be configured to move by pushing against a floor with at least one of the plurality of wheels. In some embodiments, an image acquisition robot (such as the image acquisition robot of method 1400) may comprise at least one leg and at least one wheel.

In some embodiments, Step 1410 may comprise obtaining a plurality of images captured in a construction site, the plurality of images may comprise at least a first image corresponding to a first point in time and a second image corresponding to a second point in time, and the second point in time may differ from the first point in time. Some non-limiting examples of such images may include images captured using at least one of a stationary camera positioned in the construction site, a mobile capturing device positioned in the construction site, an image acquisition robot, an image acquisition drone, a wearable capturing device worn by a person in the construction site, a color camera, a grayscale camera, a hyperspectral camera, a depth camera, a range camera, a stereo camera, an active stereo camera, a time-of-flight camera, and so forth. In one example, Step 1410 may use Step 710 to access at least part of the plurality of images. In another example, Step 1410 may access at least part of the plurality of images in a memory unit (such as memory units 210, shared memory modules 410, memory 600, and so forth). In yet another example, Step 1410 may access at least part of the plurality of images through a data communication network (such as communication network 130), for example using one or more communication devices (such as communication modules 230, internal communication modules 440, external communication modules 450, and so forth). In an additional example, Step 1410 may access at least part of the plurality of images using a database. In yet another example, Step 1410 may capture at least part of the plurality of images, for example using an image sensor positioned in the construction site. In one example, the first image and the second image may be images captured using the same image sensor. In another example, the first image may be an image captured using a first image sensor, the second image may be an image captured using a second image sensor, and the second image sensor may differ from the first image sensor. In one example, the second image may be an image captured using an image sensor permanently fixed to a first location in the construction site, and the first image may be an image captured using the same image sensor permanently fixed to the first location in the construction site or using a different image sensor (such as a different permanently fixed camera, a wearable camera, an image acquisition robot, and so forth). In another example, the second image may be an image captured using a wearable image sensor worn by a person in the construction site, and the first image may be an image captured using the same wearable image sensor or using a different image sensor (such as a different wearable camera, a stationary camera, an image acquisition robot, and so forth).

In some embodiments, Step 1420 may comprise analyzing the first image and the second image to determine whether a change occurred in a particular area of the construction site between the first point in time and the second point in time. Step 1420 may take into account only changes that are significant to the construction process and ignore other changes that are insignificant to the construction process. For example, Step 1420 may determine a change in response to an installation of elements in the particular area of the construction site, and may determine that no change occurred in the particular area of the construction site in response to garbage being collected from the particular area of the construction site. In one example, a machine learning model may be trained using training examples to determine whether changes significant to the construction process occurred in the particular area of the construction site from images, and Step 1420 may use the trained machine learning model to analyze the first image and the second image and determine whether a change occurred in the particular area of the construction site between the first point in time and the second point in time. One example of such training example may include a pair of images of a portion of a construction site, together with a label indicating whether a change significant to the construction process occurred in the portion of the construction site. In another example, Step 1420 may use an object detector to analyze the first image and the second image and detect elements in the particular area of the construction site at the first point in time and at the second point in time. Further, Step 1420 may compare the elements detected in the particular area of the construction site at the two points in time. In response to a first result of the comparison (such as addition and/or removals of elements that are significant to the construction process), Step 1420 may determine that a change occurred in the particular area of the construction site between the first point in time and the second point in time, and in response to a second result of the comparison (such as no change in the detected elements, addition and/or removals only of elements that are insignificant to the construction process, etc.), Step 1420 may determine that a change did not occurred in the particular area of the construction site between the first point in time and the second point in time In some embodiments, Step 1430 may comprise determining whether a higher quality image of the particular area of the construction site is needed. In some examples, Step 1430 may base the determination of whether a higher quality image of the particular area of the construction site is needed on an analysis of an electronic record associated with the construction site and/or on an analysis of at least part of the plurality of images. In some examples, Step 1430 may base the determination of whether a higher quality image of the particular area of the construction site is needed on an analysis of at least part of the plurality of images obtained by Step 1410, for example as described above in relation to methods 1200 and 1300. For example, the analyzed at least part of the plurality of images obtained by Step 1410 may include the second image, may not include the second image, may include a part of the second image, and so forth. In one example, a machine learning model may be trained using training example to determine a need for higher quality image from previously captured images, and Step 1430 may use the trained machine learning model to analyze the at least part of the plurality of images obtained by Step 1410 and determine whether a higher quality image of the particular area of the construction site is needed. One example of such training examples may include an image of a portion of a construction site, together with a label indicating whether a higher quality image of the portion of a construction site is needed. In some examples, Step 1430 may base the determination of whether a higher quality image of the particular area of the construction site is needed on an analysis of an electronic record associated with the construction site, for example as described above in relation to methods 1200 and 1300. In one example, Step 1430 may analyze a progress record to identify a progress to at least one task related to the particular area of the construction site, and may base the determination of whether a higher quality image of the particular area of the construction site is needed on the identified progress to the at least one task. In another example, Step 1430 may analyze a financial record to identify at least one financial transaction related to the particular area of the construction site, and may base the determination of whether a higher quality image of the particular area of the construction site is needed on the identified at least one financial transaction. In yet another example, Step 1430 may analyze a project schedule to identify at least one scheduled task related to the particular area of the construction site, and may base the determination of whether a higher quality image of the particular area of the construction site is needed on the identified at least one scheduled task. For example, Step 1430 may use Natural Language Processing (NLP) algorithms to analyze textual information from the electronic record associated with the construction site (for example, from the progress record, from the financial record, from the project schedule, and so forth), and may base the determination of whether a higher quality image of the particular area of the construction site is needed on a result of the analysis of the textual information. In another example, the electronic record may include structured data (for example in a data structure, in a tabular form, in a database, and so forth), Step 1430 may obtain particular information from the structured data (such as information related to the at least one task, to the at least one financial transaction, to the at least one scheduled task, to the particular area of the construction site, and so forth), and may base the determination of whether a higher quality image of the particular area of the construction site is needed on the obtained particular information.

In some embodiments, Step 1440 may comprise causing an image acquisition robot to acquire at least one image of the particular area of the construction site, for example in response to a determination by Step 1420 that a change occurred in the particular area of the construction site and a determination by Step 1430 that a higher quality image is needed. In some examples, Step 1440 may comprise providing information configured to cause the image acquisition robot to acquire the at least one image of the particular area of the construction site. For example, Step 1440 may provide the information to the image acquisition robot, to an external system controlling (directly or indirectly) the image acquisition robot, to a different process controlling (directly or indirectly) the image acquisition robot, and so forth. For example, the provided information may include one or more of an indication of at least one capturing parameter, an indication of the particular area of the construction site, an indication of a planned capturing time, an indication of a planned capturing position, an indication of a planned capturing angle, navigation data to the planned capturing position, and so forth. In one example, Step 1440 may comprise causing the image acquisition robot to move to a particular position in the construction site and to capture the at least one image from the particular position. In one example, Step 1440 may further comprise at least one of receiving the captured at least one image, analyzing the captured at least one image, updating electronic records associated with the construction site based on an analysis of the captured at least one image, providing information to users based on an analysis of the captured at least one image, and so forth.

In some embodiments, Step 1450 may comprise withholding and/or forgoing causing the image acquisition robot to acquire the at least one image of the particular area of the construction site, for example in response to at least one of a determination by Step 1420 that no change occurred in the particular area of the construction site and a determination by Step 1430 that a higher quality image is not needed.

In some examples, one or more images (such as, at least part of the plurality of images obtained by Step 1410) may be analyzed to determine a type of the change that occurred in the particular area of the construction site between the first point in time and the second point in time. Some non-limiting examples of such types may include 'Element Installed', 'Element Removed', 'Element Created', 'Material Applied', 'Elements Connected', 'Action Performed', and so forth. In some examples, the type of the change may further be based on the particular element and/or material and/or action corresponding to the change. For example type 'Electrical Box Installed' may differ from 'Pipe Installed' and from 'Electrical Box Removed'. In one example, a machine learning model may be trained using training examples to determine types of changes from images, and the trained machine learning model may be used to analyze the at least part of the plurality of images and determine the type of the change. An example of such training example may include one or more images depicting a particular change in a construction site, together with an indication of a type of the particular change. In another example, an action recognition algorithm may be used to analyze the at least part of the plurality of images to identify an action taken place in the construction site (such as an installation of an object, an application of a material, a destruction of an element, etc.), and the type of change may be determined based on the identified action. In some embodiments, method 1400 may further comprise analyzing at least part of the plurality of images obtained by Step 1410 to determine a type of the change that occurred in the particular area of the construction site between the first point in time and the second point in time, for example as described above. Further, in response to a first determined type of the change, Step 1440 may cause the image acquisition robot to acquire the at least one image of the particular area of the construction site, and in response to a second determined type of the change, causing the image acquisition robot to acquire the at least one image of the particular area of the construction site may be withheld and/or forgone.

In some embodiments, method 1400 may further comprise analyzing at least part of the plurality of images obtained by Step 1410 to select at least one image capturing parameter, for example using Step 1320, and in response to the determination that a change occurred in the particular area of the construction site by Step 1420 and the determination that a higher quality image is needed by Step 1430, Step 1440 may cause the image acquisition robot to acquire at least one image of the particular area of the construction site using the selected at least one image capturing parameter. In some embodiments, method 1400 may further comprise analyzing at least part of the plurality of images (for example, the first image and the second image, the second image, a different image, a part of an image, etc.) to determine a type of the change that occurred in the particular area of the construction site between the first point in time and the second point in time, for example as described above. Further, in response to a first determined type of the change, Step 1440 may cause the image acquisition robot to acquire the at least one image of the particular area of the construction site using a first image capturing parameter, and in response to a second determined type of the change, Step 1440 may cause the image acquisition robot to acquire the at least one image of the particular area of the construction site using a second image capturing parameter, the second image capturing parameter may differ from the first image capturing parameter.

In some embodiments, method 1400 may further comprise analyzing at least part of the plurality of images obtained by Step 1410 to select a first image acquisition position, for example using Step 1320, and in response to the determination that a change occurred in the particular area of the construction site by Step 1420 and the determination that a higher quality image is needed by Step 1430, Step 1440 may cause the image acquisition robot to move to the first image acquisition position and to capture from the first image acquisition position the at least one image of the particular area of the construction site. In some embodiments, method 1400 may further comprise analyzing at least part of the plurality of images (for example, the first image and the second image, the second image, a different image, a part of an image, etc.) to determine a type of the change that occurred in the particular area of the construction site between the first point in time and the second point in time, for example as described above. Further, in response to a first determined type of the change, Step 1440 may cause the image acquisition robot to move to a first image acquisition position and capture from the first image acquisition position the at least one image of the particular area of the construction site, and in response to a second determined type of the change, Step 1440 may cause the image acquisition robot to move to a second image acquisition position and capture from the second image acquisition position the at least one image of the particular area of the construction site, the second image acquisition position may differ from the first image acquisition position.

In some embodiments, method 1400 may further comprise causing the image acquisition robot to acquire an image of a second area of the construction site (the image may depict no part of the particular area of the construction site), for example as described above in relation to Step 1440. In some examples, the second area of the construction site and the particular area of the construction site may be at the same room in the construction site, at different rooms in the construction site, at different apartments in the construction site, at different floors in the construction site, at least a selected distance from each other (for example, at least one meter, at least ten meters, etc.), adjunct to each other, and so forth. Further, in some examples, the image of the second area of the construction site may be analyzed to determine whether to acquire the at least one image of the particular area of the construction site, for example as described above. Further, in some examples, in response to a determination to acquire the at least one image of the particular area of the construction site, Step 1440 may cause the image acquisition robot to move to a particular image acquisition position and capture from the particular image acquisition position the at least one image of the particular area of the construction site, and in response to a determination not to acquire the at least one image of the particular area of the construction site, causing the image acquisition robot to move to a particular image acquisition position and withholding causing the image acquisition robot to capture the at least one image of the particular area of the construction site may be withheld and/or forgone. In one example, the acquiring of the image of a second area of the construction site by the image acquisition robot may be performed from a second image acquisition position of the construction site, and method 1400 may further comprise analyzing an electronic record associated with the construction site to select the particular image acquisition position and the second image acquisition position, for example as described above.

In some embodiments, the second image obtained by Step 1410 may be an image captured using the image acquisition robot from a first location in the construction site, and Step 1440 may cause the image acquisition robot to acquire the at least one image of the particular area of the construction site from a second location in the construction site, the second location may differ from the first location and may be configured to provide higher quality image of the particular area of the construction site. For example, the second location may be closer to the particular area of the construction site. In another example, the second location may be configured to reduce glare.

Tasks in the construction site have to be performed at a particular sequence. Performing the tasks in an incorrect sequence may cause construction errors, necessitate rework, incur costs, and/or cause safety related issues. The large number of construction workers and subcontractors involves in the construction process makes the enforcement of the sequence of tasks oppressively burdensome, which in turn may slow and complicate the construction process. Automating the monitoring of the sequence of events may reduce construction errors, rework, costs, and so forth.

FIG. 15 illustrates an example of a method 1500 for monitoring sequence of events in construction sites. In this example, method 1500 may comprise: obtain a first image captured in a construction site using an image sensor, the first image corresponding to a first point in time (Step 1510); analyzing the first image to determine whether a first event occurred in the construction site prior to the first point in time (Step 1520); determining whether a second event occurred in the construction site prior to the first point in time (Step 1530); in response to a determination that the first event occurred in the construction site prior to the first point in time and a determination that the second event did not occur in the construction site prior to the first point in time, providing a first notification (Step 1540); and in response to at least one of a determination that the first event did not occur in the construction site prior to the first point in time and a determination that the second event occurred in the construction site prior to the first point in time, forgoing providing the first notification (Step 1550). In some implementations, method 1500 may comprise one or more additional steps, while some of the steps listed above may be modified or excluded. In some implementations, one or more steps illustrated in FIG. 15 may be executed in a different order and/or one or more groups of steps may be executed simultaneously and vice versa. In some examples, the first event may include an installation of a first object in a particular area of the construction site, and/or the second event may include an installation of a second object in the particular area of the construction site. In one example, the second object may comprise at least one of a gas pipe and an electrical wire. In one example, the first object may comprise a water pipe. In one example, the first object may comprise plaster. In one example, the first object may comprise one or more tiles. In some examples, the second event may include drying of a particular material in a selected area of the construction site. In some examples, the second event may include an inspection event. In some examples, the second event may include a rough-in inspection and the first event may include closing of at least one of a wall and a ceiling with one or more wallboards. In some examples, the second event may include an inspection of plumbing systems and the first event may include installation of a particular fixture. In some examples, the second event may include a moisture barrier inspection and the first event may include an installation of an exterior finishing material. In some examples, the second event may include an insulation inspection and the first event may include covering insulation. In some examples, the second event may include an installation of an underground duct and the first event may include backfilling. In some examples, the first event may include backfilling and the second event may include an installation of at least one of an underground duct, an underground fuel pipe, a conduit, a cable and a pipe. In some examples, the second event may include placement of reinforcement steel and the first event may include placing of concrete. In some examples, the second event may include excavating a trench and the first event may include placing of concrete.

In some embodiments, Step 1510 may comprise obtaining a first image captured in a construction site using an image sensor, the first image may correspond to a first point in time. Some non-limiting examples of such first image may include an image captured using at least one of a stationary camera positioned in the construction site, a mobile capturing device positioned in the construction site, an image acquisition robot, an image acquisition drone, a wearable capturing device worn by a person in the construction site, a color camera, a grayscale camera, a hyperspectral camera, a depth camera, a range camera, a stereo camera, an active stereo camera, a time-of-flight camera, and so forth. In one example, Step 1510 may use Step 710 to access at least part of the first image. In another example, Step 1510 may access at least part of the first image in a memory unit (such as memory units 210, shared memory modules 410, memory 600, and so forth). In yet another example, Step 1510 may access at least part of the first image through a data communication network (such as communication network 130), for example using one or more communication devices (such as communication modules 230, internal communication modules 440, external communication modules 450, and so forth). In an additional example, Step 1510 may access at least part of the first image using a database. In yet another example, Step 1510 may capture at least part of the first image, for example using an image sensor positioned in the construction site.

In some embodiments, Step 1520 may comprise analyzing the first image obtained by Step 1510 to determine whether a first event occurred in the construction site prior to the first point in time corresponding to the first image obtained by Step 1510. Some non-limiting examples of such first event may include an installation of an object (such as gas pipe, an electrical wire, a pipe, water pipe, electrical box, fixture, one or more tiles, an underground duct, an underground fuel pipe, a conduit, a cable, etc.) in a particular area of the construction site, an application of a material (such as plaster, paint, etc.) in a particular area of the construction site, drying of a particular material in a selected area of the construction site, closing of at least one of a wall and a ceiling with one or more wallboards, an installation of a particular fixture, an installation of an exterior finishing material, covering insulation, backfilling, placement of reinforcement steel, placing of concrete, excavation, excavating a trench, marking of utility lines and/or pipes, and so forth. In one example, a machine learning model may be trained using training examples to determine whether events occurred in construction sites prior to selected points in time based on images corresponding to the points in time, and Step 1520 may use the trained machine learning model to analyze the first image obtained by Step 1510 and determine whether the first event occurred in the construction site prior to the first point in time. One example of such training example may include an image of a portion of a construction site, together with a label indicating whether a particular event occurred in the portion of the construction site prior to a time corresponding to the image.

In some examples, the first image obtained by Step 1510 may be analyzed to attempt to detect an object of a selected object type in a particular area of the construction site, for example using an object detection algorithm. In response to a successful detection of an object of the selected type in the particular area of the construction site, Step 1520 may determine that the first event occurred in the construction site prior to the first point in time, and in response to a failure to detect an object of the selected type in the particular area of the construction site, Step 1520 may determine that the first event did not occur in the construction site prior to the first point in time.

In some embodiments, Step 1530 may comprise determining whether a second event occurred in the construction site prior to the first point in time corresponding to the first image obtained by Step 1510. Some non-limiting examples of such second event may include an installation of an object (such as gas pipe, an electrical wire, a pipe, water pipe, electrical box, fixture, one or more tiles, an underground duct, an underground fuel pipe, a conduit, a cable, etc.) in a particular area of the construction site, an application of a material (such as plaster, paint, etc.) in a particular area of the construction site, drying of a particular material in a selected area of the construction site, an inspection event, a rough-in inspection, an inspection of plumbing systems, a moisture barrier inspection, an insulation inspection, closing of at least one of a wall and a ceiling with one or more wallboards, installation of a particular fixture, an installation of an exterior finishing material, covering insulation, backfilling, placement of reinforcement steel, placing of concrete, excavation, excavating a trench, marking of utility lines and/or pipes, and so forth. In some examples, Step 1530 may comprise analyzing one or more images captured in the construction site before the first point in time to determine whether the second event occurred in the construction site prior to the first point in time. For example, Step 1530 may be analyzed using an event detection algorithm to identify an occurrence of the second event while the one or more images are captured, and therefore determine that the second event occurred in the construction site prior to the first point in time. In some examples, Step 1530 may comprise analyzing the first image to determine whether the second event occurred in the construction site prior to the first point in time. For example, Step 1530 may analyze the first image to identify a result of the second event, and therefore determine that the second event occurred in the construction site prior to the first point in time. In another example, Step 1530 may analyze the first image to identify an installed object in the first image, and therefore determine that an installation event of the object occurred in the construction site prior to the first point in time. In some examples, a second image captured in the construction site may be obtained, the second image may correspond to a second point in time, and the first point in time may be earlier than the second point in time. Further, the first image and the second image may be analyzed to determine whether the second event occurred in the construction site between the first point in time and the second point in time (for example as described above). Further, in response to a determination that the second event occurred in the construction site between the first point in time and the second point in time, Step 1530 may determine that the second event did not occur in the construction site prior to the first point in time.

In some examples, Step 1530 may comprise analyzing an electronic record associated with the construction site to determine whether the second event occurred in the construction site prior to the first point in time. For example, Step 1530 may analyze a progress record associated with the construction site to determine whether the second event occurred in the construction site prior to the first point in time, for example by identifying a progress report in the progress record that indicates an occurrence of the second event. In another example, Step 1530 may analyze a project schedule associated with the construction site to determine whether the second event occurred in the construction site prior to the first point in time, for example by identifying a task (such as a scheduled task, a completed task, etc.) in the project schedule that indicates an occurrence of the second event. In yet another example, Step 1530 may analyze a financial record associated with the construction site to determine whether the second event occurred in the construction site prior to the first point in time, for example by identifying a financial transaction in the financial record that indicates an occurrence of the second event.

In some embodiments, Step 1540 may comprise, in response to a determination by Step 1520 that the first event occurred in the construction site prior to the first point in time and a determination by Step 1530 that the second event did not occur in the construction site prior to the first point in time, providing a first notification. For example, Step 1540 may provide the first notification to a user, to another process, to an external device, and so forth. In one example, Step 1540 may provide the first notification to a user as a visual output, an audio output, a tactile output, any combination of the above, and so forth. In one example, Step 1540 may provide the first notification to a user using the apparatus analyzing the information (for example, an apparatus performing at least part of Step 1520 and/or Step 1530), through another apparatus (such as a mobile device associated with the user, mobile phone 111, tablet 112, and personal computer 113, etc.), and so forth. In some examples, the first notification provided by Step 1540 may include at least one of an indication of at least one of the first event and the second event, information related to the capturing of the first image obtained by Step 1510 (such as capturing time, capturing position, capturing method, etc.), and so forth.

In some embodiments, Step 1550 may comprise, in response to at least one of a determination by Step 1520 that the first event did not occur in the construction site prior to the first point in time and a determination by Step 1530 that the second event occurred in the construction site prior to the first point in time, forgoing providing the first notification.

In some embodiments, method 1500 may further comprise identifying a safety issue related to a prospective event in the construction site based on the determination by Step 1520 that the first event occurred in the construction site prior to the first point in time and the determination by Step

1530 that the second event did not occur in the construction site prior to the first point in time. For example, the first event may include preparation for at least one of excavation and trenching, the second event may include marking of utility lines and/or pipes. In one example, the first notification provided by Step 1540 may include an indication of the identified safety issue. In some embodiments, method 1500 may further comprise identifying a construction error based on the determination by Step 1520 that the first event occurred in the construction site prior to the first point in time and the determination by Step 1530 that the second event did not occur in the construction site prior to the first point in time. In one example, the first notification provided by Step 1540 may include an indication of the identified construction error. For example, the first notification provided by Step 1540 may be configured to cause a correction of the identified construction error.

Tasks in the construction site have to be performed at a particular sequence. Performing the tasks in an incorrect sequence may cause construction errors, necessitate rework, incur costs, and/or cause safety related issues. The large number of construction tasks, and the large number of factors that may affect the selection of the correct sequence for the tasks, makes the selection of the sequence of tasks oppressively burdensome. Automating the determination of the desired sequence of tasks may reduce construction errors, rework, costs, and so forth.

FIG. 16 illustrates an example of a method 1600 for determining schedule constraints from construction plans. In this example, method 1600 may comprise: obtaining at least part of a construction plan for a construction site (Step 1610); analyzing the at least part of the construction plan to identify a first object of a first object type planned to be constructed in the construction site, a first element of a first element type planned to be connected to the first object, and a second element of a second element type planned to be connected to the first object (Step 1620); based on the first object type, determining a first plurality of construction tasks for the construction of the first object, the first plurality of construction tasks comprises at least a first construction task and a second construction task (Step 1630); based on the first element type, determining a second plurality of construction tasks for the construction of the first object and related to the first element, the second plurality of construction tasks comprises at least a third construction task and a fourth construction task (Step 1640); based on the second element type, determining a third plurality of construction tasks for the construction of the first object and related to the second element, the third plurality of construction tasks comprises at least a fifth construction task and a sixth construction task (Step 1650); and based on the first element type and the second element type, determining that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task (Step 1660). In some implementations, method 1600 may comprise one or more additional steps, while some of the steps listed above may be modified or excluded. In some implementations, one or more steps illustrated in FIG. 16 may be executed in a different order and/or one or more groups of steps may be executed simultaneously and vice versa.

Some non-limiting examples of such elements (such as the first element, the second element, etc.) may comprise a water element, an electrical element, a sink, an electrical outlet, a water pipe, a tunnel, electrical wires, studs, a gas outlet, a gas pipe, and so forth. Some non-limiting examples of such first object may include at least part of a wall planned to be constructed in the construction site, at least part of a masonry wall planned to be constructed in the construction site, at least part of a stud wall planned to be constructed in the construction site, at least part of a room planned to be constructed in the construction site, at least part of a wall planned to be constructed in the construction site, at least part of a floor planned to be constructed in the construction site and at least part of a ceiling planned to be constructed in the construction site, and so forth. In one example, an object (such as the first object) may comprise an object with a surface, and a task (such as the first task, the second task, etc.) may comprise building at least part of the object, covering at least part of the surface (for example, with at least one of plaster, paint and tiles), finishes, and so forth. In one example, an object (such as the first object) may comprise a wall, and a task (such as the first task, the second task, etc.) may comprise building at least part of the wall, plastering the wall, painting the wall, placing tiles on the wall, building wall frames, installing plaster guides, installing top tracks, installing studs, installing insulation material, installing boards, finishes, and so forth. In one example, one of the elements (such as the first element, the second element, etc.) may comprise a water element, and a task (such as the third task, the fourth task, the fifth task, the sixth task, etc.) may comprise at least one of placing a water pipe in at least part of the first object, installing water junction, placing the water element, and so forth. In one example, one of the elements (such as the first element, the second element, etc.) may comprise an electrical element, and a task (such as the third task, the fourth task, the fifth task, the sixth task, etc.) may comprise at least one of placing a tunnel for electrical wires in at least part of the first element, placing the electrical element, installing conduit, installing electric junction box, installing support, installing outlet, installing cover plate, and so forth. In one example, one of the elements (such as the first element, the second element, etc.) may comprise a gas element, and a task (such as the third task, the fourth task, the fifth task, the sixth task, etc.) may comprise, installing gas pipes, installing gas junction box, installing gas outlet, installing covering plate, and so forth. In one example, one of the elements (such as the first element, the second element, etc.) may comprise a sink, and a task (such as the third task, the fourth task, the fifth task, the sixth task, etc.) may comprise placing a water pipe in the at least part of the first object, placing the sink, and so forth. In one example, one of the elements (such as the first element, the second element, etc.) may comprise an electrical outlet, and a task (such as the third task, the fourth task, the fifth task, the sixth task, etc.) may comprise placing a tunnel for electrical wires in the at least part of the first object, placing the electrical outlet, and so forth. In some examples, the first element may comprise a water element planned to be connected to the first object, the second element may comprise an electrical element planned to be connected to the first object, the first task may comprise building at least part of the first object, the second task may comprise covering at least part of the first object with at least one of plaster, paint and tiles, the third task comprises placing a water pipe in at least part of the first object, the fourth task may comprise placing the water element, the fifth task may comprise placing a tunnel for electrical wires in at least part of the first element, and the sixth task may comprise placing the electrical element. In some examples, the first object may comprise at least part of a wall planned to be constructed in the construction site, the first element may comprise a sink planned to be connected to the at least part of the wall, the second element may comprise an electrical outlet planned to be connected to the at least part of the wall, the first task may comprise building the at least part of the wall, the second task may comprise plastering the at least part of the wall, the third task may comprise placing a water pipe in the at least part of the wall, the fourth task may comprise placing the sink, the fifth task may comprise placing a tunnel for electrical wires in the at least part of the wall, and the sixth task may comprise placing the electrical outlet. In some examples, the first object may comprise at least one of at least part of a room planned to be constructed in the construction site, at least part of a wall planned to be constructed in the construction site, at least part of a floor planned to be constructed in the construction site and at least part of a ceiling planned to be constructed in the construction site.

In some embodiments, Step 1610 may comprise obtaining at least part of a construction plan for a construction site. In one example, Step 1610 may use Step 920 to obtain the at least part of the construction plan for the construction site. In another example, Step 1610 may read the at least part of the construction plan for the construction site from a memory unit (such as memory units 210, shared memory modules 410, memory 600, and so forth). In yet another example, Step 1610 may receive the at least part of the construction plan for the construction site through a data communication network (such as communication network 130), for example using one or more communication devices (such as communication modules 230, internal communication modules 440, external communication modules 450, and so forth). In an additional example, Step 1610 may access the at least part of the construction plan for the construction site through a database.

In some embodiments, Step 1620 may comprise analyzing the at least part of the construction plan to identify a first object of a first object type planned to be constructed in the construction site, a first element of a first element type planned to be connected to the first object, and a second element of a second element type planned to be connected to the first object. For example, the at least part of the construction plan may include a data structure of objects and/or elements, and Step 1620 may analyze the data structure to identify the first object and/or the first element and/or the second element. In another example, the at least part of the construction plan may include an architectural plan, and Step 1620 may analyze the architectural plan to identify the first object and/or the first element and/or the second element.

In some examples, Step 1620 may analyze the at least part of the construction plan obtained by Step 1610 to identify spatial relationships among the first object, the first element and the second element. For example, the at least part of the construction plan may include a data structure of relations among objects and/or elements, and Step 1620 may analyze the data structure to identify the spatial relationship. In another example, the at least part of the construction plan may include a position of objects and/or elements, and the Step 1610 may identify spatial relationships based on distances between the objects and/or elements.

In some embodiments, Step 1630 may comprise determining, based on the first object type, a first plurality of construction tasks for the construction of the first object, the first plurality of construction tasks may comprise at least a first construction task and a second construction task. For example, in response to one value of the first object type, Step 1630 may determine one first plurality of construction tasks, including one particular first construction task and one particular second construction task, and in response to a different value of the first object type, Step 1630 may determine a different first plurality of construction tasks, including a different first construction task and/or a different second construction task. In one example, Step 1630 may use the first object type to access a data structure that connects object types to construction tasks and obtain the from the data structure the first plurality of construction tasks connected to the first object type in the data structure.

In some embodiments, Step 1640 may comprise determining, based on the first element type, a second plurality of construction tasks for the construction of the first object and related to the first element, the second plurality of construction tasks may comprise at least a third construction task and a fourth construction task. For example, in response to one value of the first element type, Step 1640 may determine one second plurality of construction tasks, including one particular third construction task and one particular fourth construction task, and in response to a different value of the first element type, Step 1640 may determine a different second plurality of construction tasks, including a different third construction task and/or a different fourth construction task. In one example, Step 1640 may use the first element type to access a data structure that connects object types to construction tasks and obtain the from the data structure the second plurality of construction tasks connected to the first element type in the data structure.

In some embodiments, Step 1650 may comprise determining, based on the second element type, a third plurality of construction tasks for the construction of the first object and related to the second element, the third plurality of construction tasks may comprise at least a fifth construction task and a sixth construction task. For example, in response to one value of the second element type, Step 1650 may determine one third plurality of construction tasks, including one particular fifth construction task and one particular sixth construction task, and in response to a different value of the second element type, Step 1650 may determine a different third plurality of construction tasks, including a different fifth construction task and/or a different sixth construction task. In one example, Step 1650 may use the second element type to access a data structure that connects object types to construction tasks and obtain the from the data structure the third plurality of construction tasks connected to the second element type in the data structure.

In some embodiments, Step 1660 may comprise determining, based on the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to a first pair of the first element type and the second element type, Step 1660 may determine a first sequence of tasks, and in response to a second pair of the first element type and the second element type, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, Step 1660 may further base the determination of the sequence of tasks on the first object type. For example, Step 1660 may comprise determining, based on the first object type, the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to one first object type, Step 1660 may determine a first sequence of tasks, and in response to a different first object type, Step 1660 may determine a second sequence of tasks, the second sequence may differ from the first sequence. In some examples, the first object may include at least part of a wall, in response to the wall being a masonry wall, Step 1660 may determine a first sequence of tasks, and in response to the wall being a stud wall, Step 1660 may determine a second sequence of tasks, the second sequence may differ from the first sequence. In some examples, in response to the first object type being a floor, Step 1660 may determine a first sequence of tasks, and in response to the first object type being a wall, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, Step 1660 may further base the determination of the sequence of tasks on the dimension of the first object. For example, Step 1660 may comprise determining, based on the dimension of the first object, the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to one dimension of the first object, Step 1660 may determine a first sequence of tasks, and in response to a different dimension of the first object, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, Step 1620 may analyze the at least part of the construction plan obtained by Step 1610 to identify spatial relationships among the first object, the first element and the second element, for example as described above, and Step 1660 may further base the determination of the sequence of tasks on the identified spatial relationships. For example, Step 1660 may comprise determining, based on the identified spatial relationships, the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to one set of identified spatial relationships, Step 1660 may determine a first sequence of tasks, and in response to a different set of identified spatial relationships, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, Step 1620 may analyze the at least part of the construction plan obtained by Step 1610 to identify a second object, for example as described above, and Step 1660 may further base the determination of the sequence of tasks on the identified second first object. For example, Step 1660 may comprise determining, based on the identified second object, the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to one identified second object, Step 1660 may determine a first sequence of tasks, and in response to a different identified second object, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, an image captured in the construction site may be analyzed, for example as described herein (for example in relation to Step 720, Step 730, Step 930, Step 940, Step 1120, Step 1220, Step 1320, Step 1420, Step 1430, Step 1520, Step 1530, Step 1720, Step 1820, Step 1830, Step 1902, Step 1910, Step 1916, Step 1922, Step 1928, etc.), and Step 1660 may further base the determination of the sequence of tasks on a result of the analysis of the image. For example, Step 1660 may comprise determining, based on the result of the analysis of the image, the first element type and the second element type, that the first construction task needs to be performed before the third construction task, that the third construction task needs to be performed before the fifth construction task, that the fifth construction task needs to be performed before the second construction task, and that the second construction task needs to be performed before the fourth construction task and the sixth construction task. In some examples, in response to a first result of the analysis of the image, Step 1660 may determine a first sequence of tasks, and in response to a second result of the analysis of the image, Step 1660 may determine a second sequence of tasks, the second sequence may differ from the first sequence. For example, in the first sequence of tasks, task A may need to be performed before task B, while in the second sequence of tasks, task B may need to be performed before task A. In another example, in the first sequence of tasks, task A may need to be performed before task B, while in the second sequence of tasks, task A may be performed before, concurrently or after task B.

In some embodiments, method 1600 may further comprise providing information indicative of the sequence of tasks determined by Step 1660. For example, the information indicative of the sequence of tasks may be provided to a user, may be transmitted to an external device, may be transmitted over a data communication network (such as communication network 130), for example using one or more communication devices (such as communication modules 230, internal communication modules 440, external communication modules 450, and so forth), may be stored in a memory unit (such as memory units 210, shared memory modules 410, memory 600, and so forth), and so forth.

In some embodiments, a plurality of images captured in the construction site may be obtained, for example using Step 710 and/or Step 1410. The plurality of images may be analyzed to determine whether an actual performance sequence of tasks at the construction site comply with the determined sequence of tasks, for example using method 1500. Further, in some examples, in response to a determination that the actual performance sequence of tasks do not comply with the determined sequence of tasks, a first notification may be provided (for example as described above), and in response to a determination that the actual performance sequence of tasks comply with the determined sequence of tasks, providing the first notification may be withheld and/or forgone.

In some embodiments, at least one image captured in the construction site may be obtained, for example using Step 710 and/or Step 1410. The at least one image may be analyzed to determine that at a particular point in time a performance of the second construction task began and a performance of the fifth construction task is incomplete, for example using Step 1520 and/or Step 1530. Further, in some examples, in response to the determination that at the particular point in time the performance of the second construction task began and the performance of the fifth construction task is incomplete, a notification may be provided, for example as described above. In one example, the notification may be configured to cause a halt in the performance of the second construction task.

In some embodiments, at least one image captured in the construction site may be obtained, for example using Step 710 and/or Step 1410. The at least one image may be analyzed to identify at least one task performed in the construction site, for example using Step 1520. Further, in some examples, for example based on the identified at least one task performed in the construction site and the sequence of tasks determined by Step 1660, a prospective task may be selected. Further, in some examples, an indication of the selected prospective task may be provided. For example, the indication of the selected prospective task may be provided to a user, may be transmitted to an external device, may be transmitted over a data communication network (such as communication network 130), for example using one or more communication devices (such as communication modules 230, internal communication modules 440, external communication modules 450, and so forth), may be stored in a memory unit (such as memory units 210, shared memory modules 410, memory 600, and so forth), and so forth. In one example, the indication of the selected prospective task may be configured to cause a performance of the selected prospective task.

In some embodiments, an electronic record associated with the construction site may be analyzed to identify at least one task performed in the construction site, for example using Step 1530. Further, based on the identified at least one task performed in the construction site and the sequence of tasks determined by Step 1660, a prospective task may be selected. Further, in some examples, an indication of the selected prospective task may be provided, for example as described above. In one example, the indication of the selected prospective task may be configured to cause a performance of the selected prospective task. In one example, the electronic record may include a financial record associated with the construction site. In one example, the electronic record may be a progress record associated with the construction site.

In some embodiments, the at least part of the construction plan may be analyzed to identify a second object of the first object type planned to be constructed in the construction site, for example as described above. Further, in some examples, a fourth plurality of construction tasks for the construction of the second object may be identified, for example as described above, the fourth plurality of construction tasks may comprise at least a particular construction task. The at least part of the construction plan may be analyzed to determine whether the first object is bigger than the second object. In one example, in response to a determination that the first object is bigger than the second object, determining that the first construction task needs to be performed before the particular construction task. In one example, in response to a determination that the second object is bigger than the first object, determining that the particular construction task needs to be performed before the first construction task.

In some embodiments, the at least part of the construction plan may be analyzed to identify a second object of the first object type planned to be constructed in the construction site, for example as described above. Further, the determination of the sequence of tasks may be further based on the second object.

Purported capturing parameters of construction site images (such as time of capturing, position, camera type, camera configuration, etc.) may be inaccurate, for example due to human errors, indoor positioning system, frauds, and so forth. Relaying on images with false purported capturing parameters may cause an incomplete visual documentation of the construction site, an inaccurate understanding of the construction site and process, and in turn, misleading insights and recommendations about the construction site and process. Verification of the purported capturing parameters may avoid or reduce these risks.

FIGS. 17A, 17B, 17C, 17D and 17E illustrate an example of a method 1700 for verifying purported parameters of capturing of images of construction sites. In the example of FIG. 17A, method 1700 may comprise: obtaining an image of a construction site and an indication of at least one purported parameter of a capturing of the image (Step 1710); analyzing the image to determine whether the indicated at least one purported parameter of the capturing of the image is consistent with a visual content of the image (Step 1720); in response to a determination that the indicated at least one purported parameter of the capturing of the image is consistent with the visual content of the image, causing a first update to an electronic record associated with the construction site based on an analysis of the image (Step 1730); and in response to a determination that the indicated at least one purported parameter of the capturing of the image is inconsistent with the visual content of the image, providing first information to a user (Step 1740). In the example of FIG. 17B, implementation 1720A of step 1720 may comprise: analyze the image to determine whether an indicated location associated with the image included in the indicated at least one purported parameter of the capturing of the image is consistent with the visual content of the image (Step 1722A); and basing the determination of whether the indicated at least one purported parameter of the capturing of the image is consistent with the visual content of the image on the determination of whether the indicated location is consistent with the visual content of the image (Step 1724A). In the example of FIG. 17C, implementation 1720B of step 1720 may comprise: analyze the image to determine whether an indicated first point in time included in the indicated at least one purported parameter of the capturing of the image is consistent with the visual content of the image (Step 1722B); and basing the determination of whether the indicated at least one purported parameter of the capturing of the image is consistent with the visual content of the image on the determination of whether the indicated first point in time is consistent with the visual content of the image (Step 1724B). In the example of FIG. 17D, implementation 1720C of step 1720 may comprise: information indicative of a state of at least part of the construction site at a second point in time (Step 1721C); analyzing the image to attempt to identify an inconsistency between the indicated state of the at least part of the construction site at the second point in time and the visual content of the image based on the image being associated with the first point in time (Step 1722C); and basing the determination of whether the indicated at least one purported parameter of the capturing of the image is consistent with the visual content of the image on an identification of the inconsistency between the state of the construction site at the second point in time and the visual content of the image (Step 1724C). In the example of FIG. 17E, implementation 1720D of step 1720 may comprise: analyzing the image to determine whether an indicated type of image capturing device included in the indicated at least one purported parameter of the capturing of the image is consistent with the visual content of the image (Step 1722D); and basing the determination of whether the indicated at least one purported parameter of the capturing of the image is consistent with the visual content of the image on the determination of whether the indicated type of image capturing device is consistent with the visual content of the image (Step 1724D). In some implementations, method 1700 may comprise one or more additional steps, while some of the steps listed above may be modified or excluded. In some implementations, one or more steps illustrated in FIGS. 17A, 17B, 17C, 17D and 17E may be executed in a different order and/or one or more groups of steps may be executed simultaneously and vice versa. In some examples, method 1700 may further comprise, in response to the determination by Step 1720 that the indicated at least one purported parameter of the capturing of the image is consistent with the visual content of the image, forgoing providing first information to a user. In some examples, method 1700 may further comprise, in response to the determination by Step 1720 that the indicated at least one purported parameter of the capturing of the image is inconsistent with the visual content of the image, forgoing causing the first update to the electronic record associated with the construction site.

In some embodiments, Step 1710 may comprise obtaining an image of a construction site and an indication of at least one purported parameter of a capturing of the image. For example, Step 1710 may use 710 to obtain at least part of the image. In another example, Step 1710 may read at least part of the image and/or at least part of the indication from a memory unit (such as memory units 210, shared memory modules 410, memory 600, and so forth). In yet another example, Step 1710 may receive at least part of the image and/or at least part of the indication through a data communication network (such as communication network 130), for example using one or more communication devices (such as communication modules 230, internal communication modules 440, external communication modules 450, and so forth). In an additional example, Step 1710 may access at least part of the image and/or at least part of the indication through a database.

In some embodiments, Step 1720 may comprise analyzing the image obtained by Step 1710 to determine whether the indicated at least one purported parameter of the capturing of the image (by the indication obtained by Step 1710) is consistent with a visual content of the image. In one example, a machine learning model may be trained using training examples to determine whether visual contents of images are consistent with purported parameters of the capturing of the images, and Step 1720 may use the trained machine learning model to analyze the image obtained by Step 1710 to determine whether the indicated at least one purported parameter of the capturing of the image is consistent with a visual content of the image. In one example, Step 1720 may use Step 1722A and Step 1724A to analyzing the image obtained by Step 1710 to determine whether the indicated at least one purported parameter of the capturing of the image (by the indication obtained by Step 1710) is consistent with a visual content of the image. In one example, Step 1720 may use Step 1722B and Step 1724B to analyzing the image obtained by Step 1710 to determine whether the indicated at least one purported parameter of the capturing of the image (by the indication obtained by Step 1710) is consistent with a visual content of the image. In one example, Step 1720 may use Step 1721C, Step 1722C and Step 1724C to analyzing the image obtained by Step 1710 to determine whether the indicated at least one purported parameter of the capturing of the image (by the indication obtained by Step 1710) is consistent with a visual content of the image. In one example, Step 1720 may use Step 1722D and Step 1724D to analyzing the image obtained by Step 1710 to determine whether the indicated at least one purported parameter of the capturing of the image (by the indication obtained by Step 1710) is consistent with a visual content of the image.

In some embodiments, Step 1730 may comprise, for example in response to a determination by Step 1720 that the indicated at least one purported parameter of the capturing of the image is consistent with the visual content of the image, causing a first update to an electronic record associated with the construction site based on an analysis of the image obtained by Step 1710. For example, Step 1730 may use method 1100 and/or Step 1130 to cause the first update to the electronic record associated with the construction site based on an analysis of the image obtained by Step 1710. In another example, Step 1730 may update the electronic record associated with the construction site in a memory unit (such as memory units 210, shared memory modules 410, memory 600, and so forth). In yet another example, Step 1730 may update the electronic record associated with the construction site on an external device, for example through a data communication network (such as communication network 130), for example using one or more communication devices (such as communication modules 230, internal communication modules 440, external communication modules 450, and so forth). In an additional example, Step 1730 may update the electronic record associated with the construction site in a database. In one example, the first update to the electronic record associated with the construction site of Step 1730 may comprise an update to an as-built model associated with the construction site based on an analysis of the image obtained by Step 1710, may comprise an update to a progress record associated with the construction site based on an analysis of the image obtained by Step 1710, may comprise an update to a project schedule associated with the construction site based on an analysis of the image obtained by Step 1710, and so forth.

In some embodiments, Step 1740 may comprise, for example in response to a determination by Step 1720 that the indicated at least one purported parameter of the capturing of the image is inconsistent with the visual content of the image, providing first information to a user. For example, the provided first information may comprise an indication of the determined inconsistency, may comprise an indication of a suspect fraud, may comprise an indication of a wrongly positioned image sensor, may comprise an indication of a wrongly positioned beacon of an indoor positioning system, may comprise an indication of a misconfigured clock, may comprise information related to the capturing of the image obtained by Step 1710 (such as capturing time, capturing position, capturing method, etc.), may comprise information related to the at least one purported parameter, and so forth. In some examples, Step 1740 may provide the first information to a user, to another process, to an external device, and so forth. In one example, Step 1740 may provide the first information to a user as a visual output, an audio output, a tactile output, any combination of the above, and so forth. In one example, Step 1740 may provide the first information to a user using the apparatus analyzing the information (for example, an apparatus performing at least part of Step 1720), using the apparatus capturing the image obtained by Step 1710, through another apparatus (such as a mobile device associated with the user, mobile phone 111, tablet 112, and personal computer 113, etc.), and so forth.

In some embodiments, the indicated at least one purported parameter of the capturing of the image may comprise an indication of a location associated with the image obtained by Step 1710. For example, the indicated location may be associated with a capturing location of the image, may be associated with a location of an object depicted in the image, may be based on information from a positioning system (for example from an indoor positioning system), may be based on information received from a human user, and so forth. In some examples, Step 1722A may analyze the image obtained by Step 1710 to determine whether the indicated location is consistent with the visual content of the image, for example as described below, and Step 1724A may base the determination of whether the indicated at least one purported parameter of the capturing of the image is consistent with the visual content of the image on the determination of whether the indicated location is consistent with the visual content of the image. For example, in response to a determination that the indicated location is consistent with the visual content of the image, Step 1724A (and/or Step 1720) may determine that the indicated at least one purported parameter of the capturing of the image is consistent with the visual content of the image, and in response to a determination that the indicated location is inconsistent with the visual content of the image, 1724A (and/or Step 1720) may determine that the indicated at least one purported parameter of the capturing of the image is inconsistent with the visual content of the image. In some examples, Step 1730 may base the first update to the electronic record associated with the construction site on the indicated location. In some examples, Step 1740 may base the first information provided to the user on the indicated location.

In one example, Step 1722A may analyze the image obtained by Step 1710 to determine a location associated with it (such as a capturing position, a position of an object within depicted in the image, etc.), for example using visual odometry algorithms, and may compare the determined location with the indicated location to determine whether the indicated location is consistent with the visual content of the image. In another example, a machine learning model may be trained using training examples to determine whether images are consistent with specified locations, and Step 1722A may use the trained machine learning model to analyze the image obtained by Step 1710 and the indication of the location to determine whether the indicated location is consistent with the visual content of the image. One example of such training example may include a particular image and an indication of a particular location, together with a label indicating whether the visual content of the particular location is consistence with the particular location. In some examples, Step 1722A may base the determination of whether the indicated location is consistent with the visual content of the image on at least one of an analysis of a construction plan associated with the construction site, an analysis of a project schedule associated with the construction site, an analysis of a progress record associated with the construction site, an analysis of an as-built model associated with the construction site, and so forth.

In some examples, the indication of the location may comprise an indication of a unit of the construction site (such as an indication of a room, an indication of an apartment, an indication of a floor, and so forth). Further, in some examples, Step 1722A may analyze the image obtained by Step 1710 to determine whether the indicated unit of the construction site is consistent with the visual content of the image. For example, a machine learning model may be trained using training examples to determine whether units are consistent with images, and Step 1722A may use the trained machine learning model to analyze the image obtained by Step 1710 and the indication of the unit to determine whether the indicated unit of the construction site is consistent with the visual content of the image. One example of such training example may include a particular image together with an indication of a particular unit, together with a label indicating whether the visual content of the particular image is consistent with the particular unit. Further, Step 1722A may base the determination of whether the indicated location is consistent with the visual content of the image on the determination of whether the indicated unit of the construction site is consistent with the visual content of the image. In some examples, Step 1722A may analyze the image obtained by Step 1710 to determine a position of a particular object in the image, for example as described above. Further, in response to a first determined position, Step 1722A may determine that the indicated location is consistent with the visual content of the image, and in response to a second determined position, Step 1722A may determine that the indicated location is inconsistent with the visual content of the image. In some examples, Step 1722A may analyze the image obtained by Step 1710 to determine whether a particular object is depicted in the image (for example using Step 1120, using object detection algorithms, etc.), in response to a determination that the particular object is depicted in the image, Step 1722A may determine that the indicated location is consistent with the visual content of the image, and in response to a determination that the particular object is not depicted in the image, Step 1722A may determine that the indicated location is inconsistent with the visual content of the image.

In some examples, Step 1722A may analyze the image obtained by Step 1710 to determine whether a particular object is depicted in at a particular location in the image (for example using Step 1120, using object detection algorithms, etc.), and/or to determine whether the particular location is occluded in the image. For example, a machine learning model may be trained using training examples to determine whether indicated locations are occluded in the image, and Step 1722A may use the trained machine learning model to analyze the image obtained by Step 1710 to determine whether the particular location is occluded in the image. One example of such training example may include a particular image and an indication of a location, together with a label indicating whether the indicated location is occluded in the particular image. Further, in response to a determination that the particular object is depicted in the image, Step 1722A may determine that the indicated location is consistent with the visual content of the image, in response to a determination that the particular location is occluded in the image, Step 1722A may determine that the indicated location is consistent with the visual content of the image, and in response to a determination that the particular object is not depicted in the image and the particular location is not occluded in the image, Step 1722A may determine that the indicated location is inconsistent with the visual content of the image.

In some examples, the construction site may comprise a plurality of units (for example, units with substantially identical floor plan), the indication of the location associated with the image obtained by Step 1710 may comprise an indication that the image was captured from a first unit of the plurality of units, and the image may depict an element. Further, in some examples, information related to variations in the plurality of units from a planned measurement of the element may be accessed (for example, in a data structure, in a database, in a memory unit, etc.). Step 1722A may analyze the image obtained by Step 1710 to determine an actual measurement of the element. For example, the image obtained by Step 1710 may be a range image and/or a depth image and/or a 3D image, and the actual measurement of the element may be measured directly from the image. In another example, a machine learning model may be trained using training examples to estimate measurements of objects from images, and Step 1722A may use the trained machine learning model to analyze the image obtained by Step 1710 and determine the actual measurement of the element. One example of such training example may include an image of an object, together with a label indicating the measurement of the object. Further, Step 1722A may use the determined actual measurement of the element and the information related to the variations in the plurality of units from the planned measurement of the element to determine whether the image depicts at least part of the first unit, and may use the determination of whether the image depicts at least part of the first unit to determine whether the indicated location is consistent with the visual content of the image.

In some examples, the construction site may comprise a plurality of units (for example, with substantially identical floor plan), and the indication of the location associated with the image obtained by Step 1710 may comprise an indication that the image was captured from a first unit of the plurality of units. Further, in some examples, information related to construction defects in the plurality of units may be accessed (for example, in a data structure, in a database, in a memory unit, etc.). Step 1722A may analyze the image to detect a construction defect, for example using visual defect detection algorithms, by identifying construction errors as described above, and so forth. Further, Step 1722A may use the detected construction defect and the information related to construction defects in the plurality of units to determine whether the image depicts at least part of the first unit, and may use the determination of whether the image depicts at least part of the first unit to determine whether the indicated location is consistent with the visual content of the image.

In some examples, Step 1722A may analyze the image to determine information related to an actual location associated with the image, for example using visual odometry algorithms or as described above. Further, Step 1722A may use the determined information related to the actual location to determine whether the actual location associated with the image is consistent with the indicated location, and may base the determination of whether the indicated location is consistent with the visual content of the image on the determination of whether the actual location associated with the image is consistent with the indicated location. In one example, Step 1722A may analyze the image to detect an object from outside the construction site, for example using object detection algorithms, and may use the detected object to determine the information related to the actual location associated with the image. In some examples, the image may be an image captured from within a room being constructed in the construction site, Step 1722A may analyze the image to detect an object (for example using an object detection algorithm), and may use the detected object to determine the information related to the actual location associated with the image. For example, the object may be an object located in the room being constructed in the construction site. In another example, the object may be an object visible through a particular opening in the room being constructed, and the determination of the information related to the actual location associated with the image may be based on the particular opening. In yet another example, the object may be an object located at a different room in the construction site. In an additional example, Step 1722A may use information related to the detected object from a construction plan associated with the construction site to determine the information related to an actual location associated with the image. In yet another example, Step 1722A may use information related to the detected object from an as-built model associated with the construction site to determine the information related to an actual location associated with the image. In an additional example, Step 1722A may use information related to the detected object from a progress record associated with the construction site to determine the information related to an actual location associated with the image.

In some embodiments, the indicated at least one purported parameter of the capturing of the image may comprise an indication of a first point in time associated with the image obtained by Step 1710. For example, the indicated first point in time associated with the image may be a point in time associated with a capturing time of the image (such as the capturing time of the image), may be a point in time associated with a receiving of the image (such as the receiving time of the image), may be a point in time associated with a processing of the image (such as the processing time of the image), may be a point in time subsequent to the capturing time of the image, and so forth. In some examples, Step 1722B may analyze the image obtained by Step 1710 to determine whether the indicated first point in time is consistent with the visual content of the image. In one example, a machine learning model may be trained using training examples to identify inconsistencies between indicated points in time and images, and Step 1722B may use the trained machine learning model to analyze the image obtained by Step 1710 and the indication of the first point in time associated with the image to determine whether the indicated first point in time is consistent with the visual content of the image. An example of such training example may include a particular image and an indication of a particular point in time, together with a label indicating whether the particular point in time is consistent with the particular image. Further, Step 1724B may base the determination of whether the indicated at least one purported parameter of the capturing of the image is consistent with the visual content of the image on the determination of whether the indicated first point in time is consistent with the visual content of the image. For example, in response to a determination that the indicated first point in time is consistent with the visual content of the image, Step 1724B may determine that the indicated at least one purported parameter of the capturing of the image is consistent with the visual content of the image, and in response to a determination that the indicated first point in time is inconsistent with the visual content of the image, Step 1724B may determine that the indicated at least one purported parameter of the capturing of the image is inconsistent with the visual content of the image. In some examples, Step 1730 may base the first update to the electronic record associated with the construction site on the indicated first point in time. In some examples, Step 1740 may base the first information provided to the user on the indicated first point in time.

In some examples, method 1700 may further comprise obtaining image data of the construction site associated with a second point in time, the second point in time may differ from the first point in time, and Step 1722B may compare the image data associated with the second point in time and the image obtained by Step 1710 to determine whether the indicated first point in time is consistent with the visual content of the image. For example, the second point in time may be subsequent to the first point in time. In another example, the first point in time may be subsequent to the second point in time. In one example, in response to the construction stage at the first point in time being more advanced than the construction stage at the second point in time and the second point in time being subsequent to the first point in time, Step 1722B may determine that the indicated first point in time is inconsistent with the visual content of the image. In one example, in response to the construction stage at the first point in time being less advanced than the construction stage at the second point in time and the first point in time being subsequent to the second point in time, Step 1722B may determine that the indicated first point in time is inconsistent with the visual content of the image. In one example, in response to the construction stage at the first point in time being more advanced than the construction stage at the second point in time and the first point in time being subsequent to the second point in time, Step 1722B may determine that the indicated first point in time is consistent with the visual content of the image. In one example, in response to the construction stage at the first point in time being less advanced than the construction stage at the second point in time and the second point in time being subsequent to the first point in time, Step 1722B may determine that the indicated first point in time is inconsistent with the visual content of the image.

In some examples, method 1700 may further comprise obtaining first image data of the construction site associated with a second point in time, the second point in time may be earlier than the first point in time, and obtaining second image data of the construction site associated with a third point in time, the third point in time may be later than the first point in time. Further, Step 1722B may analyze the image obtained by Step 1710, the first image data and the second image data to determine whether the indicated first point in time is consistent with the visual content of the image. For example, the image obtained by Step 1710 may be analyzed to determine a construction stage at the first point in time, the first image data may be analyzed to determine a construction stage at the second point in time, and the third image data may be analyzed to determine a construction stage at the third point in time. In one example, in response to at least one of the construction stage at the first point in time being more advanced than the construction stage at the third point in time and the construction stage at the first point in time being less advanced than the construction stage at the second point in time, Step 1722B may determine that the indicated first point in time is inconsistent with the visual content of the image. In one example, in response to the construction stage at the first point in time being less advanced than the construction stage at the third point in time and more advanced than the construction stage at the second point in time, Step 1722B may determine that the indicated first point in time is consistent with the visual content of the image.

In some examples, Step 1722B may analyze the image obtained by Step 1710 to determine information related to an actual time associated with the image, such as a capturing time corresponding to the image. For example, a machine learning model may be trained using training examples to determine capturing time of images, and Step 1722B may use the trained machine learning model to analyze the image obtained by Step 1710 and determine the capturing time corresponding to the image. Further, Step 1722B may use the determined information related to the actual time to determine whether the actual time associated with the image is consistent with the indicated first point in time, for example by comparing the actual time and the first point in time, and may base the determination of whether the indicated first point in time is consistent with the visual content of the image on the determination of whether the actual time associated with the image is consistent with the indicated first point in time.

In some examples, Step 1722B may comprise basing the determination of whether the indicated first point in time is consistent with the visual content of the image on a depiction of an object in the image obtained by Step 1710. Some non-limiting examples of such object may include an object from outside the construction site, the Sun, a star, at least part of a sky, an element in the construction site, and so forth. In some examples, Step 1722B may analyze the image obtained by Step 1710 to determine whether a particular object is depicted in the image, for example using an object detection algorithm, in response to a determination that the particular object is depicted in the image, Step 1722B may determine that the indicated first point in time is consistent with the visual content of the image, and in response to a determination that the particular object is not depicted in the image, Step 1722B may determine that the indicated first point in time is inconsistent with the visual content of the image. In some examples, Step 1722B may analyze the image obtained by Step 1710 to determine a location of a depiction of a particular object in the image, for example using an object detection algorithm, in response to a determination that the particular object is depicted at a first location in the image, Step 1722B may determine that the indicated first point in time is consistent with the visual content of the image, and in response to a determination that the particular object is depicted at a second location in the image, Step 1722B may determine that the indicated first point in time is inconsistent with the visual content of the image. In some examples, Step 1722B may analyze the image obtained by Step 1710 to determine a property of a particular object in the image (such as a type, a size, a condition, a state, etc.), for example using an object classification algorithm, in response to a determined first property of the particular object, Step 1722B may determine that the indicated first point in time is consistent with the visual content of the image, and in response to a determined second property of the particular object, Step 1722B may determine that the indicated first point in time is inconsistent with the visual content of the image. In some examples, Step 1722B may analyze the image obtained by Step 1710 to determine whether a particular object is depicted in at a particular location in the image, for example using an object detection algorithm, and may analyze the image obtained by Step 1710 to determine whether he particular location is occluded in the image, for example as described above. Further, in response to a determination that the particular object is depicted in the image, Step 1722B may determine that the indicated first point in time is consistent with the visual content of the image, in response to a determination that the particular location is occluded in the image, Step 1722B may determine that the indicated first point in time is consistent with the visual content of the image, and in response to a determination that the particular object is not depicted in the image and the particular location is not occluded in the image, Step 1722B may determine that the indicated first point in time is inconsistent with the visual content of the image.

In some embodiments, the indicated at least one purported parameter of the capturing of the image obtained by Step 1710 may comprise an indication of a first point in time associated with the image. In some examples, Step 1721C may comprise accessing information indicative of a state of at least part of the construction site at a second point in time, for example, in a data structure, in a database, in a memory unit, and so forth. For example, the information indicative of the state of at least part of the construction site at the second point in time may be based on an analysis of an image of the construction site captured at the second point in time, may be based on information reported by a human user, may be based on a progress record associated with the construction site, may be based on a project schedule associated with the construction site, may be based on an as-built model associated with the construction site, and so forth. In some examples, Step 1722C may comprise analyzing the image obtained by Step 1710 to identify an inconsistency between the indicated state of the at least part of the construction site at the second point in time and the visual content of the image based on the image being associated with the first point in time. In one example, a machine learning model may be trained using training examples to identify inconsistencies between indicated states of construction sites and images, and Step 1722C may use the trained machine learning model to analyze the image obtained by Step 1710 and the information indicative of the state of at least part of the construction site at the second point in time accessed by Step 1721C to identify an inconsistency between the indicated state of the at least part of the construction site at the second point in time and the visual content of the image based on the image being associated with the first point in time. An example of such training example may include an image of a construction site and an indication of a state of the construction site, together with a label indicating whether the image and the indicated states are consistence with each other. In another example, the image obtained by Step 1710 may be analyzed to determine a state of the construction site at the first point in time associated with the image, for example as described above, and Step 1722C may compare the determined state of the construction site at the first point in time and the indicated state of the at least part of the construction site at the second point in time to determine whether the two are consistence with the relation between the first point in time and the second point in time. In some examples, in response to the identification by Step 1722C of the inconsistency between the state of the construction site at the second point in time and the visual content of the image, Step 1724C may determine that the indicated at least one purported parameter of the capturing of the image is inconsistent with the visual content of the image. In one example, in response to a failure of Step 1722C to identify an inconsistency between the state of the construction site at the second point in time and the visual content of the image, Step 1724C may determine that the indicated at least one purported parameter of the capturing of the image is consistent with the visual content of the image. In another example, in response to the identification of the inconsistency between the state of the construction site at the second point in time and the visual content of the image, Step 1722B may determine that the indicated first point in time is inconsistent with the visual content of the image. In yet another example, in response to the identification of the inconsistency between the state of the construction site at the second point in time and the visual content of the image, Step 1722A may determine that a location indicated by the at least one purported parameter associated with the image is inconsistent with the visual content of the image.

In some examples, the information indicative of the state of the at least part of the construction site at the second point in time accessed by Step 1721C may comprise an indication of a construction stage of the at least part of the construction site at the second point in time, and Step 1722C may analyze the image obtained by Step 1710 to determine that a construction stage of the at least part of the construction site according to the visual content of the image is inconsistence with the construction stage of the at least part of the construction site at the second point in time and with a relation between the first point in time and the second point in time. For example, Step 1722C may analyze the image obtained by Step 1710 to determine that the construction stage of the at least part of the construction site according to the visual content of the image, for example as described above, and may compare the determined with the indicated construction stage of the at least part of the construction site at the second point to determine whether there is an inconsistency. Further, in response to the determination that the construction stage of the at least part of the construction site according to the visual content of the image is inconsistence with the construction stage of the at least part of the construction site at the second point in time and with the relation between the first point in time and the second point in time, Step 1722C may determine that the indicated at least one purported parameter of the capturing of the image is inconsistent with the visual content of the image. In one example, the relation between the first point in time and the second point in time may be based on a time difference between the first point in time and the second point in time, may be that the first point in time is later than the second point in time, may be that the first point in time is earlier than the second point in time, and so forth.

In some examples, the information indicative of the state of the at least part of the construction site at the second point in time accessed by Step 1721C may comprise an indication that a construction stage of the at least part of the construction site at the second point in time is a second stage, and Step 1722C may analyze the image obtained by Step 1710 to determine a construction stage of the at least part of the construction site based on the visual content of the image, for example as described above. In one example, in response to the determined construction stage of the at least part of the construction site based on the visual content of the image being a first stage, the indication that the construction stage of the at least part of the construction site at the second point in time being the second stage and the first point in time being earlier than the second point in time, Step 1722C may determine that the indicated at least one purported parameter of the capturing of the image is consistent with the visual content of the image, and in response to the determined construction stage of the at least part of the construction site based on the visual content of the image being the first stage, the indication that the construction stage of the at least part of the construction site at the second point in time being the second stage and the second point in time being earlier than the first point in time, Step 1722C may determine that the indicated at least one purported parameter of the capturing of the image is inconsistent with the visual content of the image. In one example, in response to the determined construction stage of the at least part of the construction site based on the visual content of the image being a first stage, the indication that the construction stage of the at least part of the construction site at the second point in time being the second stage and the second point in time being earlier than the first point in time, Step 1722C may determine that the indicated at least one purported parameter of the capturing of the image is consistent with the visual content of the image, and in response to the determined construction stage of the at least part of the construction site based on the visual content of the image being the first stage, the indication that the construction stage of the at least part of the construction site at the second point in time being the second stage and the first point in time being earlier than the second point in time, Step 1722C may determine that the indicated at least one purported parameter of the capturing of the image is inconsistent with the visual content of the image. In one example, in response to the determined construction stage of the at least part of the construction site based on the visual content of the image being a first stage, the indication that the construction stage of the at least part of the construction site at the second point in time being the second stage and the time difference between the first point in time and the second point in time being a first time difference, Step 1722C may determine that the indicated at least one purported parameter of the capturing of the image is consistent with the visual content of the image, and in response to the determined construction stage of the at least part of the construction site based on the visual content of the image being the first stage, the indication that the construction stage of the at least part of the construction site at the second point in time being the second stage and the time difference between the first point in time and the second point in time being a second time difference, Step 1722C may determine that the indicated at least one purported parameter of the capturing of the image is inconsistent with the visual content of the image.

In some embodiments, the indicated at least one purported parameter of the capturing of the image obtained by Step 1710 may comprise an indication of a type of image capturing device associated with the image. Some non-limiting examples of such types of image capturing devices may include a stationary camera positioned in the construction site, a mobile capturing device, an image acquisition robot, an image acquisition drone, a wearable capturing device, a color camera, a grayscale camera, a hyperspectral camera, a depth camera, a range camera, a stereo camera, an active stereo camera, a time-of-flight camera, and so forth. In some examples, Step 1722D may analyze the image to determine whether the indicated type of image capturing device is consistent with the visual content of the image. For example, a machine learning model may be trained using training examples to identify types of capturing devices used to capture images, and Step 1722D may use the trained machine learning model to analyze the image obtained by Step 1710 to determine the type of capturing device used to capture the image, and compare the determined capturing device with the indicated type of image capturing device to determine whether the indicated type of image capturing device is consistent with the visual content of the image. One example of such training example may include a particular image, together with a label indicating the type of capturing device used to capture the image. In another example, the indicated type of image capturing device may correspond to particular image characteristics (such as pixel resolution, number of color components, etc.), and Step 1722D may compare the particular image characteristics with the image characteristics of the image obtained by Step 1710 to determine whether the indicated type of image capturing device is consistent with the visual content of the image. Further, Step 1724D may base the determination of whether the indicated at least one purported parameter of the capturing of the image is consistent with the visual content of the image on the determination of whether the indicated type of image capturing device is consistent with the visual content of the image. In one example, in response to a determination that the indicated type of image capturing device is consistent with the visual content of the image, Step 1724D may determine that the indicated at least one purported parameter of the capturing of the image is consistent with the visual content of the image. In one example, in response to a determination that the indicated type of image capturing device is inconsistent with the visual content of the image, Step 1724D may determine that the indicated at least one purported parameter of the capturing of the image is inconsistent with the visual content of the image. In one example, Step 1722D may analyze the image obtained by Step 1710 to determine a viewing angle associated with the image, in response to a first determined viewing angle, for example using visual odometry algorithms, Step 1722D may determine that the indicated type of image capturing device is consistent with the visual content of the image, and in response to a second determined viewing angle, Step 1722D may determine that the indicated type of image capturing device is inconsistent with the visual content of the image. In one example, Step 1722D may analyze the image obtained by Step 1710 to attempt to detect a device connected to the image capturing device, for example using an object detection algorithms, and Step 1722D may base the determination of whether the indicated type of image capturing device is consistent with the visual content of the image on a result of the attempt to detect the device connected to the image capturing device.

The large number of construction tasks, construction workers and subcontractors involves in the construction process, as well as the complex interdependencies among tasks, make the coordination in the construction site oppressively burdensome, which in turn may slow and complicate the construction process. Automating the coordination among construction tasks, construction workers and/or subcontractors may reduce this burden and improve efficiency. Specifically, automatic creation of tasks according to the actual state of the construction site may reduce this burden and improve efficiency.

Figure 18:
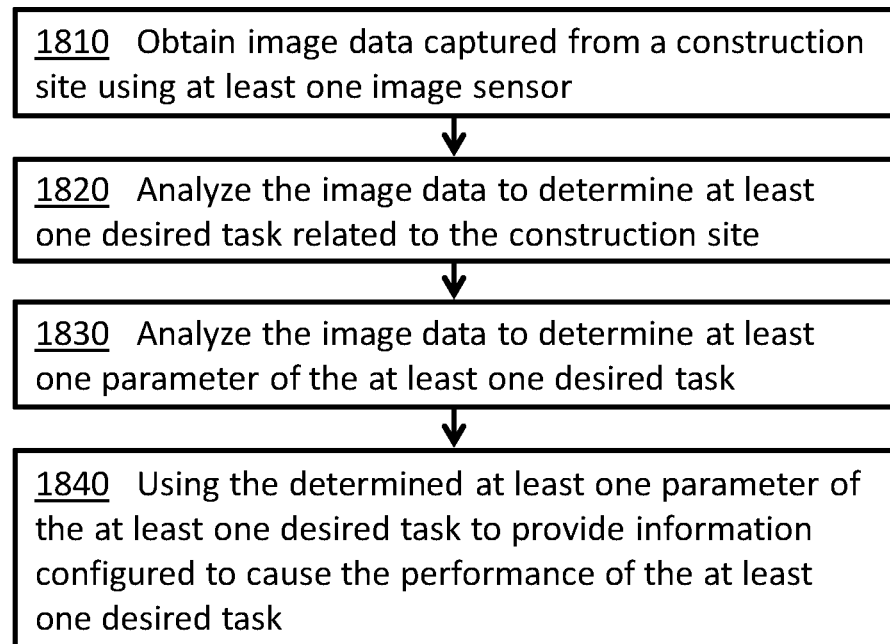
FIG. 18 illustrates an example of a method for generating tasks from images of construction sites.

FIG. 18 illustrates an example of a method 1800 for generating tasks from images of construction sites. In this example, method 1800 may comprise: obtaining image data captured from a construction site using at least one image sensor (Step 1810); analyzing the image data to determine at least one desired task related to the construction site (Step 1820); analyzing the image data to determine at least one parameter of the at least one desired task (Step 1830); and using the determined at least one parameter of the at least one desired task to provide information configured to cause the performance of the at least one desired task (Step 1840). In some implementations, method 1800 may comprise one or more additional steps, while some of the steps listed above may be modified or excluded. In some implementations, one or more steps illustrated in FIG. 18 may be executed in a different order and/or one or more groups of steps may be executed simultaneously and vice versa.

In some embodiments, Step 1810 may comprise obtaining image data captured from a construction site using at least one image sensor. For example, Step 1810 may use 710 to obtain at least part of the image data. In another example, Step 1810 may read at least part of the image data from a memory unit (such as memory units 210, shared memory modules 410, memory 600, and so forth). In yet another example, Step 1810 may receive at least part of the image through a data communication network (such as communication network 130), for example using one or more communication devices (such as communication modules 230, internal communication modules 440, external communication modules 450, and so forth). In an additional example, Step 1810 may access at least part of the image and/or at least part of the indication through a database.

In some embodiments, Step 1820 may comprise analyzing the image data obtained by Step 1810 to determine at least one desired task related to the construction site. Some non-limiting examples of such tasks may include a construction task, capturing of at least one image from the construction site, manual inspection of at least part of the construction site, a rough-in inspection, an inspection of plumbing systems, a moisture barrier inspection, an insulation inspection, a correction of at least one construction error in the construction site, ordering of construction supplies to the construction site, install at least one element in the construction site (such as gas pipe, an electrical wire, a pipe, water pipe, electrical box, fixture, one or more tiles, an underground duct, an underground fuel pipe, a conduit, a cable, etc.), constructing at least part of at least one element in the construction site, covering at least part of a surface (for example, with at least one of plaster, paint, wallboards and tiles), plastering, painting, finishes, building wall frames, installing plaster guides, installing top tracks, installing studs, installing insulation material, installing wallboards, placing a water pipe, installing water junction, placing the a element, placing a tunnel for electrical wires, placing an electrical element, installing conduit, installing electric junction box, installing support, installing outlet, installing cover plate, installing gas pipes, installing gas junction box, installing gas outlet, placing a sink, an application of a material (such as plaster, paint, etc.), closing of at least one of a wall and a ceiling with one or more wallboards, an installation of an exterior finishing material, covering insulation, backfilling, placement of reinforcement steel, placing of concrete, excavation, excavating a trench, marking of utility lines and/or pipes, and so forth. For example, a machine learning model may be trained using training examples to determine tasks from images, and Step 1820 may use the trained machine learning model to analyze the image data obtained by Step 1810 and determine the at least one desired task related to the construction site. One example of such training example may include a particular image, together with a label indicating a desired task. In one example, Step 1820 may comprise comparing a construction plan associated with the construction site with the image data obtained by Step 1810 to determine the at least one desired task related to the construction site. In one example, Step 1820 may comprise comparing a project schedule associated with the construction site with the image data obtained by Step 1810 to determine the at least one desired task related to the construction site. In one example, Step 1820 may comprise comparing a progress record associated with the construction site with the image data obtained by Step 1810 to determine the at least one desired task related to the construction site. In one example, Step 1820 may comprise comparing an as-built model associated with the construction site with the image data obtained by Step 1810 to determine the at least one desired task related to the construction site.

In some embodiments, Step 1830 may comprise analyzing the image data obtained by Step 1810 to determine at least one parameter of the at least one desired task determined by Step 1820. Some non-limiting examples of such parameters may include location, timing, a selection of a part of the construction site, capturing parameters, a type of a construction error, a suggested remedy for a construction error or a construction problem, a type of inspection, a time frame for inspection, punch list for inspection, focus issues for inspection, a type of construction supplies, a quantity of construction supplies, an intendent use of construction supplies, and so forth. In one example, a machine learning model may be trained using training examples to determine parameters of tasks from images, and Step 1830 may use the trained machine learning model to analyze the image data obtained by Step 1810 and determine the at least one parameter of the at least one desired task determined by Step 1820. One example of such training example may include a particular image, together with a label indicating parameters of a particular task. Another example of such training example may include a particular image and an indication of a particular task, together with a label indicating parameters of the particular task. In one example, Step 1830 may comprise comparing a construction plan associated with the construction site with the image data obtained by Step 1810 to determine the at least one parameter of the at least one desired task. In one example, Step 1830 may comprise comparing a project schedule associated with the construction site with the image data obtained by Step 1810 to determine the at least one parameter of the at least one desired task. In one example, Step 1830 may comprise comparing a progress record associated with the construction site with the image data obtained by Step 1810 to determine the at least one parameter of the at least one desired task. In one example, Step 1830 may comprise comparing an as-built model associated with the construction site with the image data obtained by Step 1810 to determine the at least one parameter of the at least one desired task.

In some embodiments, Step 1840 may comprise using the at least one parameter of the at least one desired task determined by Step 1830 to provide information configured to cause the performance of the at least one desired task determined by Step 1820. For example, Step 1840 may provide the information configured to cause the performance of the at least one desired task to a user (for example, visually through a user interface, as textual information, as audible information, etc.), may transmit the information configured to cause the performance of the at least one desired task to an external device (for example, Step 1840 may transmitting the information to the external system using a communication device), may transmit the information configured to cause the performance of the at least one desired task over a data communication network (such as communication network 130), for example using one or more communication devices (such as communication modules 230, internal communication modules 440, external communication modules 450, and so forth), may store the information configured to cause the performance of the at least one desired task in a memory unit (such as memory units 210, shared memory modules 410, memory 600, and so forth), and so forth. In one example, Step 1840 may provide the information configured to cause the performance of the at least one desired task to a scheduling system. In some examples, the information configured to cause the performance of the at least one desired task may comprise an indication of an object in the construction site associated with the at least one desired task, may comprise an indication of a unit of the construction site associated with the at least one desired task, may comprise an indication of a time associated with the at least one desired task, may comprise an indication of the at least one desired task determined by Step 1820, may comprise an indication of at least one parameter of the at least one desired task determined by Step 1830, and so forth.

In some examples, Step 1840 may use the at least one parameter of the at least one desired task determined by Step 1830 to select a human worker for the performance of the at least one desired task (for example of a plurality of alternative human workers). For example, in response to a first determined parameter of the at least one desired task, Step 1840 may select a first human worker, and in response to a second determined parameter of the at least one desired task, Step 1840 may select a second human worker, the second human worker may differ from the first human worker. In one example, Step 1840 may provide the information configured to cause the performance of the at least one desired task to the selected human worker, for example as described above. In another example, the information configured to cause the performance of the at least one desired task may comprise an indication of the selected human worker.

In some examples, Step 1840 may use the at least one parameter of the at least one desired task determined by Step 1830 to select whether to allocate the at least one desired task to a robot or to a human worker. For example, in response to a first determined parameter of the at least one desired task, Step 1840 may select to allocate the at least one desired task to a robot, and in response to a second determined parameter of the at least one desired task, Step 1840 may select to allocate the at least one desired task to a human. In one example, in response to a selection to allocate the at least one desired task to the robot, Step 1840 may provide first information configured to cause the performance of the at least one desired task to the robot, for example as described above in relation to an external system. In one example, in response to a selection to allocate the at least one desired task to the human worker, Step 1840 may provide second information configured to cause the performance of the at least one desired task to the human worker, for example as described above. For example, the second information may differ from the first information. In another example, the second information may be identical to the first information. In one example, the information configured to cause the performance of the at least one desired task may comprise an indication of the selection of whether to allocate the at least one desired task to a robot or to a human worker. In one example, in response to a selection to allocate the at least one desired task to the robot, the information configured to cause the performance of the at least one desired task may comprise an indication of a type of robot required to perform the at least one desired task. In one example, in response to a selection to allocate the at least one desired task to the robot, the information configured to cause the performance of the at least one desired task may comprise an indication of a particular robot selected to perform the task.

In some embodiments, method 1800 may further comprise obtaining (for example, from a memory unit, from an external device, etc.) second image data captured from the construction site after Step 1840 provided the information configured to cause the performance of the at least one desired task, and analyzing the second image data to determine whether the at least one desired task related to the construction site was performed, for example using Step 1520. In one example, in response to a determination that the at least one desired task related to the construction site was not performed, a notification may be provided, and in response to a determination that the at least one desired task related to the construction site was performed, providing the notification may be withheld and/or forgone. In one example, in response to a determination that the at least one desired task related to the construction site was not performed and the second image data being captured at least a selected time duration after Step 1840 provided the information, the notification may be provided, and in response to a determination that the at least one desired task related to the construction site was not performed and the second image data being captured within the selected time duration after Step 1840 provided the information, providing the notification may be withheld and/or forgone. For example, the notification may be provided to a user (for example, visually through a user interface, as textual information, as audible information, etc.), may transmit to an external device, may transmit over a data communication network, and so forth. For example, the notification may include an indication of the at least one desired task, may include at least part of the image data, may include a reminder, and so forth. In some examples, the second image data may be analyzed to determine a parameter of the performance of the at least one desired task related to the construction site. Some non-limiting examples of such parameters may include an indication of success, an indication of failure, position corresponding to the performance of the task, properties of an object installed or constructed in the task, materials used, amount of materials used, and so forth. For example, a machine learning model may be trained using training examples to determine parameters of performance of tasks from images, and the trained machine learning model may be used to analyze the second image data and determine the parameter of the performance of the at least one desired task. One example of such training example may include an image showing result of a completed task together with a label indicating a parameter of the performance of the completed task. Further, in response to a first determined parameter of the performance of the at least one desired task, Step 1840 may provide first information, and in response to a second determined parameter of the performance of the at least one desired task, Step 1840 may withhold and/or forgo providing the first information. In one example, the first information may be based on the determined parameter of the performance of the at least one desired task.

In some embodiments, method 1800 may further comprise obtaining (for example, from a memory unit, from an external device, etc.) second image data captured from the construction site after Step 1840 provided the information configured to cause the performance of the at least one desired task; analyzing the second image data to determine a second at least one desired task related to the construction site (for example using Step 1820 to analyze the second image data); and comparing the at least one desired task related to the construction site and the second at least one desired task related to the construction site. In one example, the comparison of the at least one desired task related to the construction site and the second at least one desired task related to the construction site may be based on at least one parameter of the second at least one desired task, the at least one parameter of the second at least one desired task may be determined by analyzing the second image data. Further, in one example, in response to a first result of the comparison of the at least one desired task and the second at least one desired task, and the second image data being captured at least a selected time duration after providing the information configured to cause the performance of the at least one desired task, a notification may be provided (for example as described above); in response to the first result of the comparison of the at least one desired task and the second at least one desired task, and the second image data being captured within the selected time duration after providing the information configured to cause the performance of the at least one desired task, providing the notification may be withheld and/or forgone; and in response to a second result of the comparison of the at least one desired task and the second at least one desired task, providing the notification may be withheld and/or forgone. In another example, in response to a first result of the comparison of the at least one desired task and the second at least one desired task, a notification may be provided (for example as described above), and in response to a second result of the comparison of the at least one desired task and the second at least one desired task, providing the notification may be withheld and/or forgone.

In some embodiments, method 1800 may further comprise analyzing the image data obtained by Step 1810 to detect at least one object in the construction site (for example using Step 1120, using object detection algorithms, and so forth), and analyzing the image data to determine a property of the detected at least one object (for example using Step 1120). Further, in response to a first determined property of the detected at least one object, Step 1840 may provide the information configured to cause the performance of the at least one desired task, and in response to a second determined property of the detected at least one object, providing the information configured to cause the performance of the at least one desired task may be withheld and/or forgone.

In some embodiments, Step 1820 may analyze the image data obtained by Step 1810 to determine that frames for a concrete wall of a bathroom were built, and in response to the determination that the frames for the concrete wall of the bathroom were built, Step 1820 may determine that at least one desired task related to the construction site comprises installation of sewage pipes in the concrete wall of the bathroom. For example, a machine learning model may be trained using training example to determine whether frames for concrete walls of bathrooms were built from images of construction sites, and Step 1820 may use the trained machine learning model to analyze the image data obtained by Step 1810 and determine whether frames for a concrete wall of a bathroom were built. One example of such training example may include an image of a construction site, together with a label indicating whether frames for concrete walls of bathrooms were built in the construction site.

In some embodiments, Step 1820 may analyze the image data obtained by Step 1810 to determine that metal partitions for an internal drywall were installed, and may analyze the image data obtained by Step 1810 to determine whether the internal drywall was plastered. Further, in response to the determination that the metal partitions for the internal drywall were installed and that the internal drywall was not plastered, Step 1820 may determine that at least one desired task related to the construction site comprises installation of at least one electrical junction box, and in response to the determination that the metal partitions for the internal drywall were installed and that the internal drywall was plastered, Step 1820 may determine that at least one desired task related to the construction site comprises installing electrical switch. For example, a machine learning model may be trained using training examples to determine whether metal partitions for internal drywalls were installed and/or whether internal drywalls were plastered from images of construction sites, and Step 1820 may use the trained machine learning model to analyze the image data obtained by Step 1810 and determine whether metal partitions for the internal drywall were installed and/or whether the internal drywall was plastered. One example of such training example may include an image of a particular internal drywall, together with a label indicating whether metal partitions for the particular internal drywall were installed in the construction site and/or a label indicating whether the particular internal drywall was plastered.

In some examples, the at least one desired task determined by Step 1820 may comprise capturing of at least one image from the construction site, and the at least one parameter of the at least one desired task determined by Step 1830 may comprise at least one capturing parameter for the capturing of the at least one image, (such capturing position, capturing time, camera configuration, etc.). In one example, Step 1820 may determine the need for the capturing of at least one image from the construction site as described above in relation to method 1300. In one example, Step 1830 may use Step 1320 determine to the at least one parameter of the at least one desired task. In one example, the information provided by Step 1840 may comprise an indication of the determined at least one capturing parameter for the capturing of the at least one image.

In some examples, the at least one desired task determined by Step 1820 may comprise a correction of at least one construction error in the construction site, and the at least one parameter of the at least one desired task determined by Step 1830 may comprise at least one of a location corresponding to the at least one construction error, a type of the at least one construction error, a suggested remedy for the at least one construction error, and so forth. In one example, Step 1820 may analyze the image data to detect the construction error, for example as described above in relation to Step 930. In one example, Step 1830 may analyze the image data to determine one or more of these parameters of the construction error, for example as described above in relation to Step 930. In one example, the information provided by Step 1840 may comprise an indication of at least one of these determined parameters.

In some examples, the at least one desired task determined by Step 1820 may comprise manual inspection of at least part of the construction site, and the at least one parameter of the at least one desired task determined by Step 1830 may comprise a selection of the at least part of the construction site, a type of inspection, a time frame for the inspection, punch list for the inspection, focus issues for the inspection, and so forth. In one example, Step 1820 may analyze the image data to determine that the construction site is prepared for manual inspection, for example as described above in relation to method 1600, and in response to the determination that the construction site is prepared for manual inspection, determining that the at least one desired task comprises the manual inspection. In one example, the information provided by Step 1840 may comprise an indication of at least one of these determined parameters.

In some examples, the at least one desired task determined by Step 1820 may comprise ordering of construction supplies to the construction site, and the at least one parameter of the at least one desired task determined by Step 1830 may comprise a type of the construction supplies, a quantity of the construction supplies, an indication of an intendent use of the construction supplies, and so forth. In one example, the information provided by Step 1840 may comprise an indication of at least one of these determined parameters. For example, future tasks need to be performed in the construction site may be determined, for example using method 1600, Step 1820 may determine a need for ordering of construction supplies based on the determined future tasks, and Step 1830 may determine parameters of the ordering of construction supplies based on the determined future tasks. In another example, a machine learning model may be trained using training examples to determine a need for ordering of construction supplies and/or parameters for the ordering of construction supplies from images of construction sites, Step 1820 may use the trained machine learning model to analyze the image data obtained by Step 1810 and determine whether the at least one desired task have to comprise an ordering of construction supplies, and Step 1830 may use the trained machine learning model to analyze the image data obtained by Step 1810 and determine parameters for the ordering of construction supplies. An example of such training example may include an image of a construction site, together with a label indicating whether there is a need to order construction supplies and/or a label indicating desired parameters of the ordering of construction supplies. In one example, Step 1820 may further base the determination of a need for ordering of construction supplies on information related to current inventory, on information related to recent supply orders, and so forth. In one example, Step 1820 may further base the determination of the parameters for the ordering of construction supplies on information related to current inventory, on information related to recent supply orders, and so forth.

In some examples, the image data obtained by Step 1810 may be analyzed to determine a construction stage associated with at least part of the construction site, for example as describe above in relation to method 1200. In one example, Step 1820 may use the determined construction stage associated with the at least part of the construction site to determine the at least one desired task related to the construction site. For example, in response to a first determined construction stage, Step 1820 may determine a first at least one desired task related to the construction site, and in response to a second determined construction stage, Step 1820 may determine a second at least one desired task related to the construction site, the second at least one desired task may differ from the first at least one desired task. In one example, Step 1830 may use the determined construction stage associated with the at least part of the construction site to determine the at least one parameter of the at least one desired task. For example, in response to a first determined construction stage, Step 1830 may determine a first at least one parameter, and in response to a second determined construction stage, Step 1830 may determine a second at least one parameter, the second at least one parameter may differ from the first at least one parameter.

In some examples, the image data obtained by Step 1810 may be analyzed to determine a state of a particular task initiated in the construction site prior to the capturing of the image data. For example, the performance of the task may comprise a plurality of events, and visual event detection algorithms may be used to identify which of the plurality of events occurred. In another example, the image data may be analyzed to determine a state of an object in the construction site, for example as described above, and the state of the task may be determined based on the state of the object. In one example, Step 1820 may use the determined state of the particular task associated with the at least part of the construction site to determine the at least one desired task related to the construction site. For example, in response to a first determined state of the particular task, Step 1820 may determine a first at least one desired task related to the construction site, and in response to a second determined state of the particular task, Step 1820 may determine a second at least one desired task related to the construction site, the second at least one desired task may differ from the first at least one desired task. In one example, Step 1830 may use the determined state of the particular task associated with the at least part of the construction site to determine the at least one parameter of the at least one desired task. For example, in response to a first determined state of the particular task, Step 1830 may determine a first at least one parameter, and in response to a second determined state of the particular task, Step 1830 may determine a second at least one parameter, the second at least one parameter may differ from the first at least one parameter.

Visual documentation and analysis of construction sites may include a numerous amount of visual content items (such as images, videos, depth scans, 3D images, 3D videos, and so forth). It is common to sort the visual content items according to capturing position and/or time. However, such browsing the visual content items by capturing location and capturing time may make browsing the visual documentation burdensome. For example, construction at different portions and units of the construction site may advance at different pace, and browsing the visual documentation by capturing date may make it difficult to find documentation related to a particular item or to a particular action.

Figure 19B:
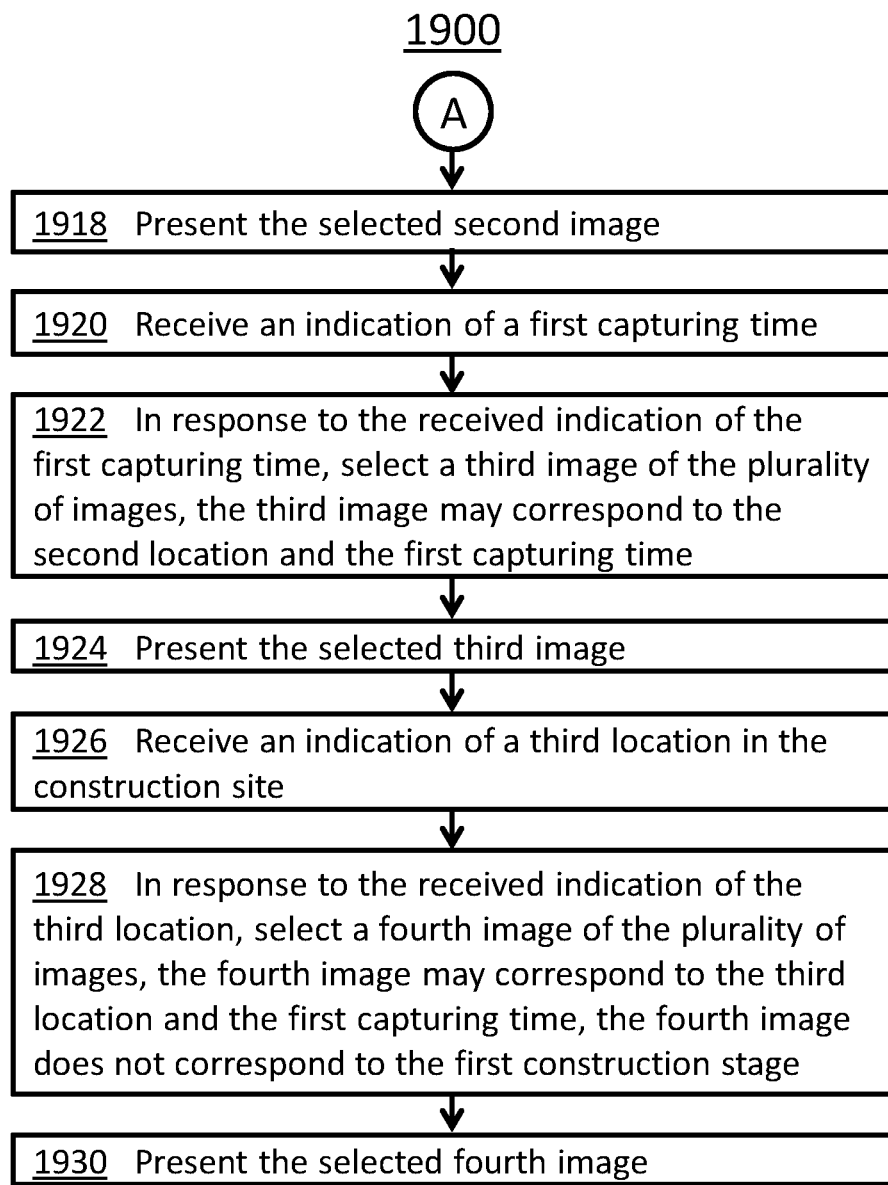

FIGS. 19A and 19B illustrate an example of a method 1900 for exploring images of construction sites by construction stages. In this example, method 1900 may comprise: accessing a plurality of images of a construction site, each image of the plurality of images may correspond to a location in the construction site and a construction stage (Step 1902); optionally, presenting a user interface (Step 1904); receiving an indication of a first location in the construction site (Step 1906); receiving an indication of a first construction stage (Step 1908); in response to the received indication of the first location and the received indication of the first construction stage, selecting a first image of the plurality of images, the first image may correspond to the first location and the first construction stage (Step 1910); presenting the selected first image (Step 1912); receiving an indication of a second location in the construction site (Step 1914); in response to the received indication of the second location, selecting a second image of the plurality of images, the second image may correspond to the second location and the first construction stage (Step 1916); presenting the selected second image (Step 1918); receiving an indication of a first capturing time (Step 1920); in response to the received indication of the first capturing time, selecting a third image of the plurality of images, the third image may correspond to the second location and the first capturing time (Step 1922); presenting the selected third image (Step 1924); receiving an indication of a third location in the construction site (Step 1926); in response to the received indication of the third location, selecting a fourth image of the plurality of images, the fourth image may correspond to the third location and the first capturing time, the fourth image does not correspond to the first construction stage (Step 1928); and presenting the selected fourth image (Step 1930). In some implementations, method 1900 may comprise one or more additional steps, while some of the steps listed above may be modified or excluded. In some implementations, one or more steps illustrated in FIG. 19 may be executed in a different order and/or one or more groups of steps may be executed simultaneously and vice versa.

In some embodiments, Step 1902 may comprise accessing a plurality of images of a construction site, each image of the plurality of images may correspond to a location in the construction site and/or a capturing time and/or a construction stage. In one example, one or more images of the plurality of images may be analyzed to determine correspondences of the one or more images to locations in the construction site, for example as described above in relation to 1722A. In one example, one or more images of the plurality of images may be analyzed to determine correspondences of the one or more images to capturing times, for example as described above in relation to Step 1722B. In one example, one or more images of the plurality of images may be analyzed to determine correspondences of the one or more images to construction stages, for example as described above. In one example, correspondences of images and locations in the construction site may be determined based on capturing location recorded by the capturing device (for example, based on inputs from an indoor localization system), based on location recorded by a device tethered to the capturing device, by analyzing the images as described above, and so forth.

In some embodiments, method 1900 may comprise Step 1904, while in other implementations method 1900 may not include Step 1904. In some examples, Step 1904 may comprise presenting a user interface to a user. For example, the user interface may be visually displayed on a screen, in a virtual reality system, in an augmented reality system, using a projection, and so forth. In some examples, the user interface may be configured to present to the user one or more selected images. In some examples, the user interface may be configured to receive from the user an indication of a capturing time and/or an indication of a construction stage and/or an indication of a location in the construction site. For example, the user interface may be configured to enable the user to provide an indication of a location in the construction site, for example by selecting a location of a plurality of alternative locations (for example, from a list of the alternative locations, from a 2D representation of the alternative locations, from a 3D representation of the alternative locations, etc.), by pointing on a location on a map, by pointing on a location in an as-built model, by pointing on a location at an image of the construction site, and so forth. For example, the user interface may be configured to enable the user to provide an indication of a capturing time, for example by selecting a capturing time of a plurality of alternative capturing times (for example, from a list of the alternative capturing times, from a calendar presenting the alternative capturing times, from a timeline representation including markings corresponding to the alternative capturing times, etc.), by selecting a date of a calendar, by selecting a point on a timeline, and so forth. For example, the user interface may be configured to enable the user to provide an indication of a construction stage, for example by selecting a construction stage of a plurality of alternative construction stages (for example, from a list of the alternative construction stages), by selecting a location and a capturing time to indicate a construction stage corresponding to the selected location and capturing time, and so forth. In some examples, the user interface may be configured to enable the user to select between different browsing modes, such as browsing by construction stage, browsing by capturing time, and so forth. For example, the user may indicate the selection of a browsing mode directly, for example by selecting the browsing mode from a list of alternative browsing modes. In another example, the user may indicate a selection of a browsing by construction stage browsing mode by selecting a particular construction stage as described above. In yet another example, the user may indicate a selection of a browsing by capturing time browsing mode by selecting a particular capturing time as described above.

In some embodiments, Step 1906 may comprise receiving an indication of a first location in the construction site, for example from the user, from the user using the user interface of Step 1904, from a different process, from an external device, from a memory unit, through a communication network, and so forth.

In some embodiments, Step 1908 may comprise receiving an indication of a first construction stage. Some non-limiting examples of such indication of a construction stage may include an indication of a construction task subsequent to the construction stage, an indication of a construction task preceding to the construction stage, an indication of a construction task included in the construction stage, an indication of a type of object visible at the construction stage, an indication of a type of object installed at the construction stage, an indication of a property of the construction site indicative of the construction stage, and so forth. For example, at least part of the indication of the first construction stage may be received from the user, from the user using the user interface of Step 1904, from a different process, from an external device, from a memory unit, through a communication network, and so forth. For example, at least part of the indication of the first construction stage may be read from a memory unit (such as memory units 210, shared memory modules 410, memory 600, and so forth), may be received through a data communication network (such as communication network 130), for example using one or more communication devices (such as communication modules 230, internal communication modules 440, external communication modules 450, and so forth), may be accessed through a database, may be determined, and so forth.

In some embodiments, Step 1910 may comprise, for example in response to the indication of the first location in the construction site received by Step 1906 and the indication of the first construction stage received by Step 1908, selecting a first image of the plurality of images accessed by Step 1902, the first image may correspond to the first location and the first construction stage. In some examples, the plurality of images of the construction site accessed by Step 1902 may comprise two or more images corresponding to the first location and the first construction stage, and the Step 1910 may comprise selecting one of the two or more images as the first image. For example, Step 1910 may base the selection of the one of the two or more images on the capturing time of the two or more images. In another example, Step 1910 may analyze the two or more images to select the one of the two or more images.

In some embodiments, Step 1912 may comprise presenting the first image selected by Step 1910, for example to the user, to the user using the user interface of Step 1904, using a different process, using an external device, and so forth. In some examples, Step 1912 may present, for example in conjunction with the presentation of the selected first image, a plurality of construction stages corresponding to the first location in the construction site. In one example, Step 1912 may visually mark the first construction stage in the presentation of the plurality of construction stages corresponding to the first location in the construction site. In one example, Step 1918 may present, in conjunction with the presentation of the selected second image, a plurality of construction stages corresponding to the second location in the construction site, the plurality of construction stages corresponding to the second location in the construction site may differ from the plurality of construction stages corresponding to the first location in the construction site.

In some examples, Step 1912 may present, for example in conjunction with the presentation of the selected first image, a plurality of construction stages corresponding to the first location in the construction site, for example as described above, and the presentation by Step 1912 of the plurality of construction stages corresponding to the first location in the construction site may be configured to enable a user to select a second construction stage of the plurality of construction stages corresponding to the first location in the construction site (for example, the selected second construction stage may differ from the first construction stage). In one example, for example in response to the selection of the second construction stage of the plurality of construction stages corresponding to the first location in the construction site, an additional image of the plurality of images accessed by Step 1902 may be selected, the additional image may correspond to the first location and the second construction stage (and in some examples, the additional image may differ from the first image), and the selected additional image may be presented, for example as described in relation to Step 1912, Step 1918, Step 1924 and Step 1930.

In some examples, Step 1912 may present, for example in conjunction with the presentation of the selected first image, a plurality of construction stages corresponding to the first location in the construction site, for example as described above, the plurality of images of the construction site accessed by Step 1902 may comprise no image corresponding to the first location and a second construction stage, and the presented plurality of construction stages corresponding to the first location in the construction site may include the second construction stage. In one example, a visual indication that the plurality of images of the construction site comprises no image corresponding to the first location and the second construction stage may be presented, for example in the presentation of the plurality of construction stages corresponding to the first location in the construction site, in conjunction with the presentation of the plurality of construction stages corresponding to the first location in the construction site, and so forth. In another example, the plurality of images of the construction site accessed by Step 1902 may comprise at least one image corresponding to the first location and a third construction stage, and a visual indication that the plurality of images of the construction site comprises at least one image corresponding to the first location and the third construction stage may be presented, for example in the presentation of the plurality of construction stages corresponding to the first location in the construction site, in conjunction with the presentation of the plurality of construction stages corresponding to the first location in the construction site, and so forth. In yet another example, the plurality of images of the construction site accessed by Step 1902 may comprise two of more images corresponding to the first location and a third construction stage, and a visual indication that the plurality of images of the construction site comprises two of more images corresponding to the first location and the third construction stage may be presented, for example in the presentation of the plurality of construction stages corresponding to the first location in the construction site, in conjunction with the presentation of the plurality of construction stages corresponding to the first location in the construction site, and so forth.

In some embodiments, Step 1914 may comprise, for example after Step 1912 presented the first image selected by Step 1910, receiving an indication of a second location in the construction site (the second location may differ from the first location indicated by the indication received by Step 1906), for example from the user, from the user using the user interface of Step 1904, from a different process, from an external device, from a memory unit, through a communication network, and so forth.

In some embodiments, Step 1916 may comprise, for example in response to the indication of the second location in the construction site received by Step 1914, selecting a second image of the plurality of images accessed by Step 1902, the second image may correspond to the second location and the first construction stage. In some examples, for example in response to the plurality of images of the construction site accessed by Step 1902 comprising no image corresponding to the second location and the first construction stage, Step 1916 may select an image corresponding to the second location and a second construction stage as the second image, the second construction stage may differ from the first construction stage. For example, the second construction stage may be a construction stage preceding the first construction stage. In another example, the second construction stage may be a construction stage succeeding the first construction stage. In some examples, for example in response to the plurality of images of the construction site accessed by Step 1902 comprising no image corresponding to the second location and the first construction stage, a notification to a user may be provided.

In some embodiments, Step 1918 may comprise presenting the second image selected by Step 1916, for example to the user, to the user using the user interface of Step 1904, using a different process, using an external device, and so forth. In one example, Step 1918 may further comprise halting the presentation by Step 1912 of the first image selected by Step 1910, for example before presenting the second image selected by Step 1916, after presenting the second image selected by Step 1916, together with the presentation of the second image selected by Step 1916, within less than a selected time length (such as half a second, one second, ten seconds, one minute, etc.) of the presentation of the second image selected by Step 1916, and so forth.

In some embodiments, Step 1920 may comprise, for example after Step 1918 presented the second image selected by Step 1916, receiving an indication of a first capturing time. Some non-limiting examples of such indication of a capturing time may include an indication of a time, an indication of a time in day, an indication of a date, an indication of a day in week, an indication of an offset with respect to a different time (such as the current time, a different capturing time, etc.), an indication of a capturing cycle, and so forth. For example, at least part of the indication of the capturing time may be received from the user, from the user using the user interface of Step 1904, from a different process, from an external device, from a memory unit, through a communication network, and so forth. For example, at least part of the indication of the capturing time may be read from a memory unit (such as memory units 210, shared memory modules 410, memory 600, and so forth), may be received through a data communication network (such as communication network 130), for example using one or more communication devices (such as communication modules 230, internal communication modules 440, external communication modules 450, and so forth), may be accessed through a database, may be determined (for example, as described above, by analyzing images captured from the construction site as described above, by reading time from a clock, etc.), and so forth.

In some embodiments, Step 1922 may comprise, for example in response to the received indication of the first capturing time, selecting a third image of the plurality of images accessed by Step 1902, the third image may correspond to the second location and the first capturing time (the third image may or may not correspond to the first construction stage). In some examples, for example in response to the plurality of images of the construction site accessed by Step 1902 comprising no image corresponding to the second location and the first capturing time, Step 1922 may select an image corresponding to the second location and a second capturing time as the third image (the second capturing time may differ from the first capturing time). For example, the second capturing time may be earlier than the first capturing time. In another example, the second capturing time may be later than the first capturing time.

In some embodiments, Step 1924 may comprise presenting the third image selected by Step 1922, for example to the user, to the user using the user interface of Step 1904, using a different process, using an external device, and so forth. In one example, Step 1924 may further comprise halting the presentation by Step 1918 of the second image selected by Step 1916, for example before presenting the third image selected by Step 1922, after presenting the third image selected by Step 1922, together with the presentation of the third image selected by Step 1922, within less than a selected time length (such as half a second, one second, ten seconds, one minute, etc.) of the presentation of the third image selected by Step 1922, and so forth.

In some embodiments, Step 1926 may comprise, for example after Step 1924 presented the third image selected by Step 1922, receiving an indication of a third location in the construction site, for example from the user, from the user using the user interface of Step 1904, from a different process, from an external device, from a memory unit, through a communication network, and so forth. For example, the third location in the construction site may differ from the first location in the construction site indicated by the indication received by Step 1906, may differ from the second location in the construction site indicated by the indication received by Step 1914, may differ from the first location in the construction site indicated by the indication received by Step 1906 and from the second location in the construction site indicated by the indication received by Step 1914, may be identical to the first location in the construction site indicated by the indication received by Step 1906, may be substantially identical to the first location in the construction site indicated by the indication received by Step 1906, may be identical to the second location in the construction site indicated by the indication received by Step 1914, may be substantially identical to the second location in the construction site indicated by the indication received by Step 1914, and so forth.

In some embodiments, Step 1928 may comprise, for example in response to the received indication of the third location in the construction site, selecting a fourth image of the plurality of images accessed by Step 1902, the fourth image may correspond to the third location and the first capturing time (the fourth image may or may not correspond to the first construction stage).

In some embodiments, Step 1930 may comprise presenting the fourth image selected by Step 1928, for example to the user, to the user using the user interface of Step 1904, using a different process, using an external device, and so forth. In one example, Step 1930 may further comprise halting the presentation by Step 1924 of the third image selected by Step 1922, for example before presenting the fourth image selected by Step 1928, after presenting the fourth image selected by Step 1928, together with the presentation of the fourth image selected by Step 1928, within less than a selected time length (such as half a second, one second, ten seconds, one minute, etc.) of the presentation of the fourth image selected by Step 1928, and so forth.

In some examples, such as Step 1906, Step 1914, Step 1926, etc., an indication of a location in the construction site may be received. Some non-limiting examples of such indication of a location in the construction site may include an indication of a location on a map, an indication of a location on an image, in indication of a location on a construction plan, an indication of a location on an as-built model, a set of coordinates indicating a position within the construction site, an indication of a particular unit (such as a particular room, a particular apartment, a particular floor, etc.) in the construction site, and so forth. For example, at least part of the indication of the location in the construction site may be received from the user, from the user using the user interface of Step 1904, from a different process, from an external device, from a memory unit, through a communication network, and so forth. For example, at least part of the indication of the location in the construction site may be read from a memory unit (such as memory units 210, shared memory modules 410, memory 600, and so forth), may be received through a data communication network (such as communication network 130), for example using one or more communication devices (such as communication modules 230, internal communication modules 440, external communication modules 450, and so forth), may be accessed through a database, may be determined (for example, as described above, by analyzing images captured from the construction site as described above, by analyzing construction plans as described above, etc.), and so forth.

In some examples, such as Step 1910, Step 1916, etc., an image corresponding to a particular location and a particular construction stage may be selected of the plurality of images accessed by Step 1902. For example, a data structure and/or a database indexing the plurality of images by locations and/or construction stages may be accessed using the particular location and/or the particular construction stage to select the image. In another example, each image of the plurality of images may be coupled with a location and/or a construction stage, and the plurality of images may be searched to find (and select) an image corresponding to the particular location and/or the particular construction stage. In yet another example, images of the plurality of images may be analyzed to determine corresponding locations and/or construction stages (for example, as described above), and the images may be analyzed to find (and select) an image an image corresponding to the particular location and/or the particular construction stage.

In some examples, such as Step 1922, Step 1928, etc., an image corresponding to a particular location and a particular capturing time may be selected of the plurality of images accessed by Step 1902. For example, a data structure and/or a database indexing the plurality of images by locations and/or capturing times may be accessed using the particular location and/or the particular capturing time to select the image. In another example, each image of the plurality of images may be coupled with a location and/or a capturing time, and the plurality of images may be searched to find (and select) an image corresponding to the particular location and/or the particular capturing time. In yet another example, images of the plurality of images may be analyzed to determine corresponding locations and/or capturing time (for example, as described above), and the images may be analyzed to find (and select) an image an image corresponding to the particular location and/or the particular capturing time.

In some examples, such as Step 1912, Step 1918, Step 1924, Step 1930, etc., a selected image may be presented. For example, the selected image may be presented to the user, to the user using the user interface of Step 1904, using a different process, using an external device, and so forth. In one example, presenting the selected image may comprise halting the presentation of one or more previously presented images, for example before presenting the selected image, after presenting the selected image, together with the presentation of the selected image, within less than a selected time length (such as half a second, one second, ten seconds, one minute, etc.) of the presentation of the selected image, and so forth. In another example, the selected image may be presented together with one or more previously presented images. In some examples, the selected image may comprise a 360 image, and the presentation of the selected image may include a presentation of the original image, a presentation of a projection of the selected image, a presentation of an equirectangular projection of the selected image, a presentation of a cube mapping of the selected image, a presentation of a Equi-Angular Cubemap projection of the selected image, a presentation of a pyramid projection of the selected image, and so forth. In some examples, a plurality of construction stages may be presented, for example in conjunction with the presentation of the selected image, the plurality of construction stages may corresponds to a location in the construction site corresponding to the selected image being presented.

In some examples, an indication of a location in the construction site (such as the indication of the first location in the construction site received by Step 1906, the indication of the second location in the construction site received by Step 1914, the indication of the third location in the construction site received by Step 1926, etc.) may comprise an indication of a unit of the construction site, and images corresponding to the indicated location may be images captured from one or more positions in the indicated unit. For example, the indication of the first location in the construction site received by Step 1906 may comprise an indication of a unit of the construction site, and images corresponding to the first location may be images captured from one or more positions in the indicated unit. In some examples, an indication of a location in the construction site (such as the indication of the first location in the construction site received by Step 1906, the indication of the second location in the construction site received by Step 1914, the indication of the third location in the construction site received by Step 1926, etc.) may comprise an indication of an object in the construction site, and images corresponding to the indicated location may be images depicting the indicated object. For example, the indication of the first location in the construction site received by Step 1906 may comprise an indication of an object in the construction site, and images corresponding to the first location may be images depicting the indicated object. In some examples, an indication of a capturing time in the construction site (such as the indication of the first capturing time received by Step 1920, etc.) may comprise an indication of an image capturing cycle, and images corresponding to the indicated capturing time may be images captured at the indicated image capturing cycle. In some examples, an indication of a capturing time in the construction site (such as the indication of the first capturing time received by Step 1920, etc.) may comprise an indication of a time span, and images corresponding to the indicated capturing time may be images captured at the indicated time span.

In some embodiments, for example after Step 1930 presented the selected fourth image, an additional indication of the first construction stage may be received (for example as described above in relation to Step 1908). Further, for example in response to the received additional indication, a fifth image of the plurality of images may be selected (for example as described above in relation to Step 1910 and Step 1916, the fifth image may correspond to the third location and the first construction stage (the fifth image may or may not correspond to the first capturing time). Further, the fifth image may be presented, for example as described above in relation to Step 1912, Step 1918, Step 1924 and Step 1930.

In some embodiments, a plurality of images of a construction site may be accessed (for example using Step 1902 as described above), each image of the plurality of images may correspond to a location in the construction site and/or a construction stage and/or a capturing time. Further, a first image of the plurality of images may be presented (for example as described above in relation to Step 1912, Step 1918, Step 1924 and Step 1930), for example to a user, the first image may correspond to a first location in the construction site, a first construction stage and a first capturing time. Further, an indication of a second location in the construction site may be received (for example as described above in relation to Step 1906, Step 1914 and Step 1926), for example from a user. Further, a browsing mode may be determined, for example as described below. In one example, in response to a determination of a first browsing mode, a second image of the plurality of images may be presented, the second image may correspond to the second location and the first construction stage. Further, in response to a determination of a second browsing mode, a third image of the plurality of images may be presented, the third image may correspond to the second location and the first capturing time.

In some examples, a browsing mode may be determined. For example, the browsing mode may be determined based on user input. In one example, the browsing mode may be selected by the user, for example using the user interface, using a different process, using an external device, and so forth. In another example, in response to a received an indication of a construction stage (for example using Step 1908), a first browsing mode may be determined, and in response to an indication of a capturing time (for example using Step 1920), a second browsing mode may be determined, the second browsing mode may differ from the first browsing mode. In another example, the browsing mode may be determined, for example based on a currently presented image. In yet another example, the browsing mode may be read from a memory unit (such as memory units 210, shared memory modules 410, memory 600, and so forth), may be received through a data communication network (such as communication network 130), for example using one or more communication devices (such as communication modules 230, internal communication modules 440, external communication modules 450, and so forth), may be accessed through a database, and so forth.

What is claimed is:

1. A non-transitory computer readable medium storing data and computer implementable instructions for carrying out a method for determining image capturing parameters in construction sites, the method comprising:
    accessing at least one electronic record, the at least one electronic record includes information related to an object in a construction site and information related to a second object in the construction site, the second object differs from the object, the second object encircles the object;
    analyzing the information related to the object and the information related to the second object to determine at least one capturing parameter associated with the object; and
    causing capturing, at the construction site, of at least one image of the object and at least part of the second object using the determined at least one capturing parameter associated with the object.

2. The non-transitory computer readable medium of claim 1, wherein the object and the second object are disjoined.

3. The non-transitory computer readable medium of claim 1, wherein the at least one electronic record further includes information related to a space in the construction site, and the method further comprises analyzing the information related to the space and the information related to the object to determine the at least one capturing parameter.

4. The non-transitory computer readable medium of claim 1, wherein the information related to the object includes a dimension of at least part of the object, and the method further comprises basing the determination of the at least one capturing parameter associated with the object on the dimension of the at least part of the object.

5. The non-transitory computer readable medium of claim 1, wherein the information related to the object includes a shape of at least part of the object, and the method further comprises basing the determination of the at least one capturing parameter associated with the object on the shape of the at least part of the object.

6. The non-transitory computer readable medium of claim 1, wherein the information related to the object includes a spatial orientation of at least part of the object, and the method further comprises basing the determination of the at least one capturing parameter associated with the object on the spatial orientation of the at least part of the object.

7. The non-transitory computer readable medium of claim 1, wherein the method further comprises basing the determination of the at least one capturing parameter associated with the object on an analysis of a previously captured image of the object.

8. The non-transitory computer readable medium of claim 1, wherein the information related to the object includes information related to one or more holes in a three dimensional structure in the construction site, the three dimensional structure surrounds the object, and the method further comprises basing the determination of the at least one capturing parameter associated with the object on the information related to the one or more holes in the three dimensional structure.

9. The non-transitory computer readable medium of claim 1, wherein the method further comprises:
    analyzing the information related to the object to determine a need to capture at least one additional image of the object;
    in response to a determined need to capture at least one additional image of the object, causing the capturing of the at least one image of the object; and
    in response to no determined need to capture at least one additional image of the object, forgoing causing the capturing of the at least one image of the object.

10. The non-transitory computer readable medium of claim 1, wherein the method further comprises analyzing the information related to the object to determine a time preference for the capturing of the at least one image of the object.

11. The non-transitory computer readable medium of claim 1, wherein the determined at least one capturing parameter associated with the object is configured to enable a determination of an object type of the object by analyzing the at least one image of the object captured using the determined at least one capturing parameter.

12. The non-transitory computer readable medium of claim 1, wherein the determined at least one capturing parameter associated with the object is configured to enable a determination of a condition of the object by analyzing the at least one image of the object captured using the determined at least one capturing parameter.

13. The non-transitory computer readable medium of claim 1, wherein the determined at least one capturing parameter associated with the object is configured to ensure a selected pixel resolution in the captured at least one image for the object.

14. The non-transitory computer readable medium of claim 1, wherein the method further comprises:
    analyzing the at least one electronic record to identify a status of a task associated with the object;
    in response to a first identified status of the task, selecting a first capturing parameter;
    in response to a second identified status of the task, selecting a second capturing parameter; and causing capturing of the at least one image of the object using the selected capturing parameter.

15. The non-transitory computer readable medium of claim 1, wherein the method further comprises:
receiving the at least one image of the object captured using the determined at least one capturing parameter;
analyzing the received at least one image to determine whether a quality of the received at least one image is sufficient;
in response to a determination that the quality of the received at least one image is insufficient, determining at least one modified capturing parameter associated with the object; and
causing capturing of at least one additional image of the object using the determined at least one modified capturing parameter.

16. A system for determining image capturing parameters in construction sites, the system comprising:
at least one processor configured to:
access at least one electronic record, the at least one electronic record includes information related to an object in a construction site and information related to a second object in the construction site, the second object differs from the object, the second object encircles the object;
analyze the information related to the object and the information related to the second object to determine at least one capturing parameter associated with the object; and
cause capturing, at the construction site, of at least one image of the object and at least part of the second object using the determined at least one capturing parameter associated with the object.

17. A method for determining image capturing parameters in construction sites, the method comprising:
accessing at least one electronic record, the at least one electronic record includes information related to an object in a construction site and information related to a second object in the construction site, the second object differs from the object, the second object encircles the object;
analyzing the information related to the object and the information related to the second object to determine at least one capturing parameter associated with the object; and
causing capturing, at the construction site, of at least one image of the object and at least part of the second object using the determined at least one capturing parameter associated with the object.

\* \* \* \* \*